US012626326B2

(12) United States Patent
Jiang et al.

(10) Patent No.: US 12,626,326 B2
(45) Date of Patent: May 12, 2026

(54) IMAGE STITCHING WITH AN ADAPTIVE THREE-DIMENSIONAL BOWL MODEL OF THE SURROUNDING ENVIRONMENT FOR SURROUND VIEW VISUALIZATION

(71) Applicant: NVIDIA Corporation, Santa Clara, CA (US)

(72) Inventors: Hairong Jiang, Santa Clara, CA (US); Nuri Murat Arar, Santa Clara, CA (US); Orazio Gallo, Santa Clara, CA (US); Jan Kautz, Santa Clara, CA (US); Ronan Letoquin, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 71 days.

(21) Appl. No.: 18/173,623

(22) Filed: Feb. 23, 2023

(65) Prior Publication Data

US 2023/0316635 A1      Oct. 5, 2023

Related U.S. Application Data

(60) Provisional application No. 63/326,724, filed on Apr. 1, 2022.

(51) Int. Cl.
*G06T 3/4038*       (2024.01)
*B60W 30/06*       (2006.01)
(Continued)

(52) U.S. Cl.
CPC .............. *G06T 3/4038* (2013.01); *G06T 7/70* (2017.01); *G06T 7/74* (2017.01); *G06T 15/20* (2013.01);
(Continued)

(58) Field of Classification Search
CPC ........... H04N 5/2624; G06T 7/74; G06T 7/70; G06T 3/4038; G06T 15/20; G06T 17/20;
(Continued)

(56) References Cited

U.S. PATENT DOCUMENTS

| | | | |
|---|---|---|---|
| 771,104 A | 9/1904 | John | |
| 5,751,838 A | 5/1998 | Cox et al. | |

(Continued)

FOREIGN PATENT DOCUMENTS

| | | | |
|---|---|---|---|
| CN | 106796390 A | 5/2017 | |
| CN | 107888894 A | 4/2018 | |

(Continued)

OTHER PUBLICATIONS

Hsieh, J-W., "Fast stitching algorithm for moving object detection and mosaic construction", Image and Vision Computing, vol. 22, No. 4, pp. 291-306 (2004).

(Continued)

*Primary Examiner* — Xin Sheng
(74) *Attorney, Agent, or Firm* — Freestone Intellectual Property Law PLLC

(57) ABSTRACT

In various examples, an environment surrounding an ego-object is visualized using an adaptive 3D bowl that models the environment with a shape that changes based on distance (and direction) to one or more representative point(s) on detected objects. Distance (and direction) to detected objects may be determined using 3D object detection or a top-down 2D or 3D occupancy grid, and used to adapt the shape of the adaptive 3D bowl in various ways (e.g., by sizing its ground plane to fit within the distance to the closest detected object, fitting a shape using an optimization algorithm). The adaptive 3D bowl may be enabled or disabled during each time slice (e.g., based on ego-speed), and the 3D bowl for each time slice may be used to render a visualization of the (Continued)

environment (e.g., a top-down projection image, a textured 3D bowl, and/or a rendered view thereof).

20 Claims, 48 Drawing Sheets

(51) Int. Cl.

| | |
|---|---|
| *B60W 60/00* | (2020.01) |
| *G06T 7/70* | (2017.01) |
| *G06T 7/73* | (2017.01) |
| *G06T 15/20* | (2011.01) |
| *G06T 17/20* | (2006.01) |
| *G06T 19/20* | (2011.01) |
| *G06V 10/10* | (2022.01) |
| *G06V 20/56* | (2022.01) |
| *G06V 20/58* | (2022.01) |
| *H04N 5/262* | (2006.01) |

(52) U.S. Cl.
CPC .............. *G06V 10/16* (2022.01); *G06V 20/56* (2022.01); *H04N 5/2624* (2013.01); *B60W 30/06* (2013.01); *B60W 60/001* (2020.02); *B60W 2420/403* (2013.01); *B60W 2420/408* (2024.01); *B60W 2510/0638* (2013.01); *G06T 17/20* (2013.01); *G06T 19/20* (2013.01); *G06T 2219/2004* (2013.01); *G06V 20/58* (2022.01)

(58) Field of Classification Search
CPC ........... G06T 19/20; G06T 2219/2004; B60W 60/001; B60W 30/06; B60W 2420/408; B60W 2420/403; B60W 2510/0638; G06V 20/58; G06V 20/56
See application file for complete search history.

(56) References Cited

U.S. PATENT DOCUMENTS

| | | | |
|---|---|---|---|
| 6,704,621 | B1 | 3/2004 | Stein et al. |
| 7,333,963 | B2 | 2/2008 | Widrow et al. |
| 7,571,030 | B2 | 8/2009 | Ryu et al. |
| 7,711,044 | B1 | 5/2010 | Hoang et al. |
| 8,213,706 | B2 | 7/2012 | Krishnaswamy et al. |
| 8,321,168 | B2 | 11/2012 | Eriksson |
| 9,007,428 | B2 | 4/2015 | Zhou |
| 9,315,152 | B1 | 4/2016 | Maestas et al. |
| 9,516,223 | B2 | 12/2016 | Zhou et al. |
| 10,262,466 | B2 * | 4/2019 | Guo .......................... G06T 3/00 |
| 10,776,928 | B1 | 9/2020 | Horvath et al. |
| 10,866,427 | B2 | 12/2020 | Jung et al. |
| 10,885,698 | B2 | 1/2021 | Muthler et al. |
| 11,225,193 | B2 * | 1/2022 | Chen .......................... B60R 1/27 |
| 11,760,268 | B1 | 9/2023 | McGirt, Jr. et al. |
| 11,778,224 | B1 | 10/2023 | Vanam et al. |
| 2007/0221822 | A1 | 9/2007 | Stein et al. |
| 2009/0015675 | A1 | 1/2009 | Yang |
| 2009/0182690 | A1 | 7/2009 | Stein |
| 2010/0040290 | A1 | 2/2010 | Lei |
| 2011/0211749 | A1 | 9/2011 | Tan et al. |
| 2011/0293142 | A1 | 12/2011 | van der Mark et al. |
| 2012/0081577 | A1 | 4/2012 | Cote et al. |
| 2012/0105639 | A1 | 5/2012 | Stein et al. |
| 2013/0329072 | A1 | 12/2013 | Zhou et al. |
| 2014/0247352 | A1 | 9/2014 | Rathi et al. |
| 2014/0247365 | A1 | 9/2014 | Gardner et al. |
| 2014/0300623 | A1 | 10/2014 | Kim |
| 2014/0347486 | A1 | 11/2014 | Okouneva |
| 2014/0364227 | A1 | 12/2014 | Langlois et al. |
| 2015/0070523 | A1 | 3/2015 | Chao |
| 2015/0143913 | A1 | 5/2015 | Adams et al. |
| 2015/0172620 | A1 | 6/2015 | Guo et al. |
| 2015/0329048 | A1 | 11/2015 | Wang et al. |
| 2015/0332446 | A1 | 11/2015 | Wang et al. |
| 2016/0006943 | A1 | 1/2016 | Ratnakar |
| 2017/0109940 | A1 | 4/2017 | Guo et al. |
| 2017/0140791 | A1 | 5/2017 | Das et al. |
| 2017/0148223 | A1 | 5/2017 | Holzer et al. |
| 2017/0158131 | A1 | 6/2017 | Friebe |
| 2017/0310979 | A1 | 10/2017 | Shaw et al. |
| 2017/0330034 | A1 | 11/2017 | Wang et al. |
| 2017/0372147 | A1 | 12/2017 | Stervik et al. |
| 2017/0372682 | A1 | 12/2017 | Hashikawa et al. |
| 2018/0007263 | A1 | 1/2018 | Vandrotti et al. |
| 2018/0210442 | A1 | 7/2018 | Guo et al. |
| 2018/0225833 | A1 | 8/2018 | Cao et al. |
| 2018/0244199 | A1 | 8/2018 | Gyori et al. |
| 2018/0253875 | A1 | 9/2018 | Gorur Sheshagiri et al. |
| 2018/0286026 | A1 | 10/2018 | Fan et al. |
| 2019/0050959 | A1 * | 2/2019 | Husted ...................... B60R 1/27 |
| 2019/0080476 | A1 | 3/2019 | Ermilios et al. |
| 2019/0082103 | A1 | 3/2019 | Banerjee et al. |
| 2019/0272619 | A1 | 9/2019 | Lim et al. |
| 2019/0289223 | A1 | 9/2019 | Abbas et al. |
| 2019/0361436 | A1 | 11/2019 | Ueda et al. |
| 2019/0377181 | A1 | 12/2019 | Myhre et al. |
| 2020/0005649 | A1 | 1/2020 | Kim et al. |
| 2020/0020075 | A1 | 1/2020 | Khwaja et al. |
| 2020/0034953 | A1 | 1/2020 | Friebe et al. |
| 2020/0150677 | A1 | 5/2020 | Walters et al. |
| 2020/0174130 | A1 | 6/2020 | Banerjee et al. |
| 2020/0265622 | A1 | 8/2020 | Pettersson et al. |
| 2020/0293796 | A1 | 9/2020 | Sajjadi Mohammadabadi et al. |
| 2020/0371016 | A1 | 11/2020 | Guillou et al. |
| 2021/0042705 | A1 | 2/2021 | Suen et al. |
| 2021/0065461 | A1 | 3/2021 | Reif |
| 2021/0073997 | A1 | 3/2021 | Vora et al. |
| 2021/0179086 | A1 | 6/2021 | Yamanaka et al. |
| 2021/0286923 | A1 | 9/2021 | Kristensen et al. |
| 2022/0078390 | A1 * | 3/2022 | Jingu ...................... G06T 15/20 |
| 2022/0144260 | A1 | 5/2022 | Chen et al. |
| 2022/0414822 | A1 | 12/2022 | Lu |
| 2023/0024474 | A1 | 1/2023 | Ren et al. |
| 2023/0048926 | A1 | 2/2023 | Kurbiel et al. |
| 2023/0117253 | A1 | 4/2023 | Molad et al. |
| 2023/0166659 | A1 | 6/2023 | Hariyani et al. |
| 2023/0245463 | A1 | 8/2023 | Varma et al. |
| 2023/0272998 | A1 | 8/2023 | Lee |

FOREIGN PATENT DOCUMENTS

| | | | | |
|---|---|---|---|---|
| CN | 113905176 | A | 1/2022 | |
| EP | 2709069 | A1 * | 3/2014 | ........... G06T 15/205 |
| EP | 3 217 352 | A1 | 9/2017 | |
| EP | 3 537 704 | A2 | 9/2019 | |

OTHER PUBLICATIONS

Aocheng, L., et al., "Image Stitching Based on Semantic Planar Region Consensus", IEEE Transactions on Image Processing, IEEE, USA, vol. 30, pp. 5545-5558 (2021).

Kwang-Wook, L., et al., "A Novel Content-Aware Stitching Algorithm for Real-Time Video Sequences", IEICE Transactions on Information and Systems, vol. E94-D, No. 2, pp. 357-362 (2011).

Hyunchul, L., et al., "Improved method on Image stitching based on optical flow algorithm", International Journal of Engineering Business Management, vol. 12, pp. 1-17 (2020).

Abdukholikov, K., and Whangbo, T., "Fast image stitching method for handling dynamic object problems in Panoramic Images", KSII Transactions on Internet and Information Systems, vol. 11, No. 11, pp. 5419-5435 (Nov. 30, 2017).

Botterill, T., et al., "Real-time aerial image mosaicing", 2010 25th International Conference of Image and Vision Computing New Zealand, IEEE, pp. 1-8 (Nov. 8, 2010).

Adel, E., et al., "Image Stitching based on Feature Extraction Techniques: A Survey", International Journal of Computer Applications, vol. 99, No. 6, pp. 1-8 (Aug. 1, 2014).

Muhammad, U., A., "Realtime Free Viewpoint Video System Based on a new Panorama Stitching Framework", A thesis submitted in partial fulfillment of the requirements for the degree of Master of Science, pp. 1-86 (Jan. 1, 2015).

(56) References Cited

OTHER PUBLICATIONS

Gan, L., et al., "Virtual reality remote control system based on image", 2017 Institute of Thermomechanics CAS, Acta Technica, vol. 62, pp. 457-468 (2017).

Rott, R., "Dynamic Update of Stand-Alone Lidar Model Based on Ray Tracing Using the Nvidia Optix Engine", 2022 International Conference on Connected Vehicle and Expo (ICCVE), IEEE, pp. 1-6 (Mar. 7, 2022).

Alonzo, K., et al., "Real-time photorealistic virtualized reality interface for remote mobile robot control", The International Journal of Robotics Research, vol. 30, No. 3, pp. 384-404 (2011).

Chen, C., et al., "Outdoor 3D Environment Reconstruction based on Multi-sensor Fusion for Remote Control", 2019 IEEE 8th Joint International Information Technology and Artificial Intelligence Conference (ITAIC), IEEE, pp. 1753-1757 (May 2019).

Lee, J., et al."Real-Time Downward View Generation of a Vehicle Using Around View Monitor System", IEEE Transactions on Intelligent Transportation Systems, IEEE, Piscataway, NJ, USA, vol. 21, No. 8, pp. 1-10 (Jul. 26, 2019).

Kim, J-H., et al.,"Hemispherical 3D Around View Monitoring Algorithm Using Image Synthesis of Multi-Channel Cameras", 2018 15th International Conference on Control, Automation, Robotics and Vision (ICARCV), IEEE, pp. 1466-1471 (Nov. 18, 2018).

Kuo, Y-C., and Tseng, D-C., et al., "Wide-scoped Around View Detection", Proceedings of the 2019 International Conference on Mathematics, Big Data Analysis and Simulation and Modelling (MBDASM 2019), pp. 133-138 (Jan. 1, 2019).

Baek, I., et al., "Thin-Plate Spline-based Adaptive 3D Surround View", 2019 IEEE Intelligent Vehicles Symposium (IV), IEEE, pp. 586-593 (Jun. 9, 2019).

Liu, X., "Construction of 540 degrees Panoramic Image of Vehicles Based on Video Spatiotemporal Sequence Stitching", ICETIS 2022 , pp. 1-6 (Jan. 21, 2022).

Zhang, T., et al.,"Online Correction of Camera Poses for the Surround-view System: A Sparse Direct Approach", ACM Transactions on Multimedia Computing Communications and Applications, Association for Computing Machinery, US, vol. 18, No. 4, pp. 1-24 (2022).

Liu, Y-C., et al.,"Bird's-Eye View Vision System for Vehicle Surrounding Monitoring", International Workshop on Robot Vision, Springer Berlin Heidelberg, vol. 4931, pp. 207-218 (Jan. 1, 2008).

Feng, H., et al., "Seeing the Invisible: Under Vehicle Reconstruction (UVR) for Surround View Visualization", Journal of Physics: Conference Series, Institute of Physics Publishing, GB, vol. 2330, pp. 7 (Aug. 10, 2022).

International Search Report and Written Opinion received for PCT Application No. PCT/US2023/063962, mailed on Jun. 27, 2023, 11 pages.

International Search Report and Written Opinion received for PCT Application No. PCT/US2023/063965, mailed on Jul. 3, 2023, 10 pages.

International Search Report and Written Opinion received for PCT Application No. PCT/US2023/063969, mailed on Jul. 5, 2023, 10 pages.

International Search Report and Written Opinion received for PCT Application No. PCT/US2023/063959, mailed on Jul. 13, 2023, 10 pages.

International Search Report and Written Opinion received for PCT Application No. PCT/US2023/063968, mailed on Jul. 18, 2023, 11 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

IEC 61508, "Functional Safety of Electrical/Electronic/ Programmable Electronic Safety-related Systems," Retrieved from Internet URL: https://en.wikipedia.org/wiki/IEC_61508, accessed on Apr. 1, 2022, 7 pages.

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

Appia, V., et al., "Surround view camera system for ADAS on TI's TDAx SoCs", Texas Instruments, pp. 1-18 (Oct. 2015).

Burt, P., J., and Adelson, E., H., "A Multiresolution Spline With Application to Image Mosaics", ACM Transactions on Graphics, vol. 2, No. 4, pp. 217-236 (Oct. 1983).

Danielsson, P., E., "Euclidean Distance Mapping", Computer Graphics and image processing, vol. 14, pp. 227-248 (1980).

Garcia, J., D., E., "3D Reconstruction for Optimal Representation of Surroundings in Automotive HMIs, Based on Fisheye Multi-camera Systems", PhD thesis, Combined Faculty for the Natural Sciences and Mathematics, pp. 1-182 (2015).

Hu, J., S., and Chen, M.-Y., "A Sliding-Window Visual-IMU Odometer Based on Tri-focal Tensor Geometry", 2014 IEEE International Conference on Robotics & Automation (ICRA), IEEE, pp. 3963-3968 (2014).

Nister, D., et al., "Visual Odometry", In Proceedings of the 2004 IEEE Computer Society Conference on Computer Vision and Pattern Recognition, CVPR, pp. 1-8 (2004).

Raudies, F., and Neumann, H., "A review and evaluation of methods estimating ego-motion", Computer Vision and Image Understanding, vol. 116, pp. 606-633 (2012).

Scaramuzza, D., et al., "A Flexible Technique for Accurate Omni-directional Camera Calibration and Structure from Motion", In Proceedings of the Fourth IEEE International Conference on Computer Vision Systems (ICVS 2006), IEEE, pp. 1-8 (2006).

Wallrath, P., and Herschel, R., "Egomotion estimation for a sensor platform by fusion of radar and IMU data", In Proceedings of the 2020 17th European Radar Conference (EuRAD), IEEE pp. 314-317 (2021).

Zhang, B., et al., "A surround view camera solution for embedded systems", In Proceedings of the IEEE conference on computer vision and pattern recognition workshops, IEEE, pp. 662-667 (2014).

Zhang, L., et al., "Deep Image Blending", In Proceedings of the IEEE/CVF Winter Conference on Applications of Computer Vision, IEEE, pp. 231-240 (2020).

Zhang, T., et al., "ROECS: A Robust Semi-direct Pipeline Towards Online Extrinsics Correction of the Surround-view System", In Proceedings of the 29th ACM International Conference on Multimedia, ACM, ISBN, pp. 3153-3161 (2021).

Zhang, Z., "A Flexible New Technique for Camera Calibration", IEEE Transactions on pattern analysis and machine Intelligence, vol. 22, No. 11, pp. 1330-1334, (Nov. 2000).

Zhong, S., and Chirarattananon, P., "Direct Visual-Inertial Ego-Motion Estimation via Iterated Extended Kalman Filter", IEEE Robotics and Automation Letters, pp. 1-8 (Jan. 2020).

Final Office Action, U.S. Appl. No. 18/173,589, Notification Date: Oct. 7, 2025, 34 pages.

Notice of Allowance , U.S. Appl. No. 18/352,989, Notification Date: Sep. 12, 2025, 8 pages.

Notice of Allowance, U.S. Appl. No. 17/969,514, Notification Date: Sep. 15, 2025,8 pages.

https://www.youtube.com/watch?v=bPe0_DHIj4A Marcos HIDO (Year: 2020).

Non-Final Office Action, U.S. Appl. No. 17/969,514, Notification Date: Apr. 21, 2025, 16 pages.

Non-Final Office Action, U.S. Appl. No. 18/173,630, Notification Date: Jun. 26, 2025, 25 pages.

Non-Final Office Action, U.S. Appl. No. 18/352,989, Notification Date: May 14, 2025, 13 pages.

Non-Final Office Action, U.S. Appl. No. 18/173,165 Notification Date: Jul. 2, 2025, 22 pages.

(56)     References Cited

OTHER PUBLICATIONS

Non-Final Office Action, U.S. Appl. No. 18/173,589 Notification Date: Jun. 13, 2025, 31 pages.
Non-Final Office Action, U.S. Appl. No. 18/173,603, Notification Date: Jun. 17, 2025, 26 pages.
Non-Final Office Action, U.S. Appl. No. 18/353,441, Notification Date: May 15, 2025, 16 pages.
Non-Final Office Action, U.S. Appl. No. 18/313,121, Notification Date: Jul. 25, 2025, 12 pages.
Final Office Action, U.S. Appl. No. 18/353,441, Notification Date: Nov. 14, 2025, 13 pages.
Final Office Action, U.S. Appl. No. 18/173,615, Notification Date: Nov. 25, 2025, 20 pages.
Final Office Action, U.S. Appl. No. 18/173,603, Notification Date: Dec. 29, 2025, 20 pages.
Non-Final Office Action, U.S. Appl. No. 18/173,589, Notification Date: Feb. 23, 2026, 34 pages.
Non-Final Office Action, U.S. Appl. No. 18/313,121, Notification Date: Mar. 11, 2026, 13 pages.
Non-Final Office Action, U.S. Appl. No. 18/173,603, Notification Date: Mar. 9, 2026, 26 pages.

* cited by examiner

200

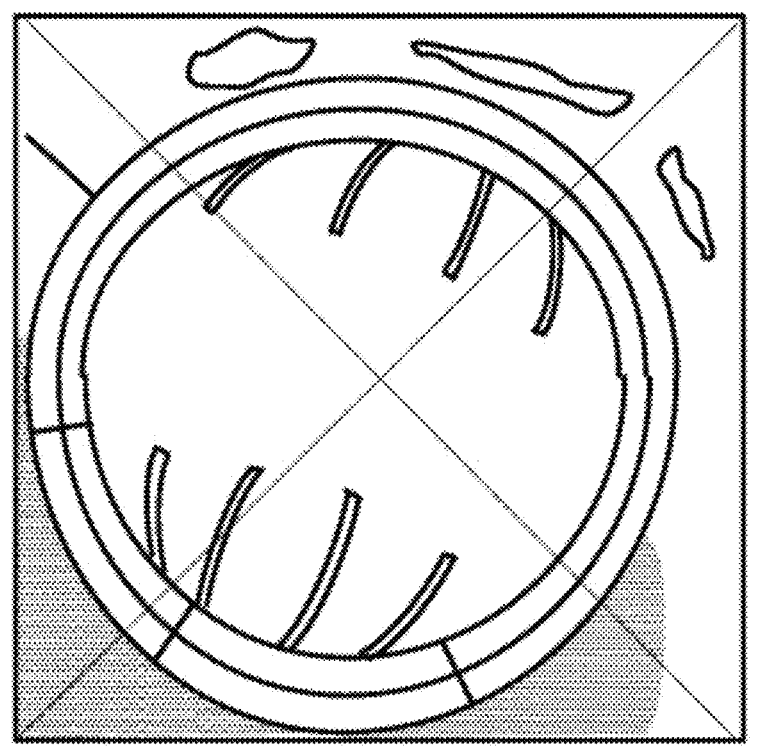
250
FIGURE 2B

440
430
FIGURE 4D

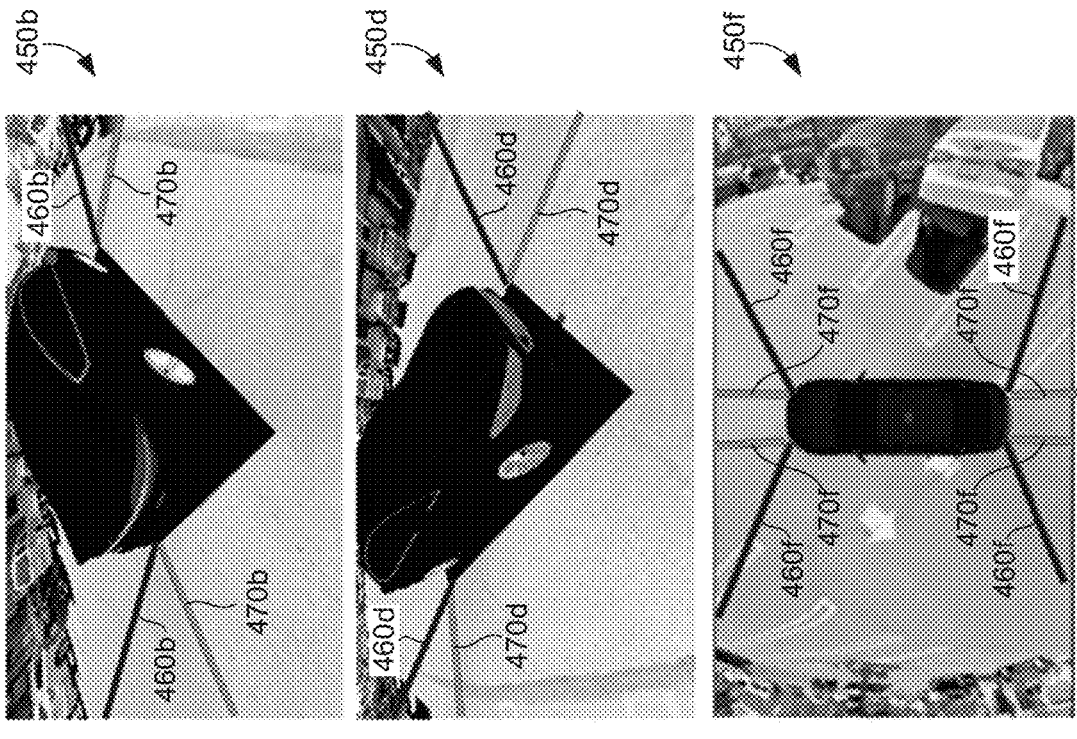
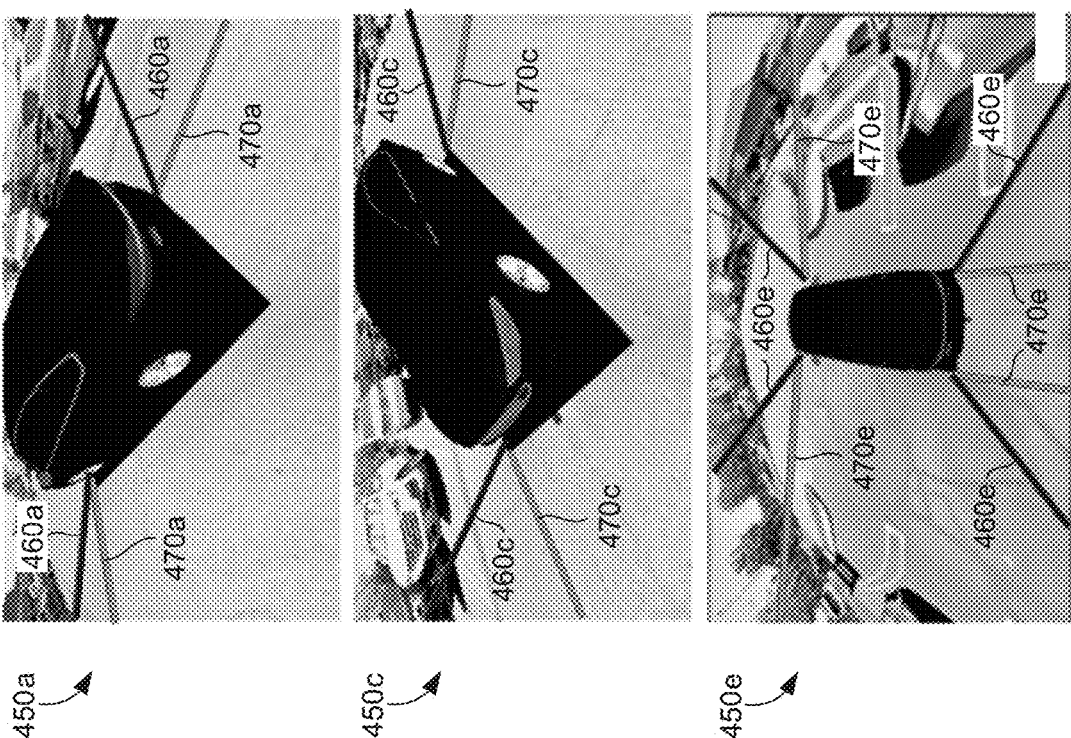
FIGURE 4E

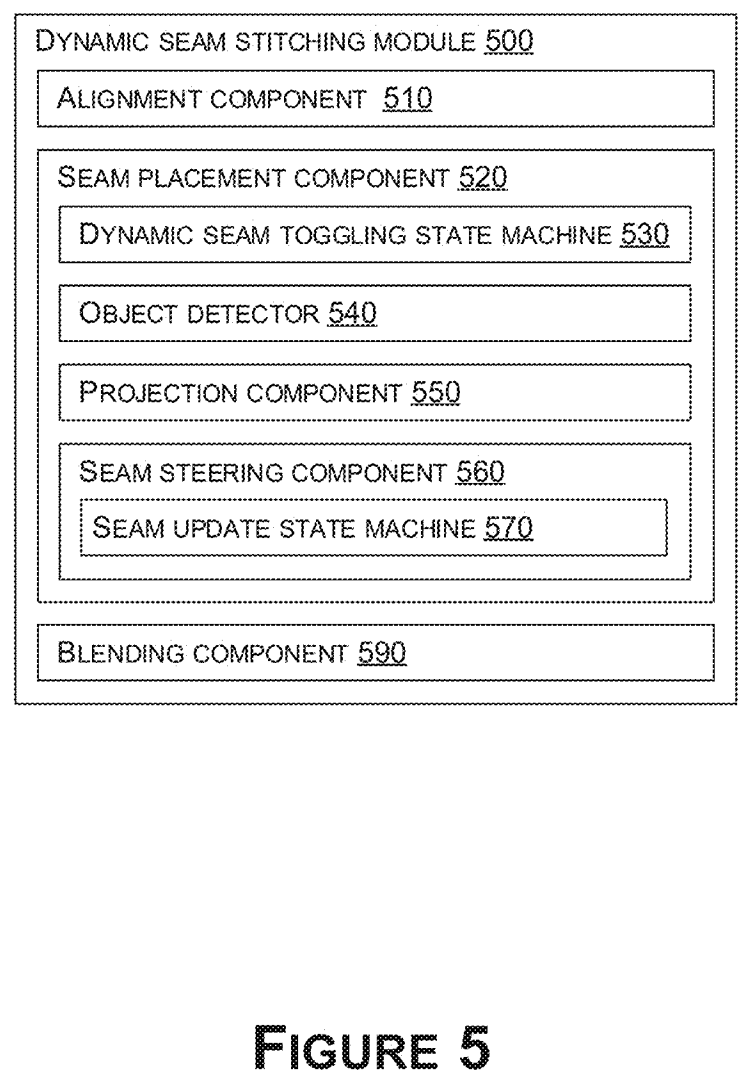

DYNAMIC SEAM STITCHING MODULE 500

ALIGNMENT COMPONENT 510

SEAM PLACEMENT COMPONENT 520

DYNAMIC SEAM TOGGLING STATE MACHINE 530

OBJECT DETECTOR 540

PROJECTION COMPONENT 550

SEAM STEERING COMPONENT 560

SEAM UPDATE STATE MACHINE 570

BLENDING COMPONENT 590

FIGURE 5

FRONT IMAGE 801 805

RIGHT IMAGE 802

806

Figure 10:
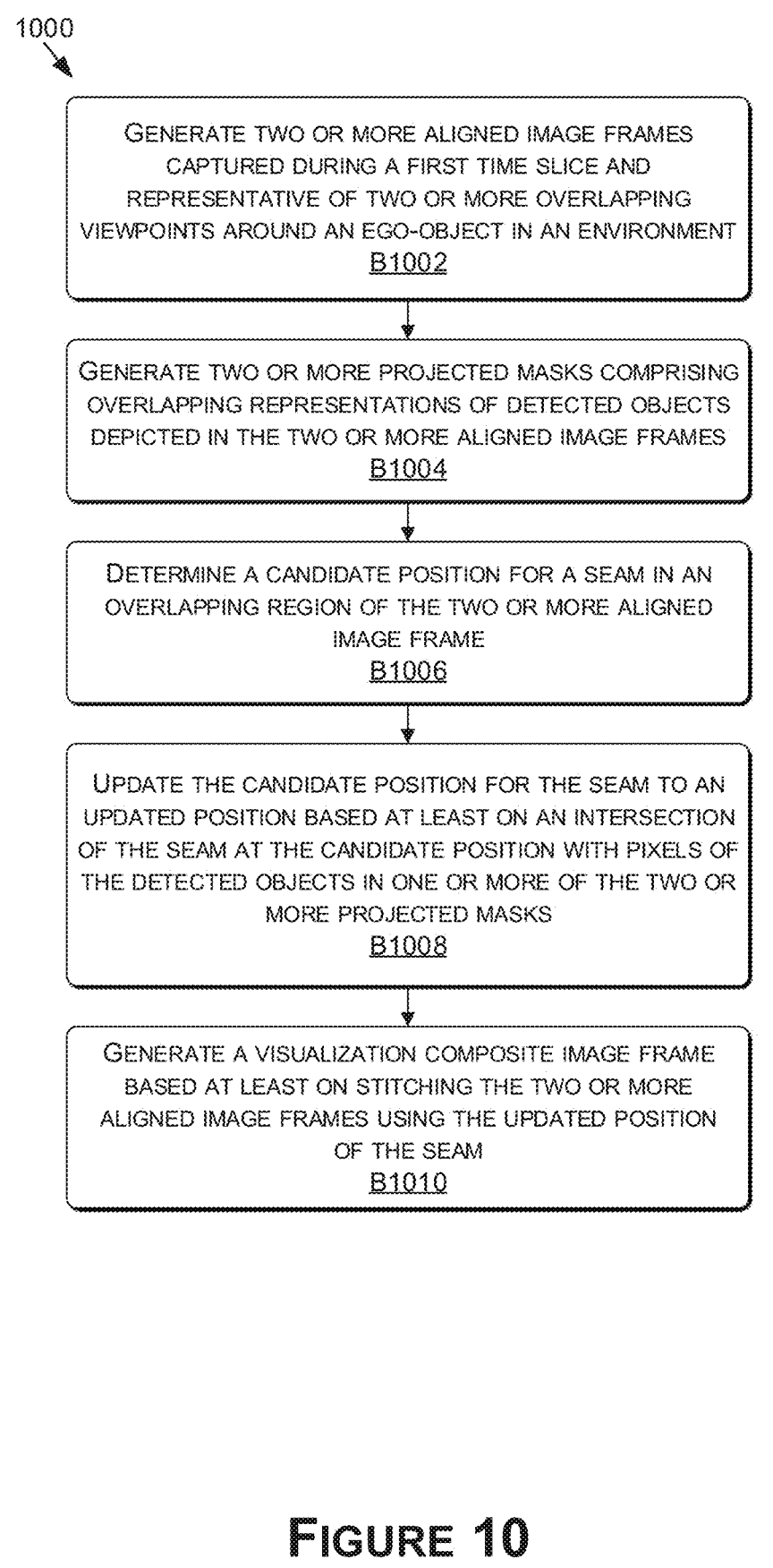

1000

GENERATE TWO OR MORE ALIGNED IMAGE FRAMES
CAPTURED DURING A FIRST TIME SLICE AND
REPRESENTATIVE OF TWO OR MORE OVERLAPPING
VIEWPOINTS AROUND AN EGO-OBJECT IN AN ENVIRONMENT
B1002

GENERATE TWO OR MORE PROJECTED MASKS COMPRISING
OVERLAPPING REPRESENTATIONS OF DETECTED OBJECTS
DEPICTED IN THE TWO OR MORE ALIGNED IMAGE FRAMES
B1004

DETERMINE A CANDIDATE POSITION FOR A SEAM IN AN
OVERLAPPING REGION OF THE TWO OR MORE ALIGNED
IMAGE FRAME
B1006

UPDATE THE CANDIDATE POSITION FOR THE SEAM TO AN
UPDATED POSITION BASED AT LEAST ON AN INTERSECTION
OF THE SEAM AT THE CANDIDATE POSITION WITH PIXELS OF
THE DETECTED OBJECTS IN ONE OR MORE OF THE TWO OR
MORE PROJECTED MASKS
B1008

GENERATE A VISUALIZATION COMPOSITE IMAGE FRAME
BASED AT LEAST ON STITCHING THE TWO OR MORE
ALIGNED IMAGE FRAMES USING THE UPDATED POSITION
OF THE SEAM
B1010

Figure 11:
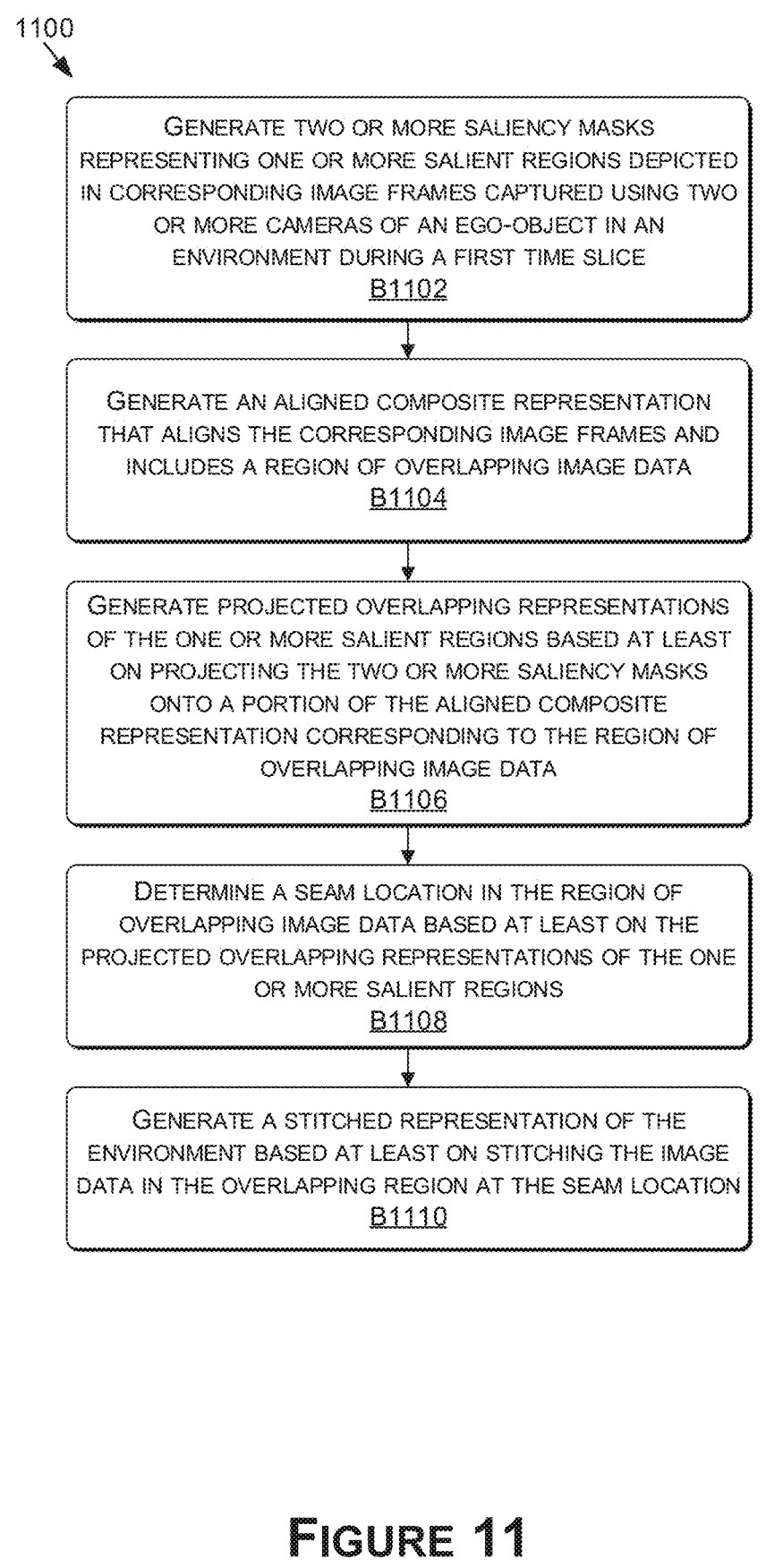

GENERATE TWO OR MORE SALIENCY MASKS REPRESENTING ONE OR MORE SALIENT REGIONS DEPICTED IN CORRESPONDING IMAGE FRAMES CAPTURED USING TWO OR MORE CAMERAS OF AN EGO-OBJECT IN AN ENVIRONMENT DURING A FIRST TIME SLICE
B1102

GENERATE AN ALIGNED COMPOSITE REPRESENTATION THAT ALIGNS THE CORRESPONDING IMAGE FRAMES AND INCLUDES A REGION OF OVERLAPPING IMAGE DATA
B1104

GENERATE PROJECTED OVERLAPPING REPRESENTATIONS OF THE ONE OR MORE SALIENT REGIONS BASED AT LEAST ON PROJECTING THE TWO OR MORE SALIENCY MASKS ONTO A PORTION OF THE ALIGNED COMPOSITE REPRESENTATION CORRESPONDING TO THE REGION OF OVERLAPPING IMAGE DATA
B1106

DETERMINE A SEAM LOCATION IN THE REGION OF OVERLAPPING IMAGE DATA BASED AT LEAST ON THE PROJECTED OVERLAPPING REPRESENTATIONS OF THE ONE OR MORE SALIENT REGIONS
B1108

GENERATE A STITCHED REPRESENTATION OF THE ENVIRONMENT BASED AT LEAST ON STITCHING THE IMAGE DATA IN THE OVERLAPPING REGION AT THE SEAM LOCATION
B1110

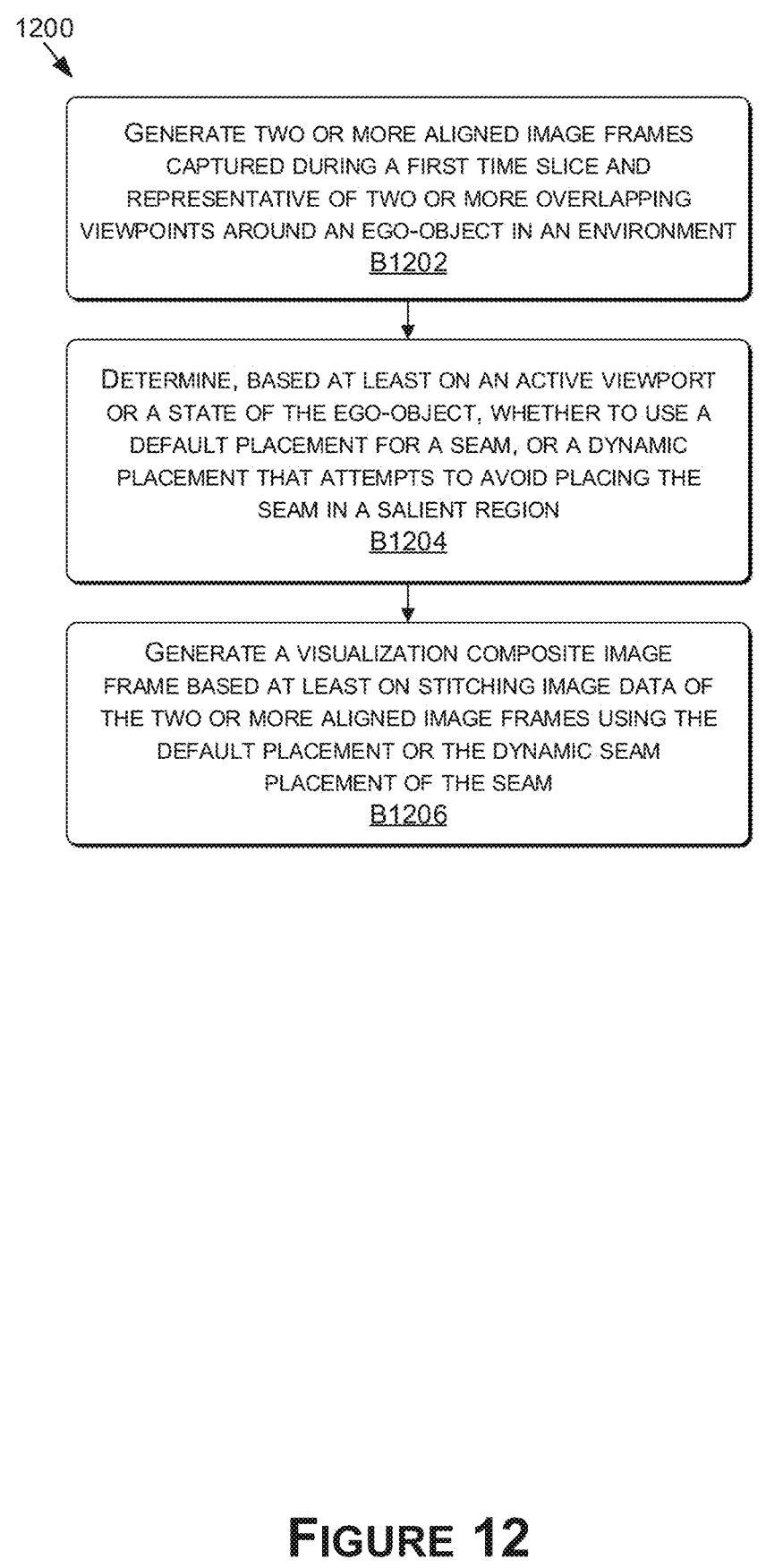

GENERATE TWO OR MORE ALIGNED IMAGE FRAMES
CAPTURED DURING A FIRST TIME SLICE AND
REPRESENTATIVE OF TWO OR MORE OVERLAPPING
VIEWPOINTS AROUND AN EGO-OBJECT IN AN ENVIRONMENT
B1202

DETERMINE, BASED AT LEAST ON AN ACTIVE VIEWPORT
OR A STATE OF THE EGO-OBJECT, WHETHER TO USE A
DEFAULT PLACEMENT FOR A SEAM, OR A DYNAMIC
PLACEMENT THAT ATTEMPTS TO AVOID PLACING THE
SEAM IN A SALIENT REGION
B1204

GENERATE A VISUALIZATION COMPOSITE IMAGE
FRAME BASED AT LEAST ON STITCHING IMAGE DATA OF
THE TWO OR MORE ALIGNED IMAGE FRAMES USING THE
DEFAULT PLACEMENT OR THE DYNAMIC SEAM
PLACEMENT OF THE SEAM
B1206

FIGURE 12

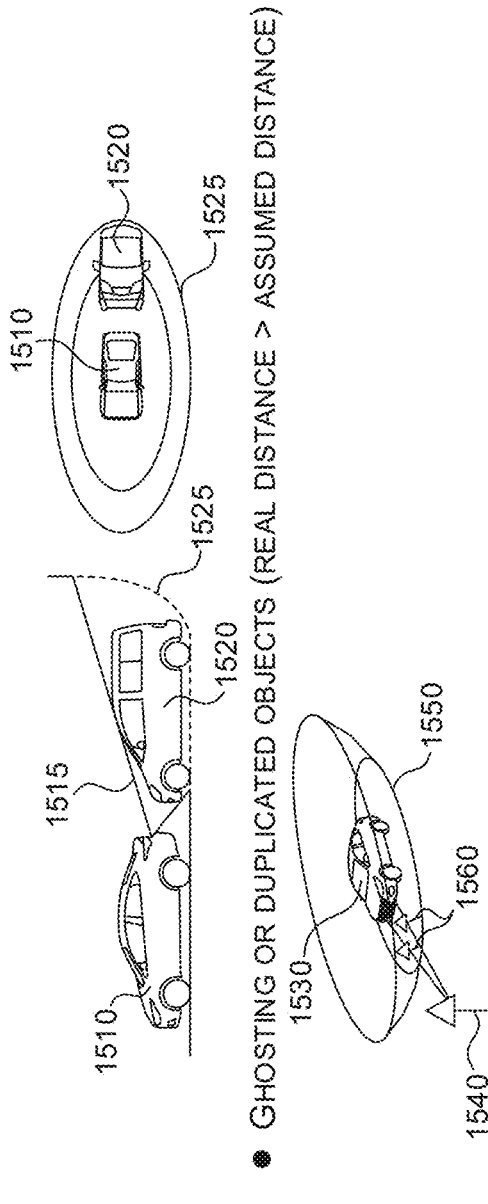
- SCALE MAGNIFICATION DUE TO DEPTH AMBIGUITY
1510   1520   1525   1515   1510
- GHOSTING OR DUPLICATED OBJECTS (REAL DISTANCE > ASSUMED DISTANCE)
1550   1530   1560   1540
- PARTIAL OR COMPLETE OBJECT DISAPPEARANCE (REAL DISTANCE < ASSUMED DISTANCE)
1570   1580   STITCHING BAND   STITCHING BAND   1570   1580
FIGURE 15

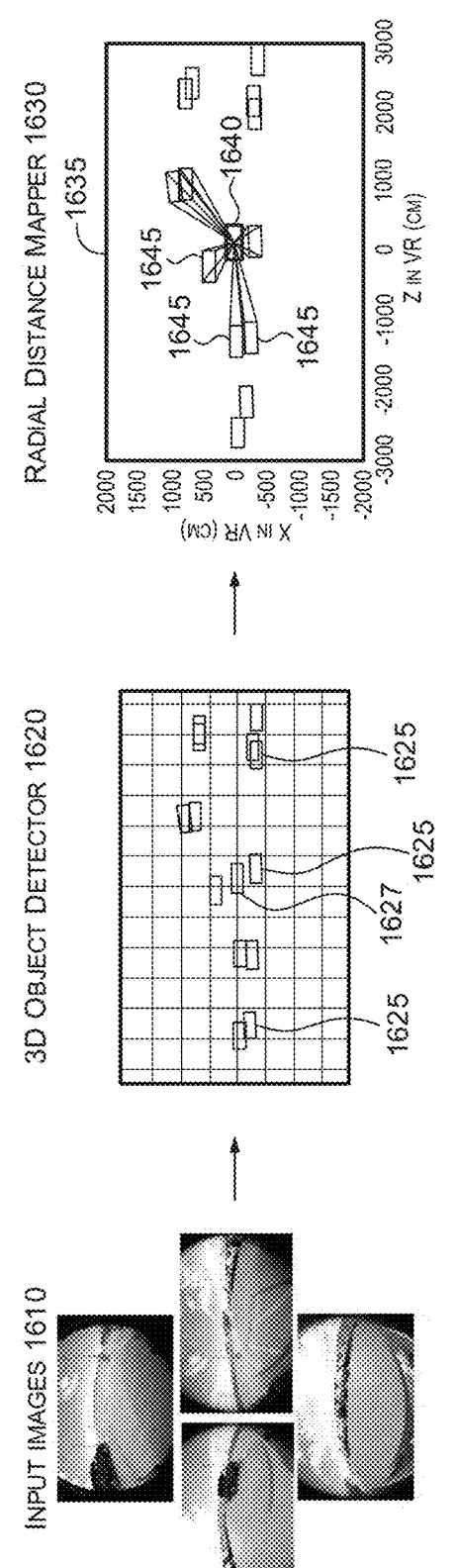
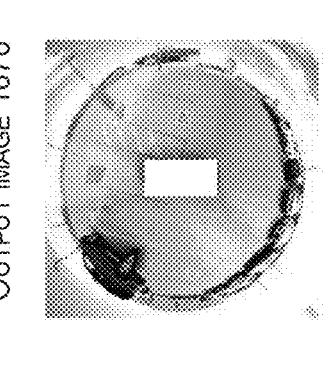
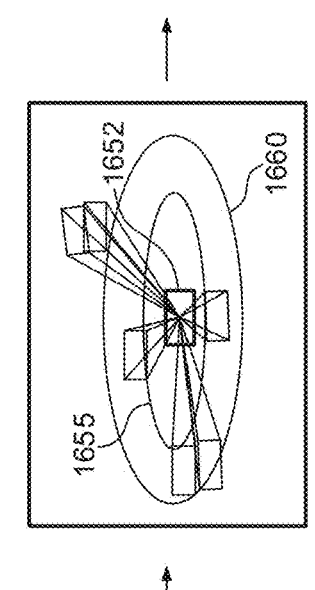
RADIAL DISTANCE MAPPER 1630
1635
1640
1645
1645
1645
1645
Z IN VR (CM)
X IN VR (CM)
3D OBJECT DETECTOR 1620
1625
1625
1627
1627
1625
1625
OUTPUT IMAGE 1670
INPUT IMAGES 1610
3D BOWL PARAMETER CONTROLLER 1650
1652
1660
1655
FIGURE 16
1600

Figure 19:
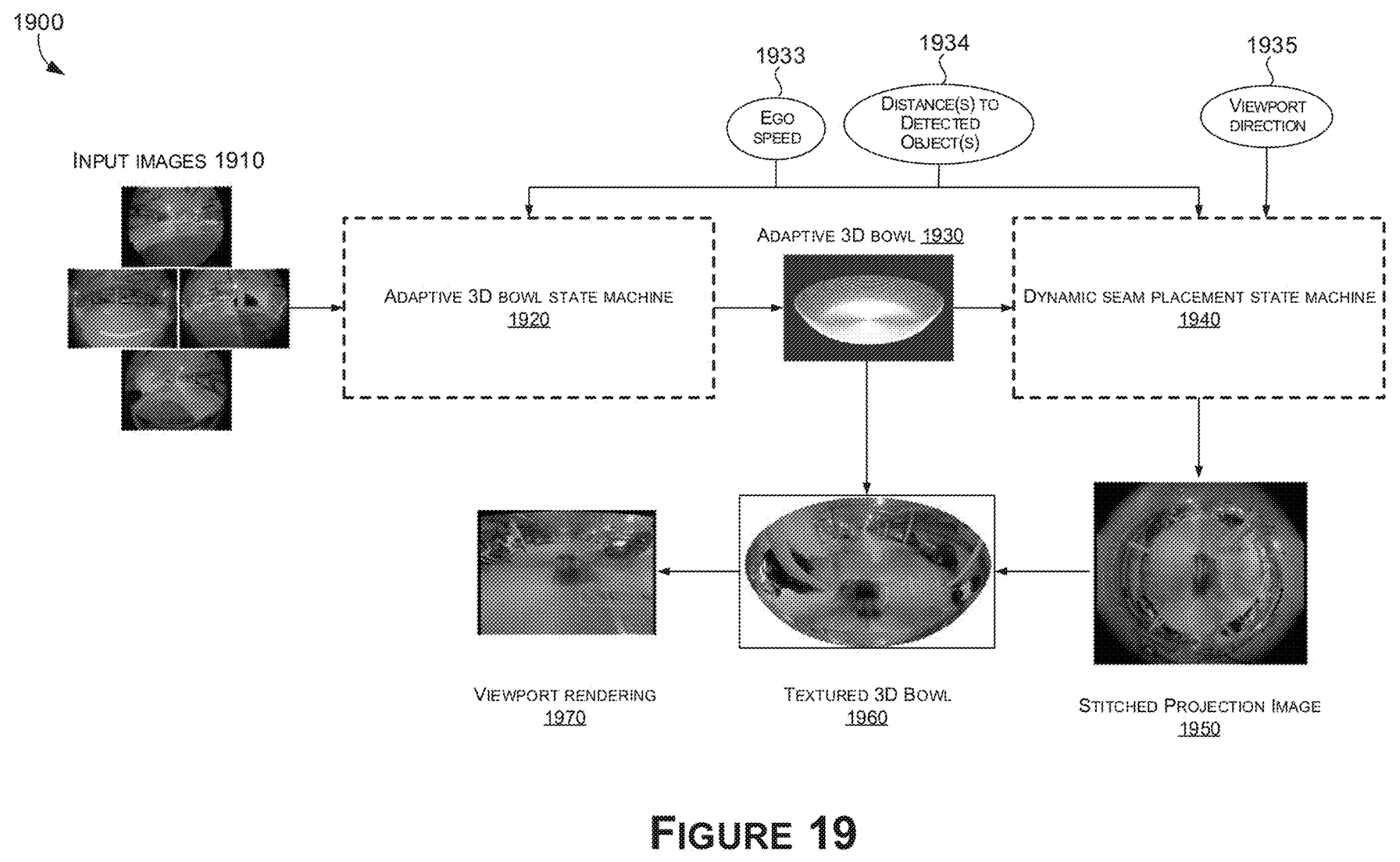

1935 VIEWPORT DIRECTION

1934 DISTANCE(S) TO DETECTED OBJECT(S)

1933 EGO SPEED

DYNAMIC SEAM PLACEMENT STATE MACHINE 1940

ADAPTIVE 3D BOWL 1930

ADAPTIVE 3D BOWL STATE MACHINE 1920

INPUT IMAGES 1910

STITCHED PROJECTION IMAGE 1950

TEXTURED 3D BOWL 1960

VIEWPORT RENDERING 1970

FIXED 3D BOWL    2010
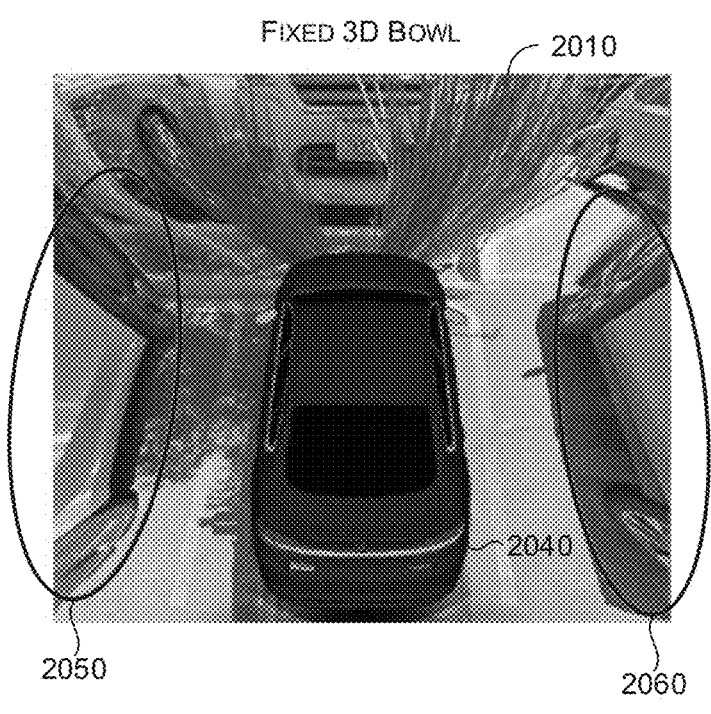
2050    2040    2060
ADAPTIVE 3D BOWL    2020
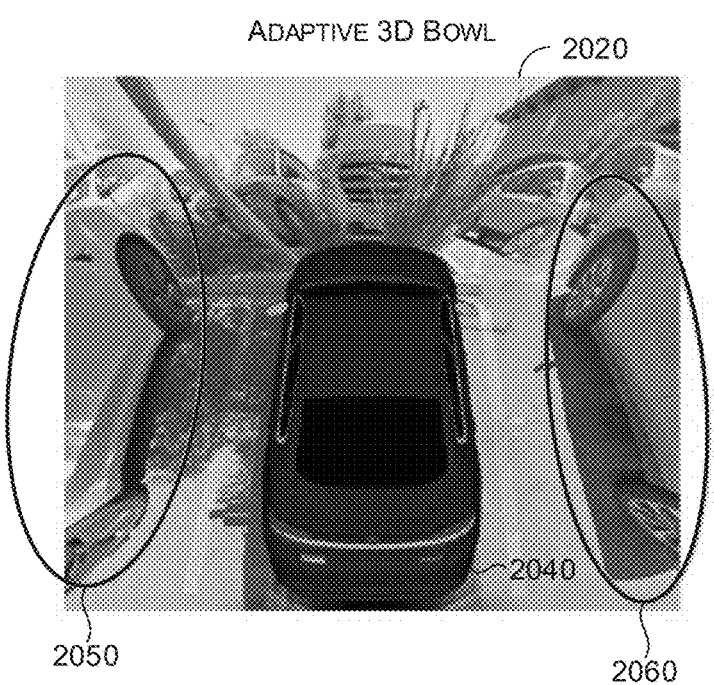
2050    2040    2060
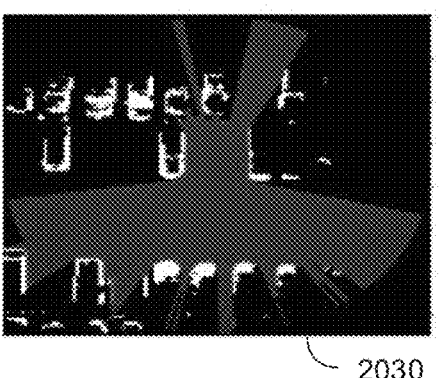
2030
FIGURE 20

2100

DETERMINE A DISTANCE FROM AN EGO-OBJECT TO
A DETECTED OBJECT IN AN ENVIRONMENT
B2110

GENERATE AN ADAPTIVE THREE-DIMENSIONAL (3D) BOWL
THAT MODELS THE ENVIRONMENT WITH A SHAPE BASED AT
LEAST ON THE DISTANCE TO THE DETECTED OBJECT
B2120

GENERATE A SURROUND VIEW VISUALIZATION OF
THE ENVIRONMENT BASED AT LEAST ON THE ADAPTIVE
3D BOWL
B2130

2200

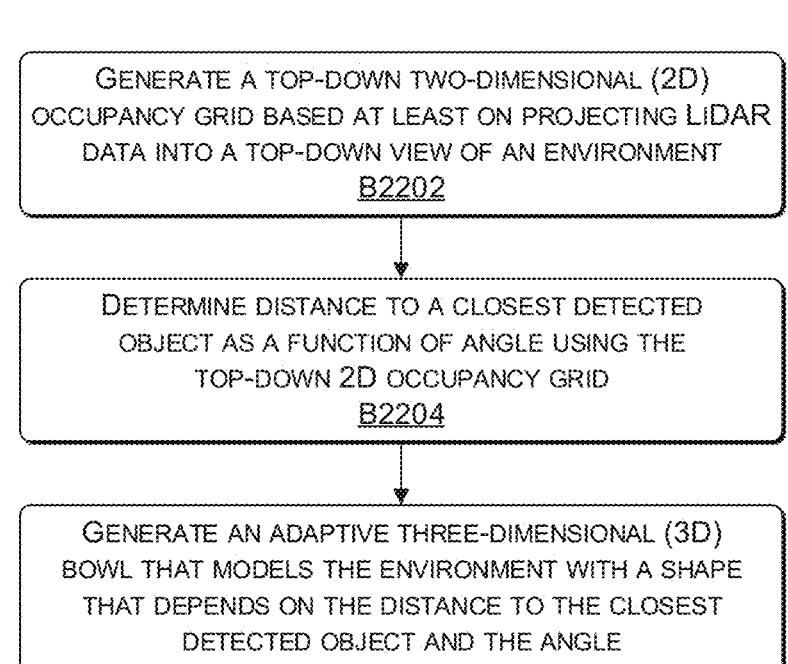

GENERATE A TOP-DOWN TWO-DIMENSIONAL (2D) OCCUPANCY GRID BASED AT LEAST ON PROJECTING LiDAR DATA INTO A TOP-DOWN VIEW OF AN ENVIRONMENT
B2202

DETERMINE DISTANCE TO A CLOSEST DETECTED OBJECT AS A FUNCTION OF ANGLE USING THE TOP-DOWN 2D OCCUPANCY GRID
B2204

GENERATE AN ADAPTIVE THREE-DIMENSIONAL (3D) BOWL THAT MODELS THE ENVIRONMENT WITH A SHAPE THAT DEPENDS ON THE DISTANCE TO THE CLOSEST DETECTED OBJECT AND THE ANGLE
B2206

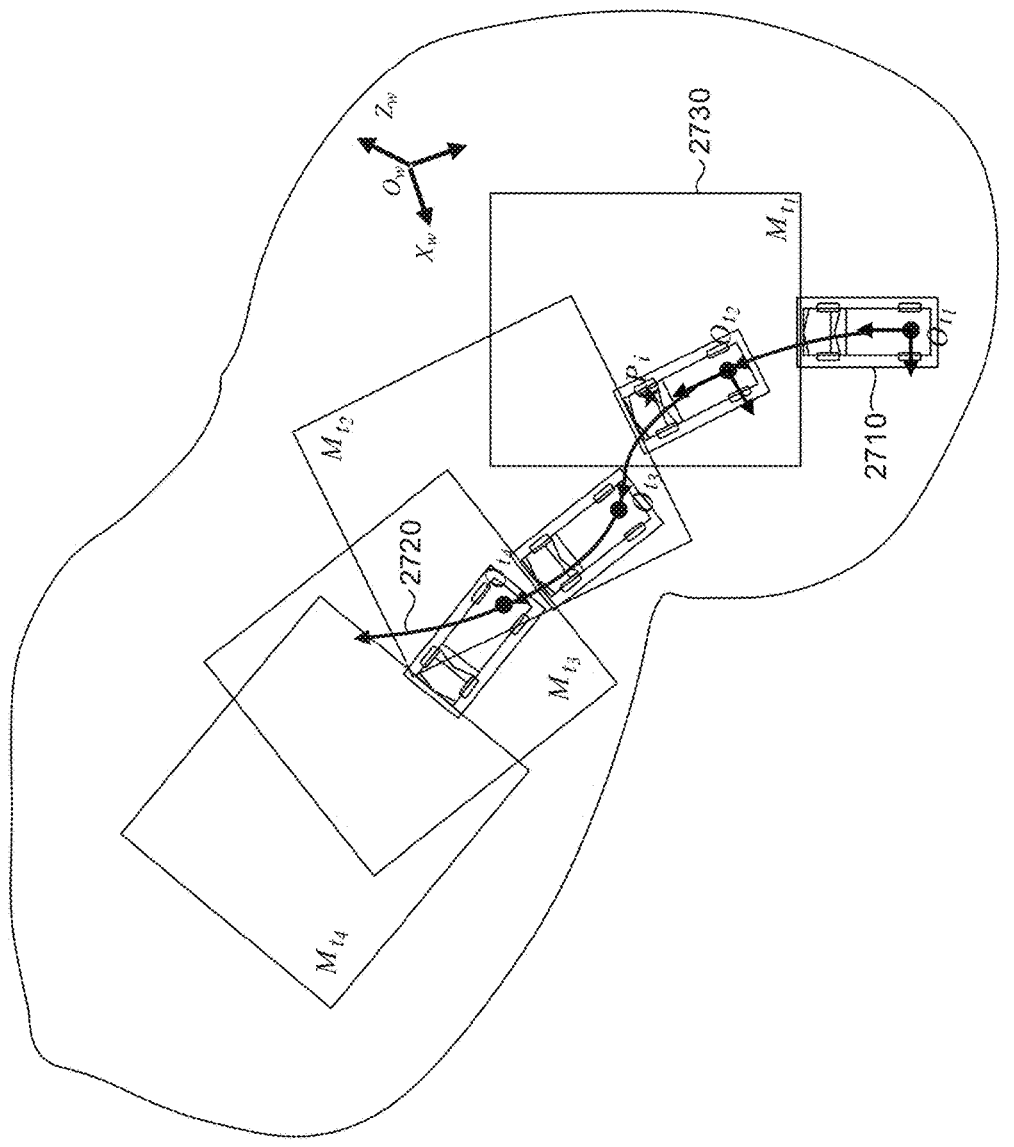
FIGURE 27

2810d

2810a

2820

2810c

2840

2830

2810b

2800

3000

GENERATE, USING IMAGE DATA GENERATED USING ONE OR MORE CAMERAS OF AN EGO-OBJECT DURING A FIRST TIME SLICE, A LOCAL MAP REPRESENTING AN OBSERVED PORTION OF A GROUND PLANE OF AN ENVIRONMENT SURROUNDING THE EGO-OBJECT
B3002

UPDATE A REPRESENTATION OF THE GROUND PLANE BASED AT LEAST ON THE LOCAL MAP
B3004

VIRTUALLY RECONSTRUCT AN AREA OF THE GROUND PLANE UNDER THE EGO-OBJECT DURING THE FIRST TIME SLICE BASED AT LEAST ON RETRIEVING A CORRESPONDING PORTION OF THE REPRESENTATION OF THE GROUND PLANE
B3006

MERGE, INTO A REPRESENTATION OF THE GROUND PLANE REPRESENTING PORTIONS OF THE GROUND PLANE OBSERVED BY ONE OR MORE SENSORS OF AN EGO-OBJECT, A LOCAL MAP REPRESENTING A PORTION OF THE GROUND PLANE OBSERVED BY THE ONE OR MORE SENSORS DURING A FIRST TIME SLICE
B3102

VIRTUALLY RECONSTRUCT AN AREA OF THE GROUND PLANE UNDER THE EGO-OBJECT DURING THE FIRST TIME SLICE BASED AT LEAST ON RETRIEVING A CORRESPONDING PORTION OF THE REPRESENTATION OF THE GROUND PLANE
B3104

ISSUE A REMOTE COMMAND TO AN EGO-OBJECT IN A
PHYSICAL ENVIRONMENT FROM A REMOTE DEVICE IN A
REMOTE LOCATION OUTSIDE THE PHYSICAL ENVIRONMENT
B3402

RECEIVE, FROM THE EGO-OBJECT, BY THE REMOTE
DEVICE, A STREAM OF REPRESENTATIONS OF THE
PHYSICAL ENVIRONMENT THAT WERE GENERATED BY THE
EGO-OBJECT BASED AT LEAST ON THE REMOTE COMMAND
B3404

CAUSE THE REMOTE DEVICE TO PRESENT A
VISUALIZATION OF THE REPRESENTATIONS OF THE
PHYSICAL ENVIRONMENT
B3406

IMAGE STITCHING WITH AN ADAPTIVE THREE-DIMENSIONAL BOWL MODEL OF THE SURROUNDING ENVIRONMENT FOR SURROUND VIEW VISUALIZATION

CROSS-REFERENCE TO RELATED APPLICATIONS

This application claims the benefit of U.S. Provisional Application No. 63/326,724, filed on Apr. 1, 2022, the contents of which are incorporated by reference in their entirety. This application is related to U.S. application Ser. No. 18/173,589, entitled "Image Stitching with Dynamic Seam Placement based on Object Saliency for Surround View Visualization," filed on Feb. 23, 2023; U.S. application Ser. No. 18/173,603, entitled "Image Stitching with Dynamic Seam Placement based on Ego-Vehicle State for Surround View Visualization," filed on Feb. 23, 2023; U.S. application Ser. No. 18/173,615, entitled "Under Vehicle Reconstruction for Vehicle Environment Visualization," filed on Feb. 23, 2023; and U.S. application Ser. No. 18/173,630, entitled "Optimized Visualization Streaming for Vehicle Environment Visualization," filed on Feb. 23, 2023.

BACKGROUND

Vehicle Surround View Systems provide occupants of a vehicle with a visualization of the area surrounding the vehicle. For drivers, Surround View Systems provide the driver with the ability to view the surrounding area, including blind spots where the driver's line of sight is occluded by parts of the vehicle or other objects in the environment, without the need to reposition (e.g., turn their head, get off the driver's seat, lean a certain direction, etc.). This visualization may assist and facilitate a variety of driving maneuvers, such as smoothly entering or exiting a parking spot without hitting vulnerable road users like pedestrians or objects such as a road curb or other vehicles. More and more vehicles, especially luxury brands or new models, are being produced with Surround View Systems equipped.

Existing vehicle Surround View Systems usually utilize fisheye cameras—typically mounted at the front, left, rear and right sides of the vehicle body—to perceive the surrounding area from multiple directions. Additional cameras may be included in special cases, like for long trucks or vehicles with trailers. Frames from the individual cameras are stitched together using camera parameters to align frames and blending techniques to combine overlapping regions to provide a horizontal 360° surround view visualization.

Due to noise or various white balance configurations, a noticeable seam may appear where two images are stitched together. Although various mitigation measures may be used to smooth out the transition of image pixel values from one image to another (e.g., assigning pixel weight proportional to its distance to the edge, multiresolution based blending, neural network based blending), a noticeable seam is often still visible in a stitched image. Some conventional techniques attempt to avoid placing seams on top of objects detected using ultrasonic sensors. However, ultrasonic sensors typically operate over a very short range. As a result, conventional techniques only consider very close objects when placing seams, effectively ignoring potentially important objects outside the ultrasonic sensing range, or prioritizing less important objects within the ultrasonic sensing range, and placing seams over regions of a stitched image that are potentially important for a driver to safely maneuver a vehicle.

Unfortunately, the process of stitching images may introduce a variety of artifacts, including geometric distortions (e.g., misalignments), texture distortions (e.g., blur, ghosting, object disappearance, object distortions), and color distortions. Distortion in a stitched image may be caused by a variety of issues, including the parallax effect, lens distortion, moving objects, and differences in exposure or illumination. For example, in some cases, capturing multiple images of a moving object using multiple cameras may in effect capture images of the object from different perspectives, such that different images may capture the object with different orientations or poses. Since the different representations of the object may not perfectly align when stitching images, an overlapping region may effectively combine images of the object and the background, creating a ghost-like effect that may appear in two locations. Some objects may even disappear from the stitched image. Since these stitching artifacts may obscure useful visual information and can be distracting to the driver, stitching artifacts can interfere with the safe operation of the vehicle. As a result, there is a need for improved stitching techniques that reduce stitching artifacts, better represent useful visual information in a stitched image, and/or otherwise improve the visual quality of stitched images.

Moreover, in some existing Surround View Systems, two-dimensional (2D) images are used to approximate a three-dimensional (3D) visual representation of the environment surrounding the vehicle. For a given fisheye image, for example, each pixel captures a ray emitting from a surrounding 3D point projecting into the center of the fisheye camera and imaging into the camera sensor, which captures intensity, color, and orientation of the 3D point. However, the distance between the point and the camera center is lost in the projection process. The 3D point may be anywhere along the ray defined by the camera center and the point on the sensor where the ray lands. Reconstructing this distance, for example using LiDAR data or Structure from Motion (SfM) is computationally expensive and often impractical. As a result, some Surround View Systems model the geometry of the environment surrounding the vehicle as a statically shaped and sized 3D bowl shape comprising a circular ground plane for the inner portion of the bowl connected to an outer bowl represented as a curved surface rising from the ground plane to a height or with a slope that increases proportionally to the distance from the bowl center. As such, some conventional systems project images onto this 3D bowl shape, render a view of the projected image data on the 3D bowl shape from the perspective of a virtual camera, and present the rendered view on a monitor visible to occupants (e.g., driver) of the vehicle.

However, conventional techniques that rely on this 3D bowl geometry have a variety of drawbacks. Generally, since this geometry is just a model, depth in the real world often does not match the assumed geometry, resulting in a variety of visual artifacts. For example, if a camera captures an object that is closer to the vehicle than the side of the bowl (e.g., inside the bowl), projecting the image of the object onto the side of the bowl creates a scale magnification since the depth is incorrect. Captured objects that are between the different regions of the bowls can also result in visualizations with significant distortions. In some cases, objects that are inside the bowl may be partially or completely lost during the projection process, leading to partial or complete object disappearance. If multiple cameras pick up an object that is farther away than the side of the bowl (e.g., outside the bowl), projecting these images onto the side of the bowl can lead to ghosting or duplication. Since these artifacts may obscure or omit useful visual information and are often distracting to the driver, the artifacts can interfere with the safe operation of the vehicle. As a result, there is a need for improved visualization techniques that reduce visual artifacts, better represent useful visual information in a stitched image, and/or otherwise improve the visual quality of stitched images.

Furthermore, existing Surround View Systems typically do not incorporate frames from cameras under the vehicle, due to the difficulty of keeping a camera lens clean or an insufficient field of view coverage. As a result, existing vehicle Surround View Systems can only visualize front, left, rear, and right sides of a vehicle, leaving a significant blind spot: the area under the vehicle, which may be multiple square meters or more. Conventional techniques either do not include a visualization under the vehicle, or fill the area with artificial pixels, for example, using pure black to demonstrate that information is missing, or using a computer graphic 3D model of the vehicle. However, this under vehicle area is important for perception in many cases, such as: precisely maneuvering in a controlled manner in and out of narrow parking spaces or areas with high curbs, passing over speed bumps or potholes, avoiding objects on the road, driving off-road over rocks or rough terrain, and/or other scenarios. As such, conventional vehicle Surround View Systems are incapable of providing visual information that is beneficial for many driving maneuvers.

Finally, existing Surround View Systems are typically limited to capturing local sensor data and presenting a representation of the sensor data to occupants of the vehicle (e.g., the driver). As communication and network technology advances, there is a growing need to facilitate various remote experiences and functionality.

SUMMARY

Embodiments of the present disclosure relate to surround view or environment visualization, dynamic seam placement based on object saliency, dynamic seam placement based ego-object state, an adaptive 3D bowl that models the surrounding environment with a shape that depends on distance and direction to detected objects, reconstruction of the area under an ego-object, and/or streaming a representation of an environment in and around an ego-object.

In contrast to conventional systems, such as those described above, dynamic seam placement may be used to position seams in regions of overlapping image data to avoid crossing salient objects or regions. Objects may be detected from image frames representing overlapping views of an environment surrounding an ego-object such as a vehicle. The images may be aligned to create an aligned composite image or surface (e.g., a panorama, a 360° image, bowl shaped surface) with overlapping regions of image data, and a representation of the detected objects and/or salient regions (e.g., a saliency mask) may be generated and projected onto the aligned composite image or surface. Seams may be positioned in the overlapping regions to avoid or minimize crossing salient pixels represented in the projected masks, and the image data may be blended at the seams to create a stitched image or surface (e.g., a stitched panorama, stitched 360° image, stitched textured surface).

In some embodiments, a state machine is used to select between a default seam placement or dynamic seam placement that avoids salient regions, and to enable and disable dynamic seam placement based on speed of ego-motion, direction of ego-motion, proximity to salient objects, active viewport, driver gaze, and/or other factors. Images representing overlapping views of an environment may be aligned to create an aligned composite image or surface (e.g., a panorama, a 360° image, bowl shaped surface) with overlapping regions of image data, and a default or dynamic seam placement may be selected based on driving scenario (e.g., driving direction, speed, proximity to nearby objects). As such, seams may be positioned in the overlapping regions of image data, and the image data may be blended at the seams to create a stitched image or surface (e.g., a stitched panorama, stitched 360° image, stitched textured surface).

In some embodiments, an environment surrounding an ego-object is visualized using an adaptive 3D bowl that models the environment with a shape that changes based on distance (and direction) to detected objects. Distance (and direction) to detected objects may be determined using 3D object detection or a top-down 2D or 3D occupancy grid, and used to adapt the shape of the adaptive 3D bowl in various ways (e.g., by sizing its ground plane to fit within the distance to the closest detected object). The adaptive 3D bowl may be enabled or disabled during each time slice (e.g., based on ego-speed), and the 3D bowl for each time slice may be used to render a visualization of the environment (e.g., a top-down projection image, a textured 3D bowl, and/or a rendered view thereof).

In some embodiments, cached sensor data captured by an ego-object and ego-motion of the ego-object are used to reconstruct the area under the vehicle in real time. For example, image data captured over time by a vehicle may be cached into a composite map that visualizes the ground or drivable area, and the vehicle's ego-motion may be used to retrieve a region of the composite map corresponding to the under vehicle area. For each time slice, a newly captured or generated image representing that time slice may be used to generate a local map of an observed portion of the ground, and the local map may be merged with a composite map that represents previously observed local maps. Accordingly, the under vehicle area for that time slice may be reconstructed by retrieving corresponding pixels from the composite map using the vehicle's ego-motion.

In some embodiments, sensor data may be captured by sensors of an ego-object, such as a vehicle traveling in a physical environment, and a representation of the sensor data may be streamed from the ego-object to a remote location to facilitate various remote experiences, such as streaming to a remote viewer (e.g., a friend or relative), streaming to a remote or fleet operator, streaming to a mobile app configured to self-park or summon an ego-object, rendering a 3D augmented reality (AR) or virtual reality (VR) representation of the physical environment, and/or others. In some embodiments, the stream includes one or more command channels used to control data collection, rendering, stream content, or even vehicle maneuvers, such as during an emergency, self-park, or summon scenario

BRIEF DESCRIPTION OF THE DRAWINGS

The present systems and methods for surround view or environment visualization are described in detail below with reference to the attached drawing figures, wherein:

FIGS. 2A and 2B illustrate an example of image stitching, in accordance with some embodiments of the present disclosure;

Dynamic Seam Placement and State-Dependent Image Stitching

Figure 4A:
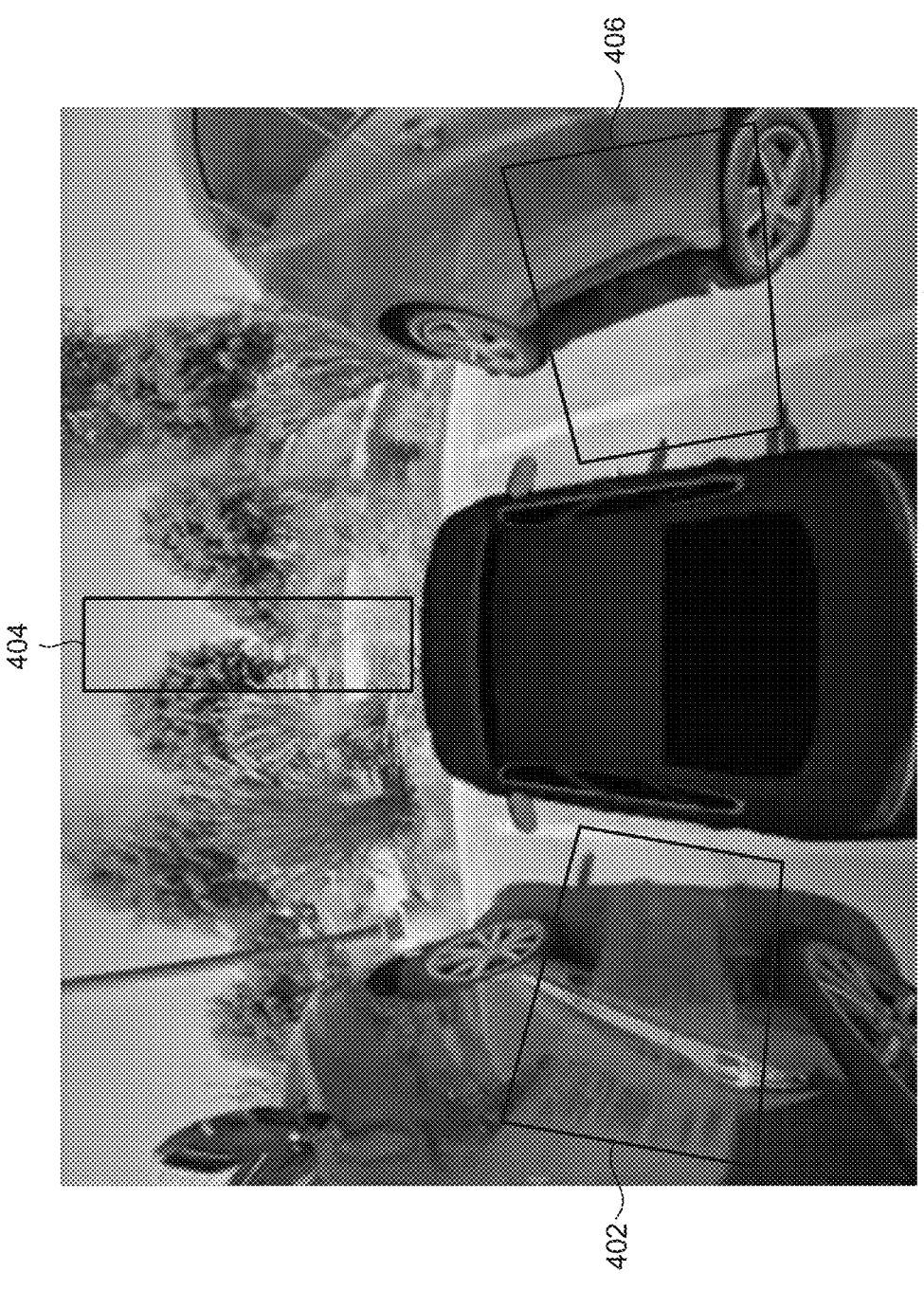
Figure 4C:
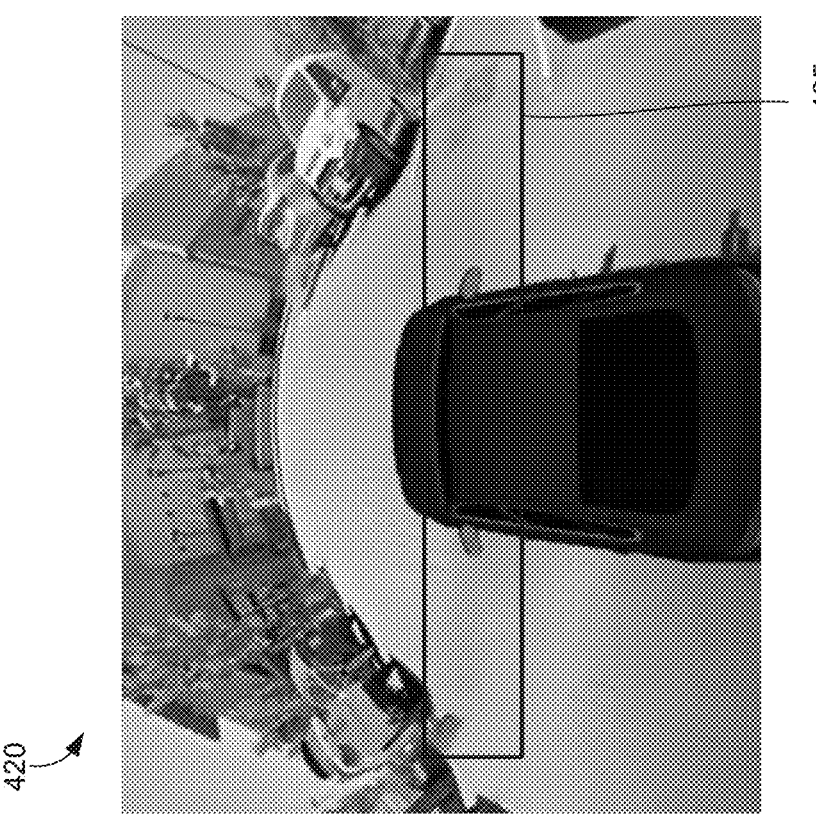
Figure 4B:
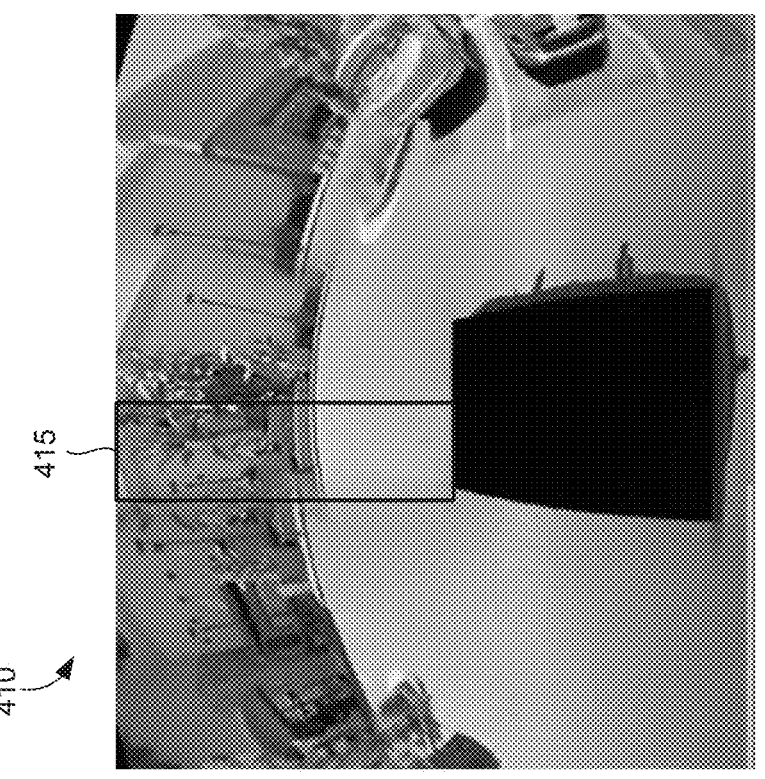
Figure 4F:
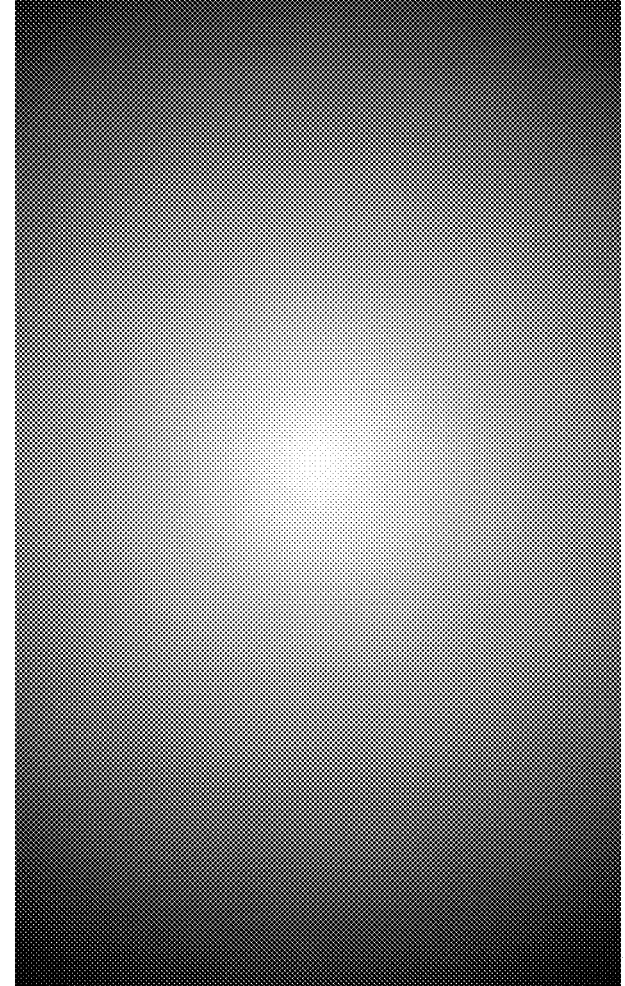
Figure 6:
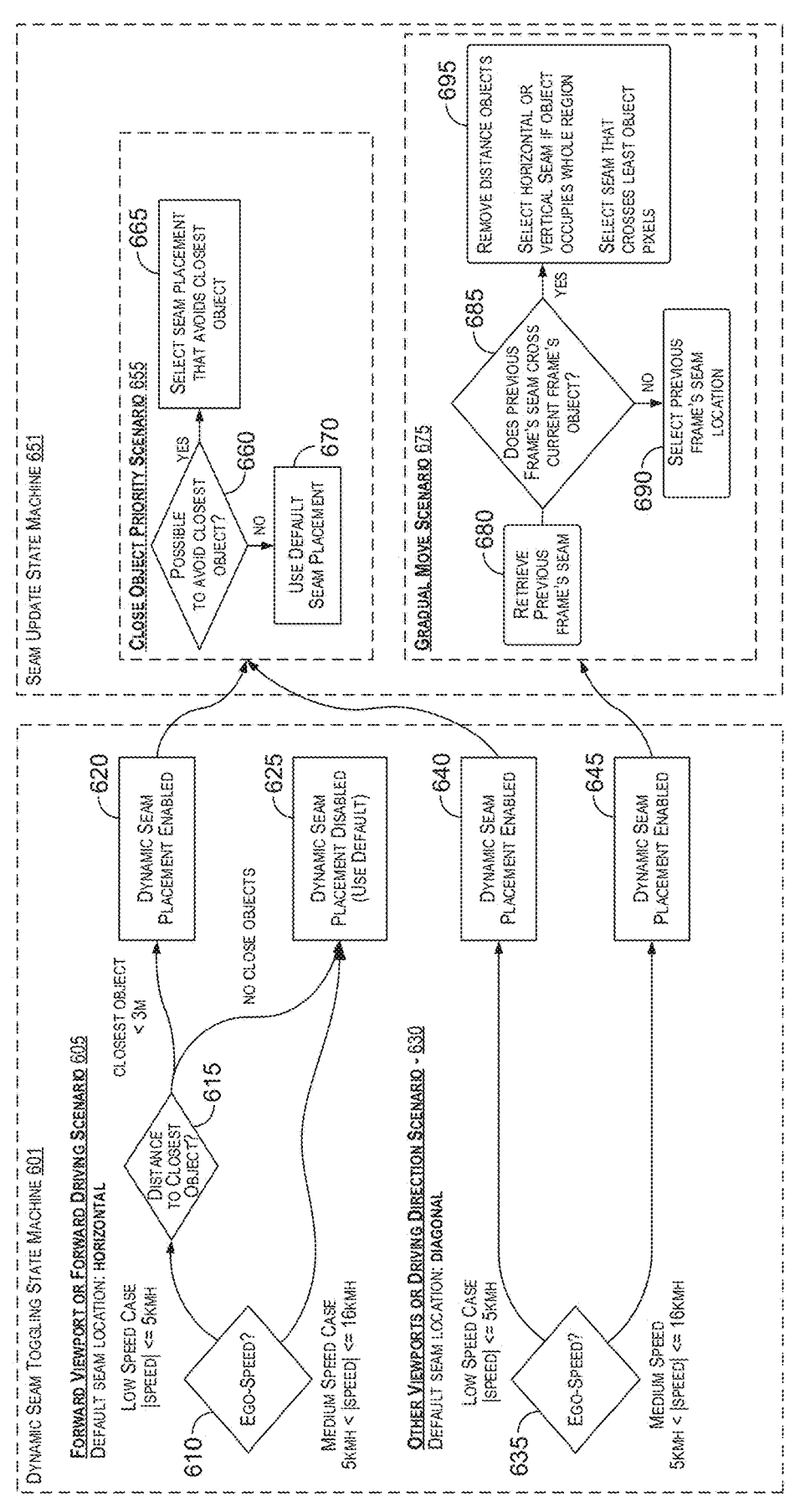
Figure 7A:
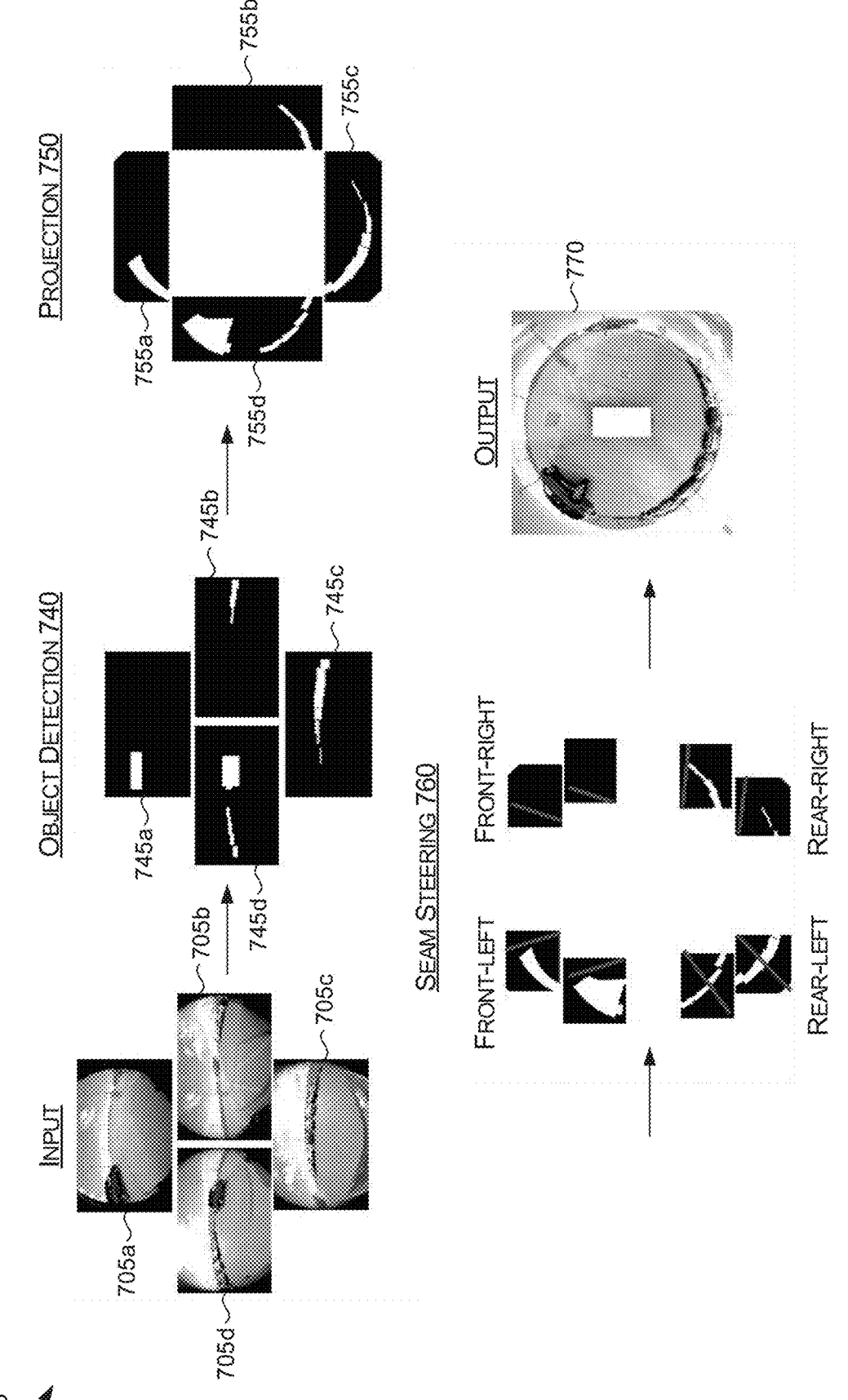
Figure 7B:
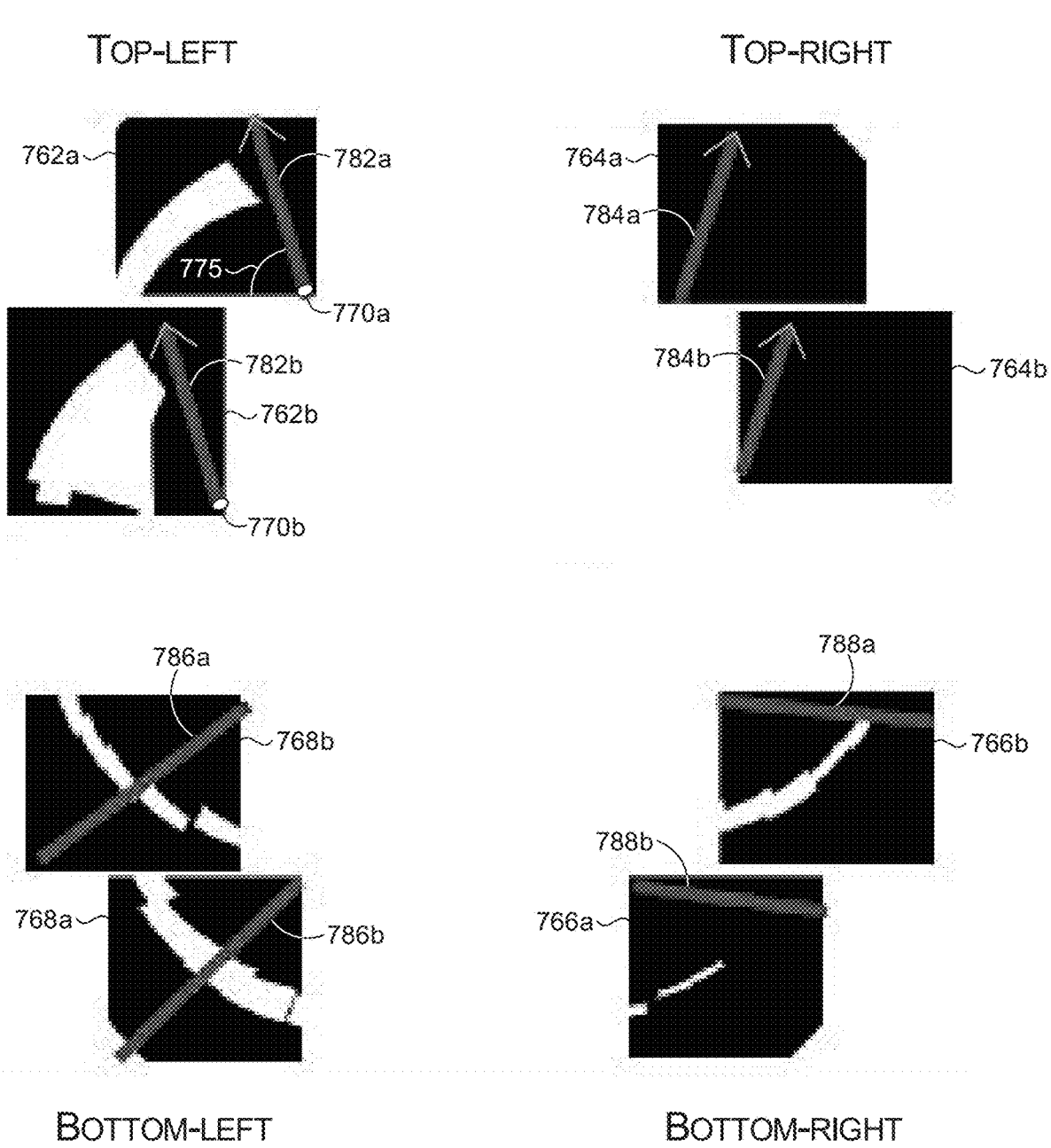
Figure 8A:
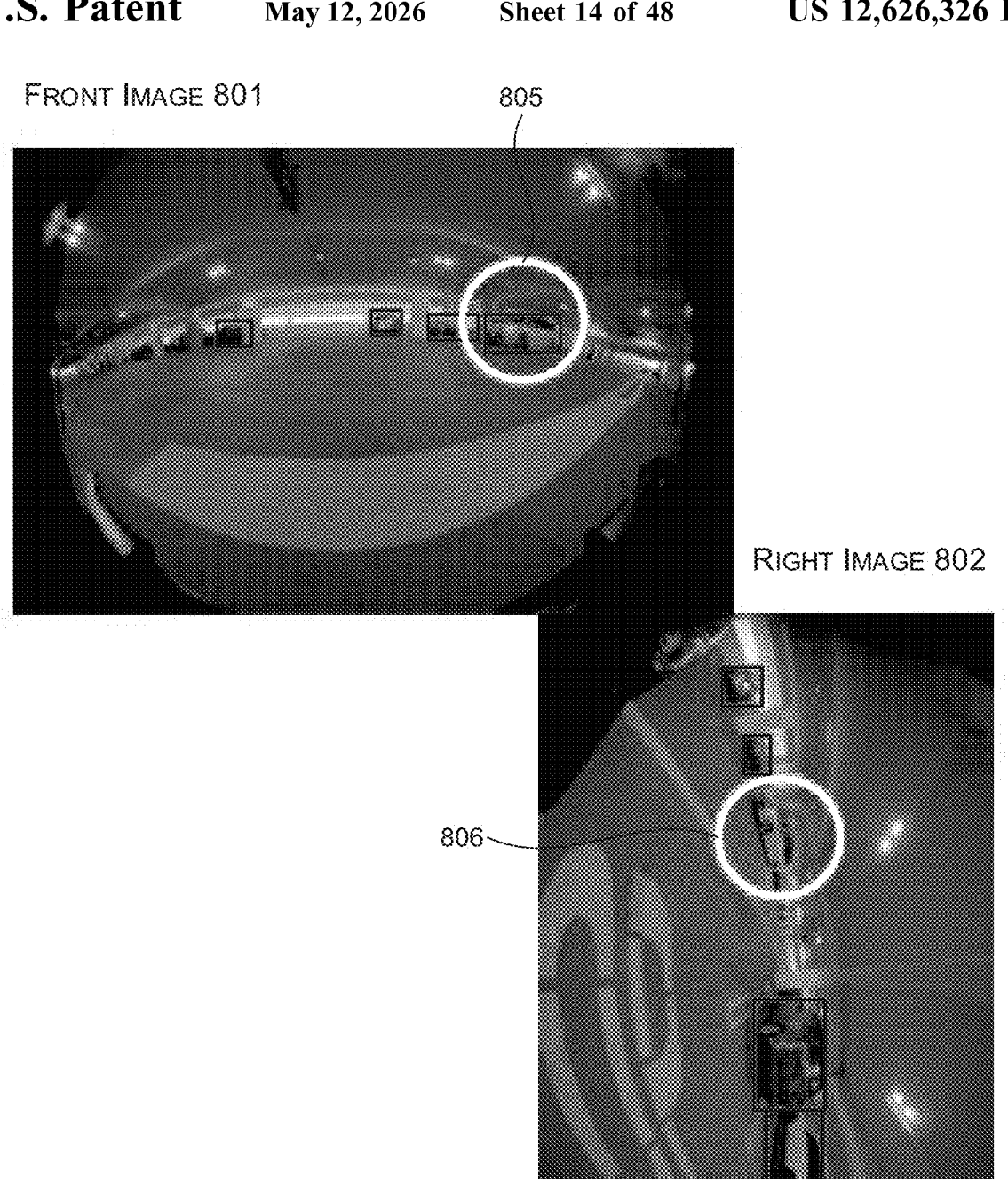
Figure 8B:
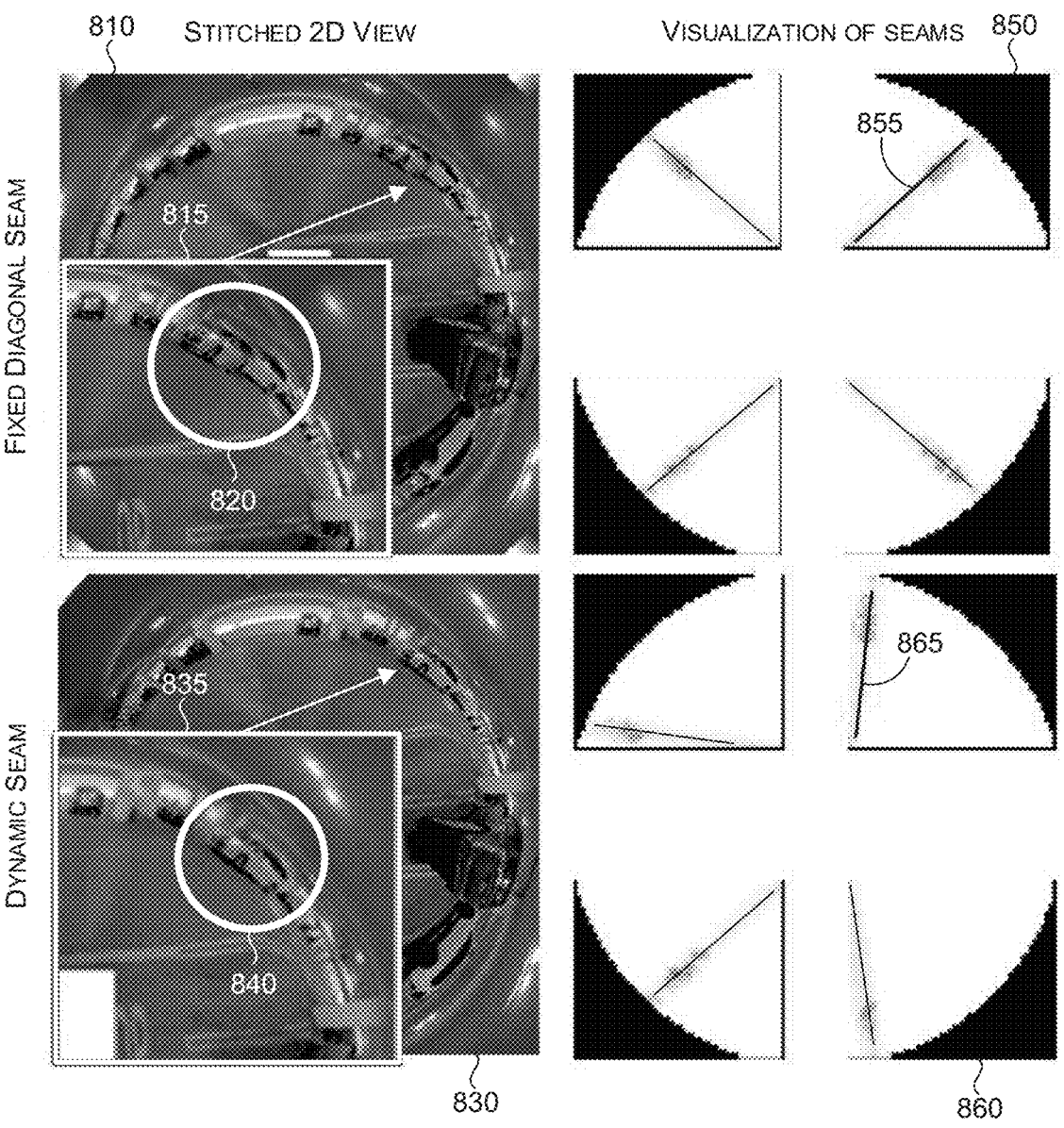
Figure 9:
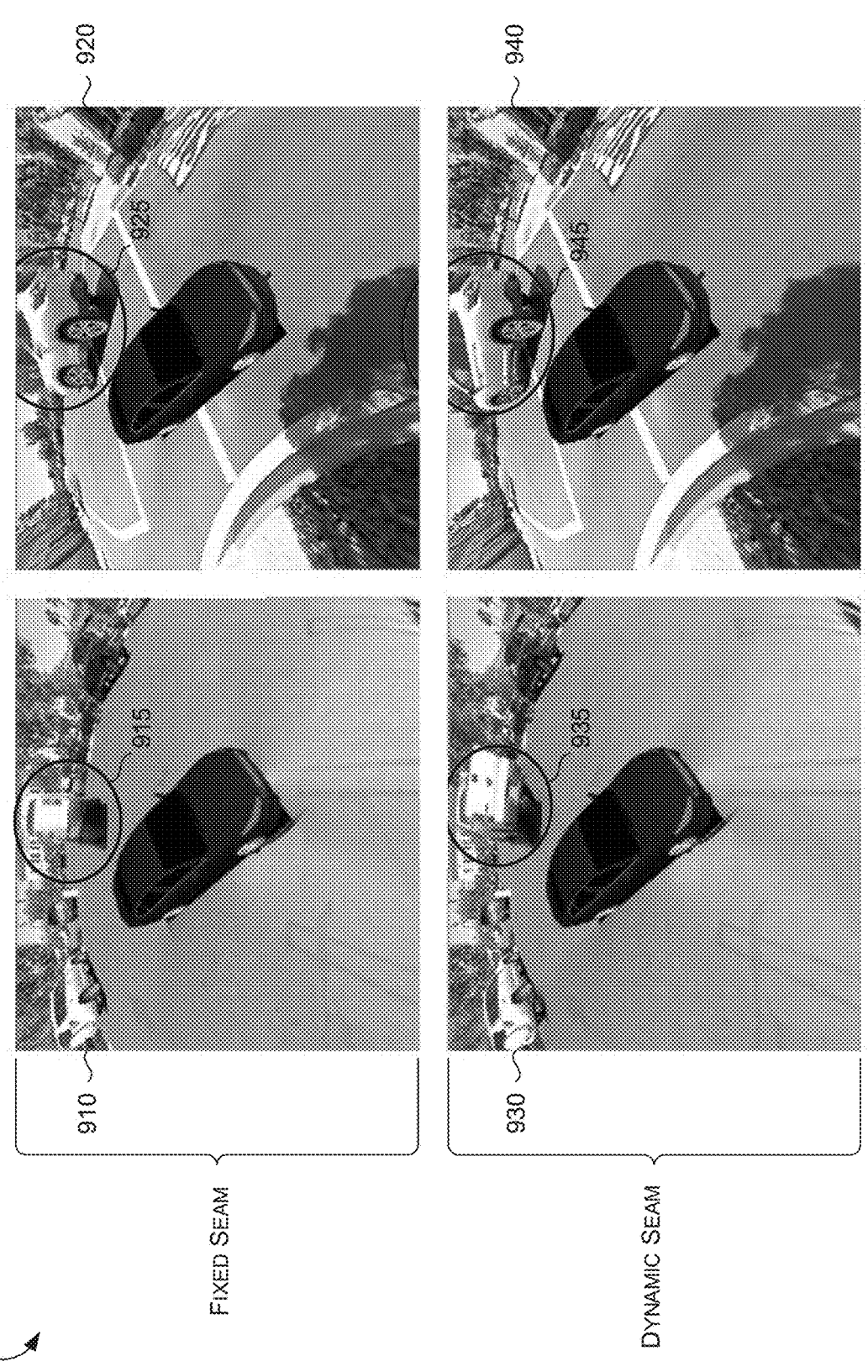

FIG. 4A is an example surround view visualization with a seam placed vertically to avoid cutting surrounding cars, FIG. 4B is an example surround view visualization with a seam extending vertically along the left surface of a vehicle, FIG. 4C is an example surround view visualization with a seam extending horizontally from the side surfaces of a vehicle to avoid artifacts in front of the vehicle, FIG. 4D is an example surround view visualization updated with a backwards facing viewport based on a vehicle traveling in reverse, FIG. 4E illustrates example surround view visualizations with seams placed to avoid salient regions in various viewports, and FIG. 4F is an example viewport cost map, in accordance with some embodiments of the present disclosure;

FIG. 5 is an example dynamic seam stitching module, in accordance with some embodiments of the present disclosure;

FIG. 6 is an example dynamic seam placement state machine, in accordance with some embodiments of the present disclosure;

FIG. 7A is a diagram illustrating an example dynamic seam placement technique using object detection, mask projection, and seem steering, and FIG. 7B is an enlarged view of the overlapping mask projections shown in FIG. 7A, in accordance with some embodiments of the present disclosure;

FIGS. 8A and 8B are example images and surround view visualizations with and without dynamic seam placement, in accordance with some embodiments of the present disclosure;

FIG. 9 shows example surround view visualizations with and without dynamic seam placement, in accordance with some embodiments of the present disclosure;

FIG. 10 is a flow diagram showing a method for determining a position for a seam using projected masks, in accordance with some embodiments of the present disclosure;

FIG. 11 is a flow diagram showing a method for determining a position for a seam based at least on projected overlapping representations of one or more salient regions, in accordance with some embodiments of the present disclosure;

FIG. 12 is a flow diagram showing a method for determining whether to use a default placement or a dynamic placement for a seam, in accordance with some embodiments of the present disclosure;

Adaptive 3D Bowl Model of the Surrounding Environment

Figure 13:
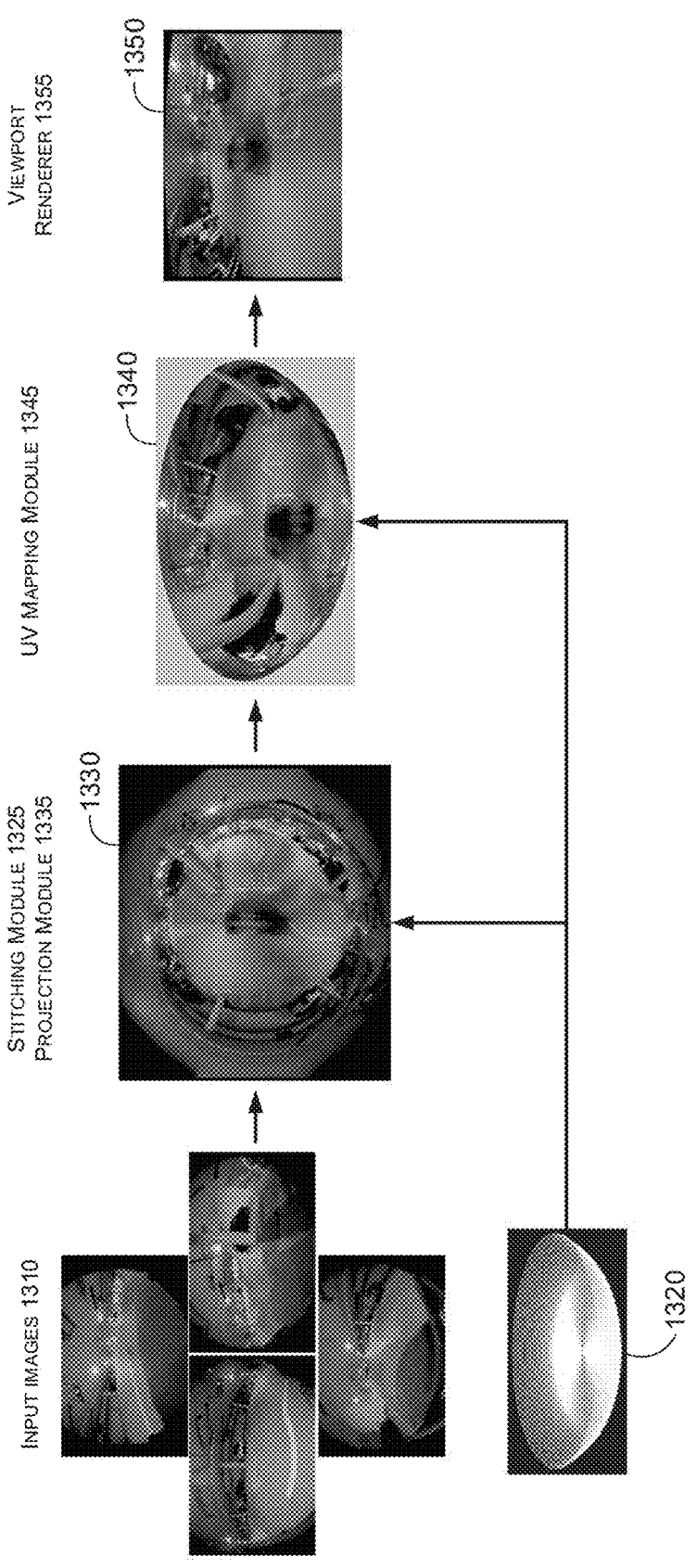
Figure 14:
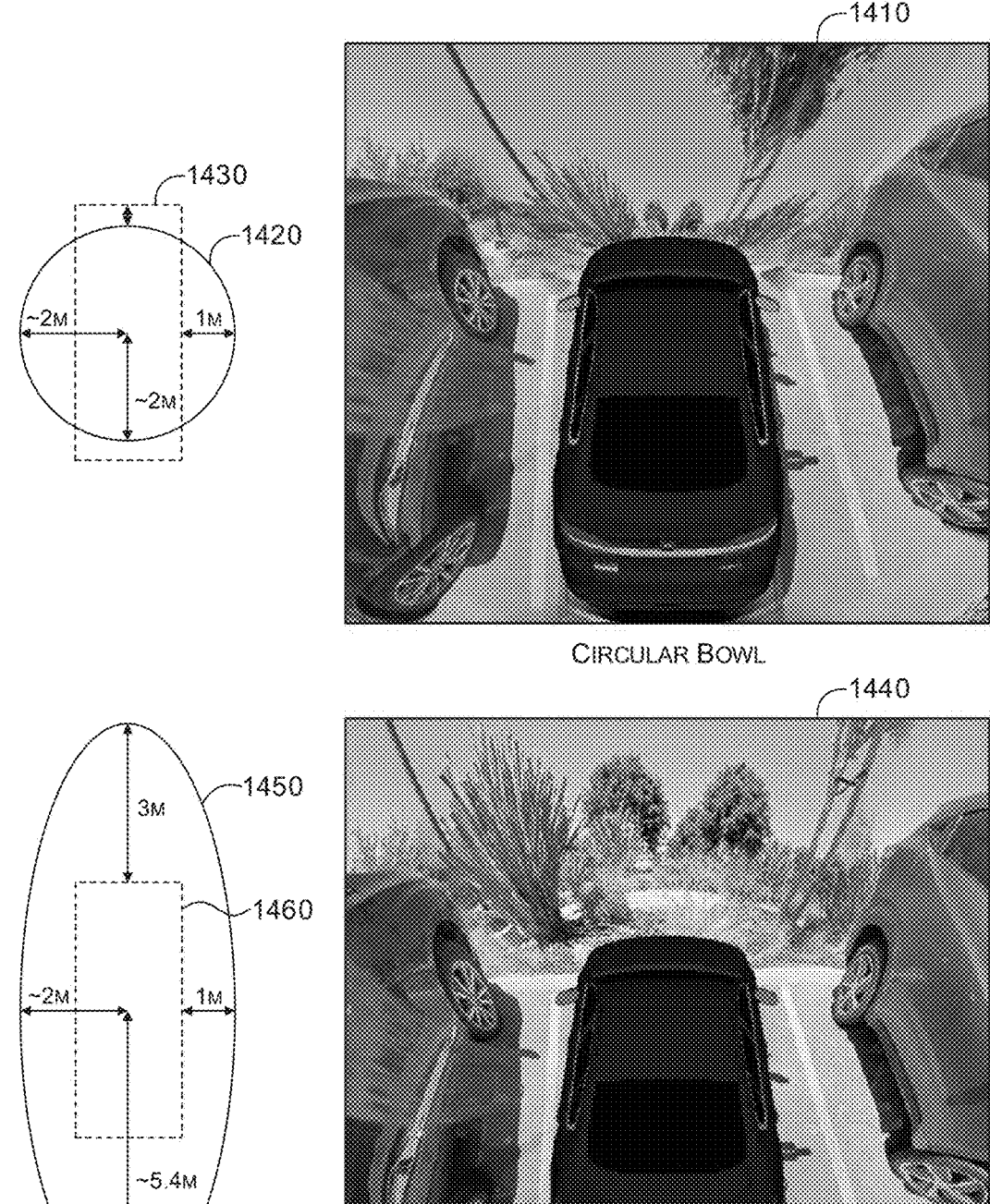
Figure 17A:
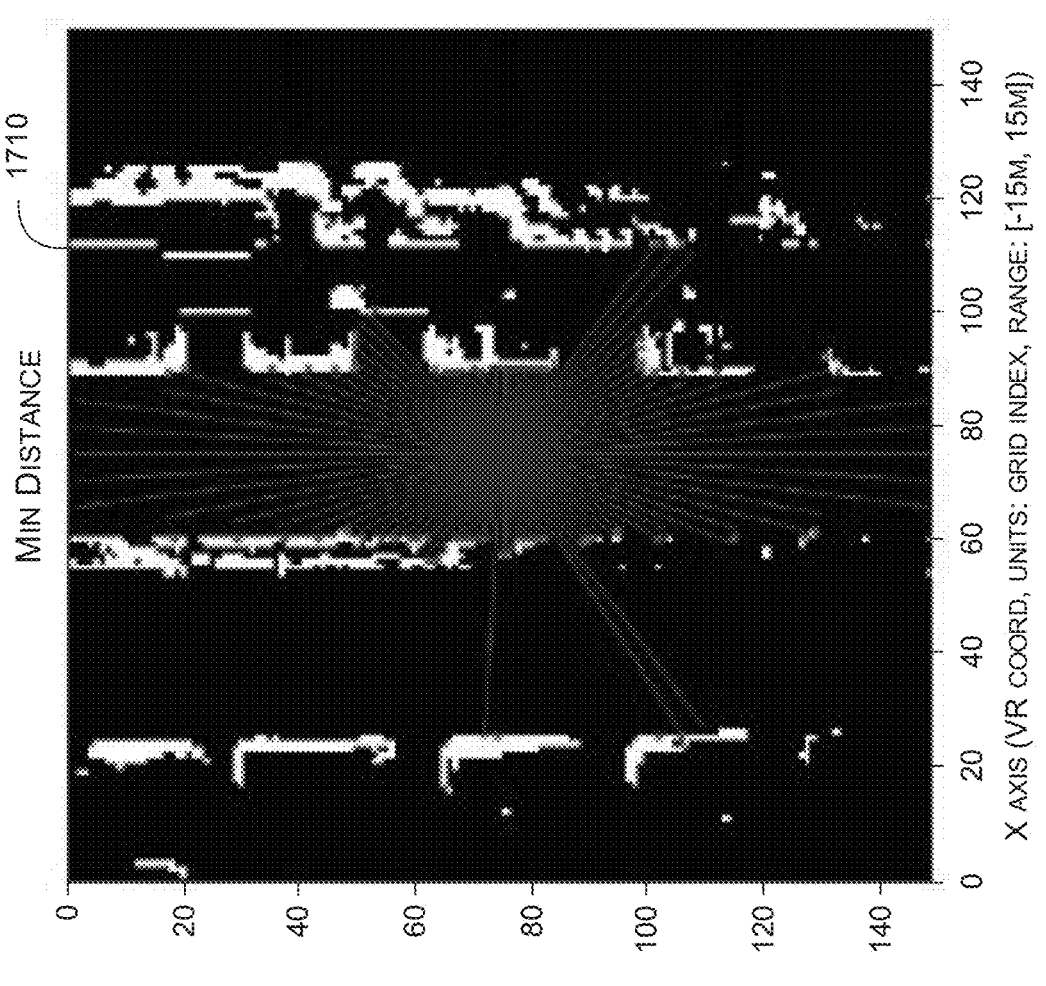
Figure 17B:
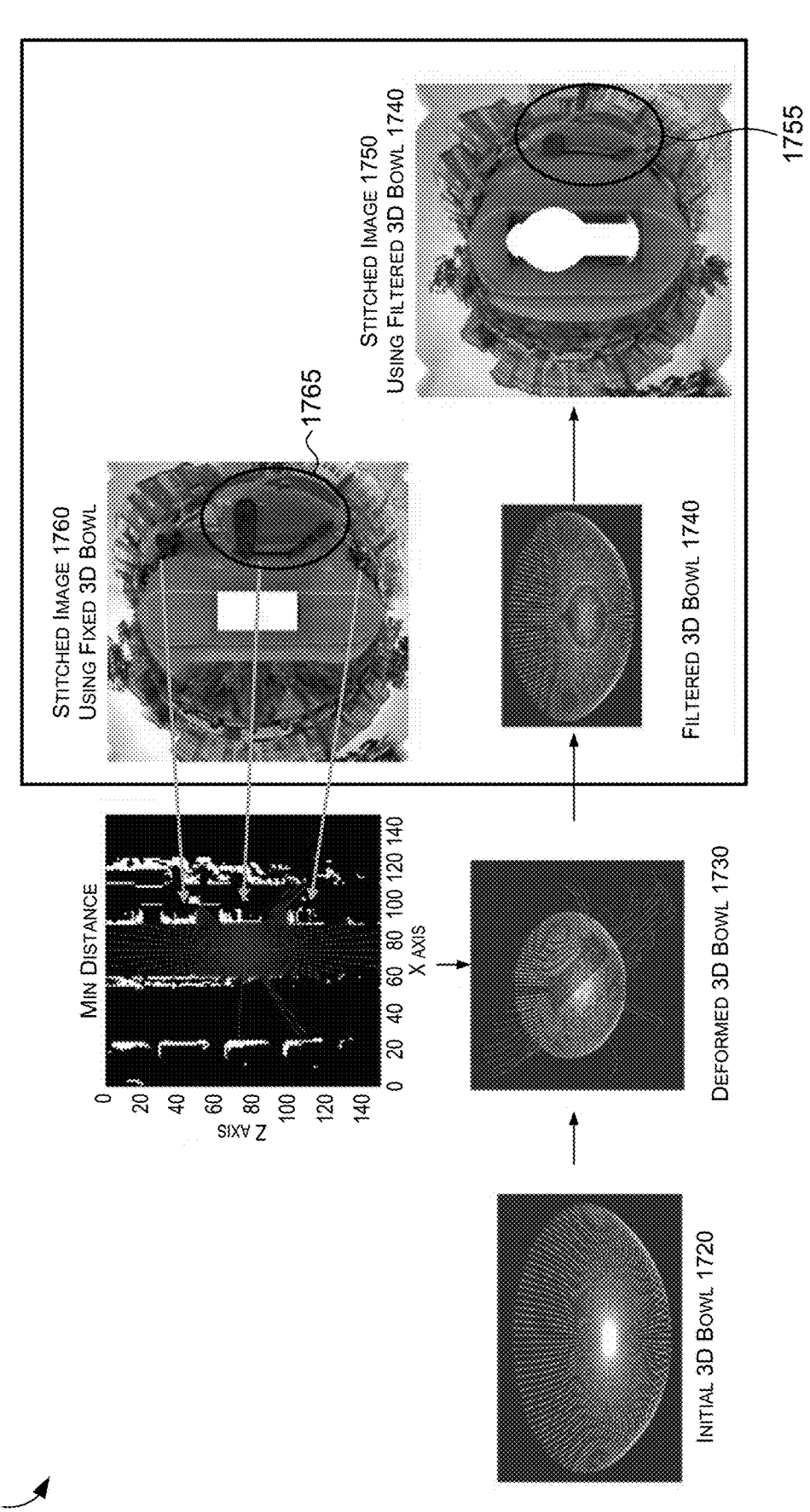
Figure 18:
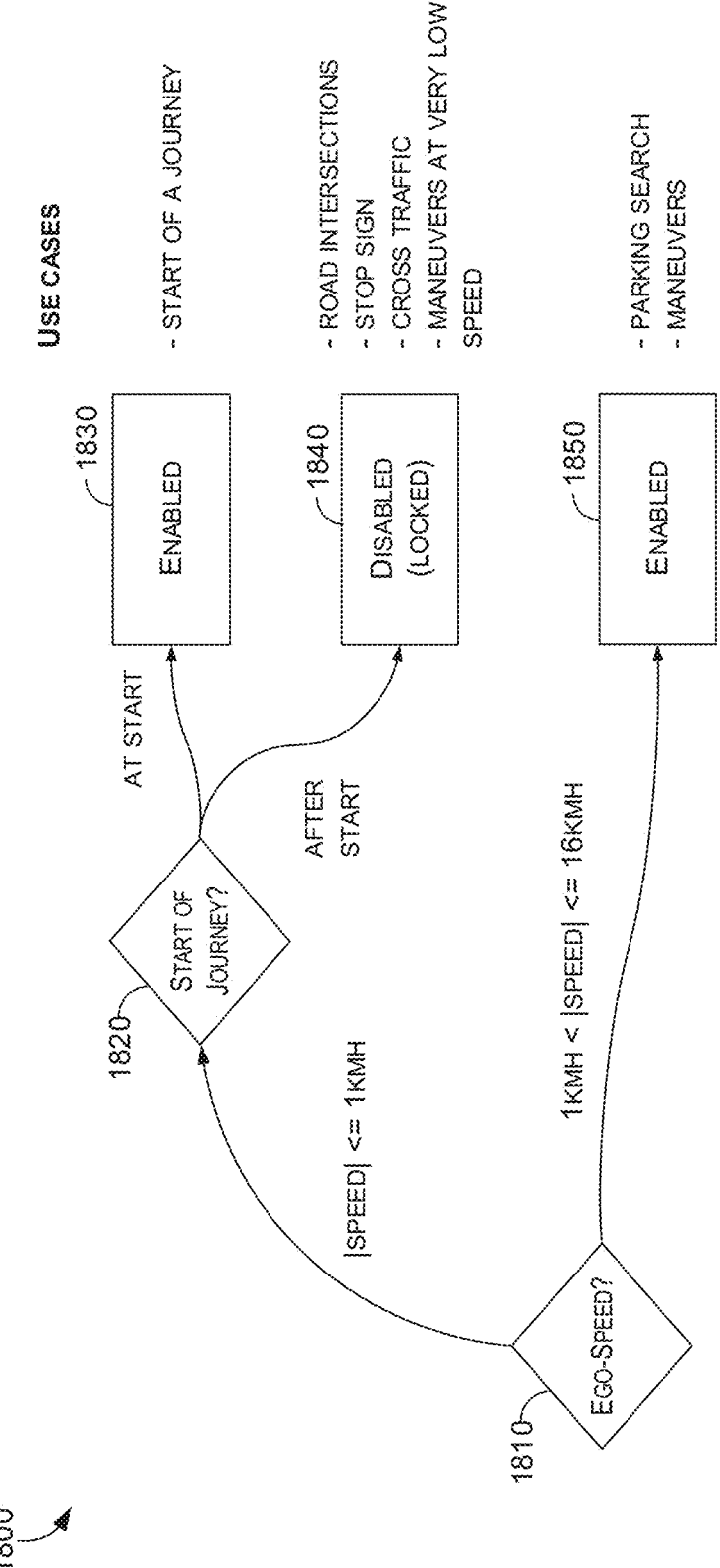
Figure 21:

FIG. 13 illustrates an example data flow through an example surround view visualization system that uses a 3D bowl, in accordance with some embodiments of the present disclosure;

FIG. 14 shows example surround view visualizations of textured circular and elliptical 3D bowls, in accordance with some embodiments of the present disclosure;

FIG. 15 shows some example artifacts that can arise in surround view visualizations that use a 3D bowl;

FIG. 16 illustrates an example adaptive 3D bowl generator that adapts a 3D bowl based on distance to detected objects, in accordance with some embodiments of the present disclosure;

FIG. 17A is an example 2D top-down occupancy grid, and FIG. 17B illustrates an example adaptive 3D bowl generation technique that adapts a 3D bowl using a 2D top-down occupancy grid, in accordance with some embodiments of the present disclosure;

FIG. 18 is an example adaptive 3D bowl state machine, in accordance with some embodiments of the present disclosure;

FIG. 19 is a diagram illustrating an example data flow through a Surround View System that includes adaptive 3D bowl and dynamic seam placement state machines, in accordance with some embodiments of the present disclosure;

FIG. 20 shows example surround view visualizations with and without an adaptive 3D bowl, in accordance with some embodiments of the present disclosure;

FIG. 21 is a flow diagram showing a method for generating a surround view visualization based at least on an adaptive 3D bowl, in accordance with some embodiments of the present disclosure;

FIG. 22 is a flow diagram showing a method for generating a surround view visualization based at least on an adaptive 3D bowl with a shape that depends on distance to the closest detected object, in accordance with some embodiments of the present disclosure;

Under Vehicle Reconstruction

Figure 23:
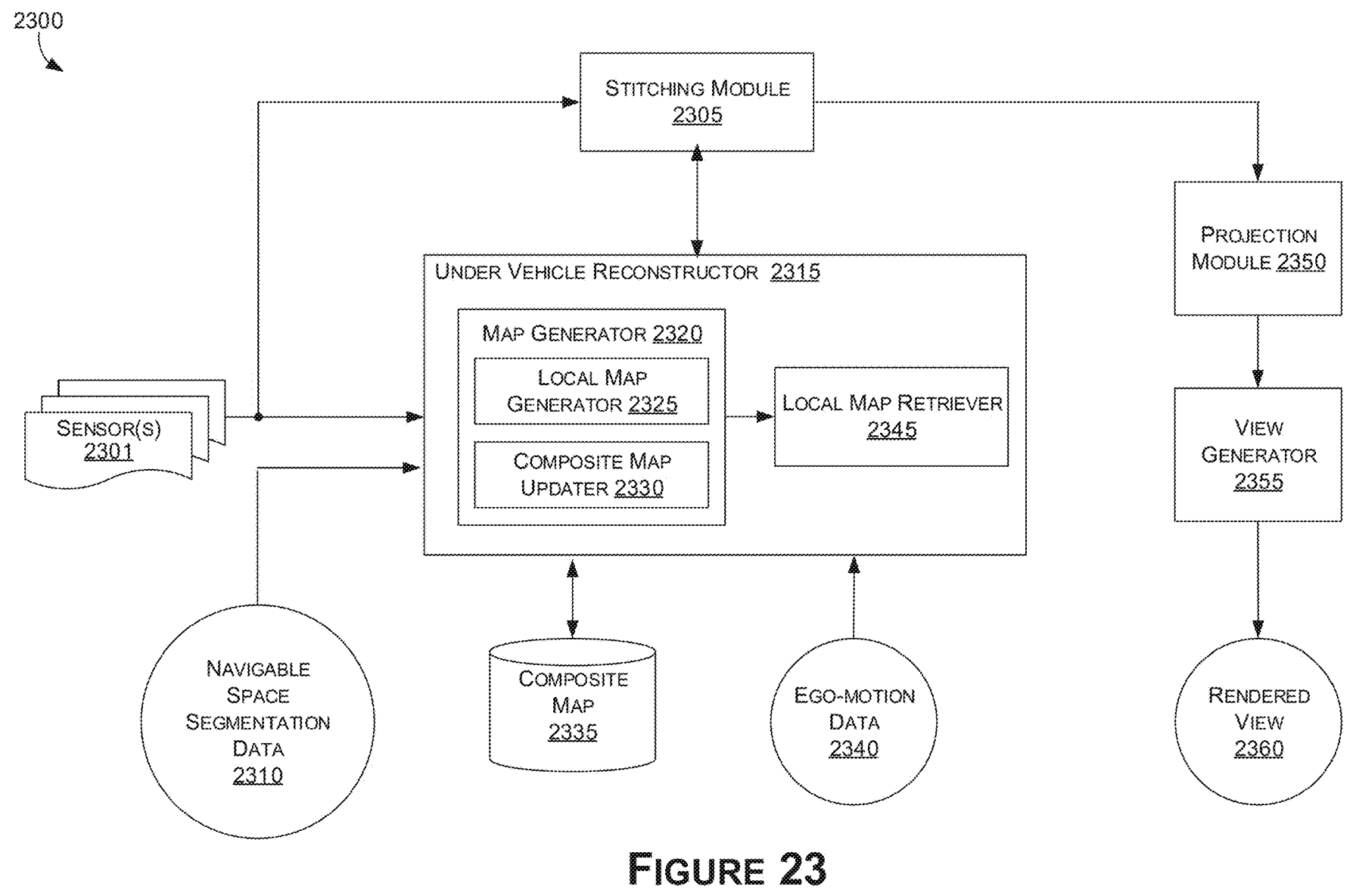
Figure 24:
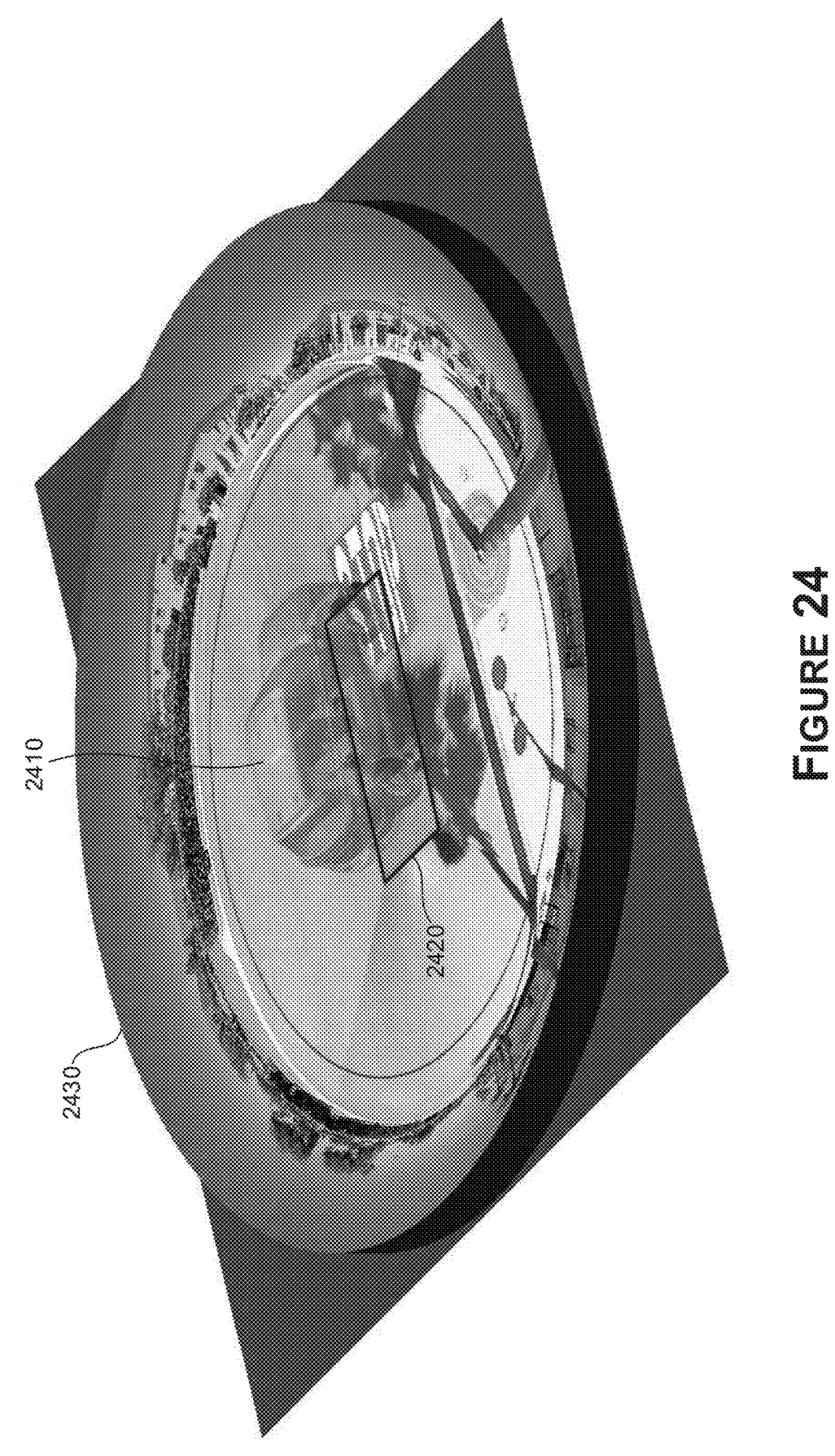
Figure 25:
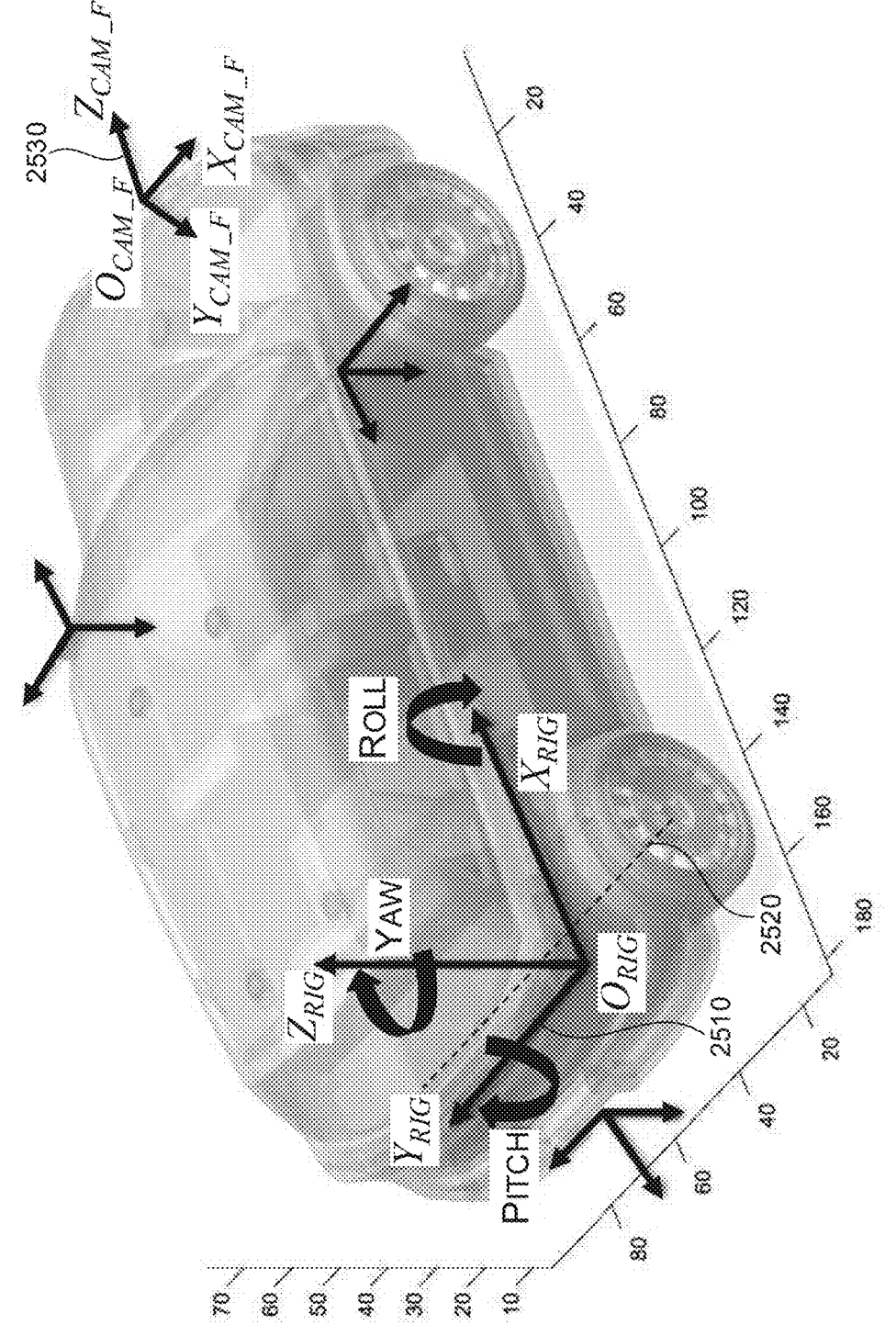
Figure 26:
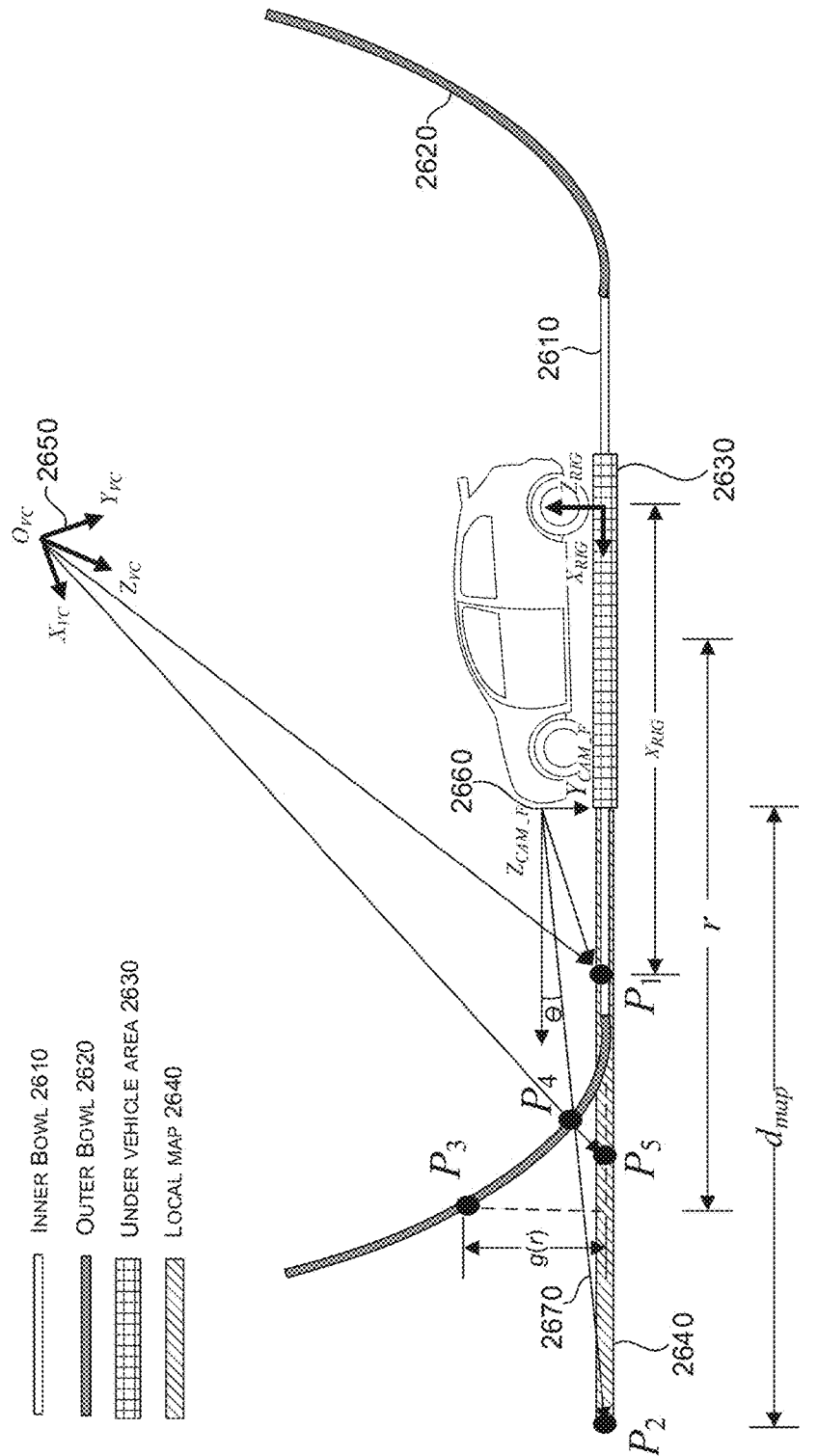
Figure 28:
Figure 29:
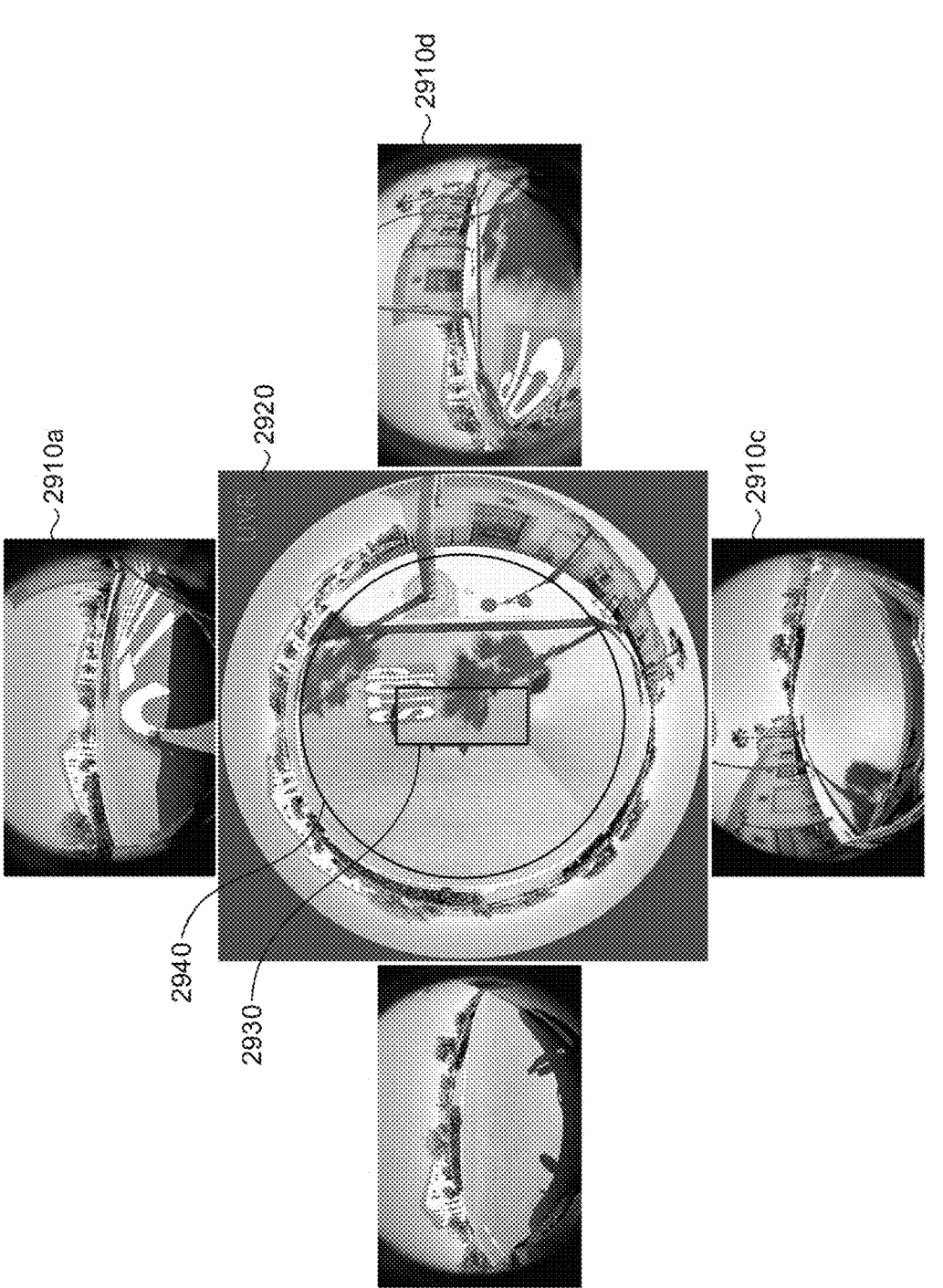

FIG. 23 is a diagram illustrating an example data flow through an under vehicle reconstruction system, in accordance with some embodiments of the present disclosure;

FIG. 24 is an example surround view visualization with a transparent vehicle rendered over an under vehicle reconstruction on a textured 3D surface, in accordance with some embodiments of the present disclosure;

FIG. 25 shows example vehicle rig and camera coordinate systems, in accordance with some embodiments of the present disclosure;

FIG. 26 is cross-section view of an example 3D bowl, in accordance with some embodiments of the present disclosure;

FIG. 27 illustrates an example technique for updating a composite map that visualizes a drivable area, in accordance with some embodiments of the present disclosure;

FIG. 28 shows an example under vehicle reconstruction using simulated fisheye images, in accordance with some embodiments of the present disclosure;

FIG. 29 shows an example under vehicle reconstruction using real fisheye images, in accordance with some embodiments of the present disclosure;

FIG. 30 is a flow diagram showing a method for virtually reconstructing an area of a ground plane under an ego-object, in accordance with some embodiments of the present disclosure;

FIG. 31 is a flow diagram showing a method for merging a local map into a representation of a ground plane for virtually reconstructing an area of the ground plane under an ego-object, in accordance with some embodiments of the present disclosure;

Optimized Visualization Streaming

Figure 32:
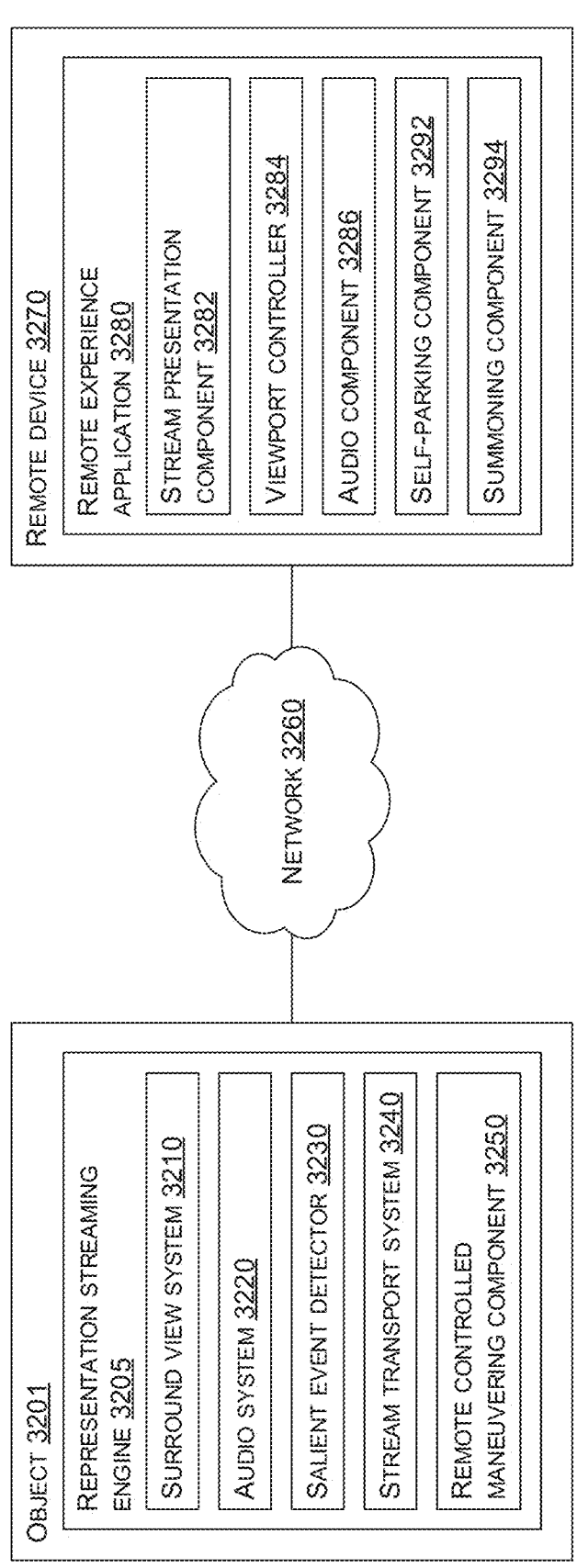
Figure 33:
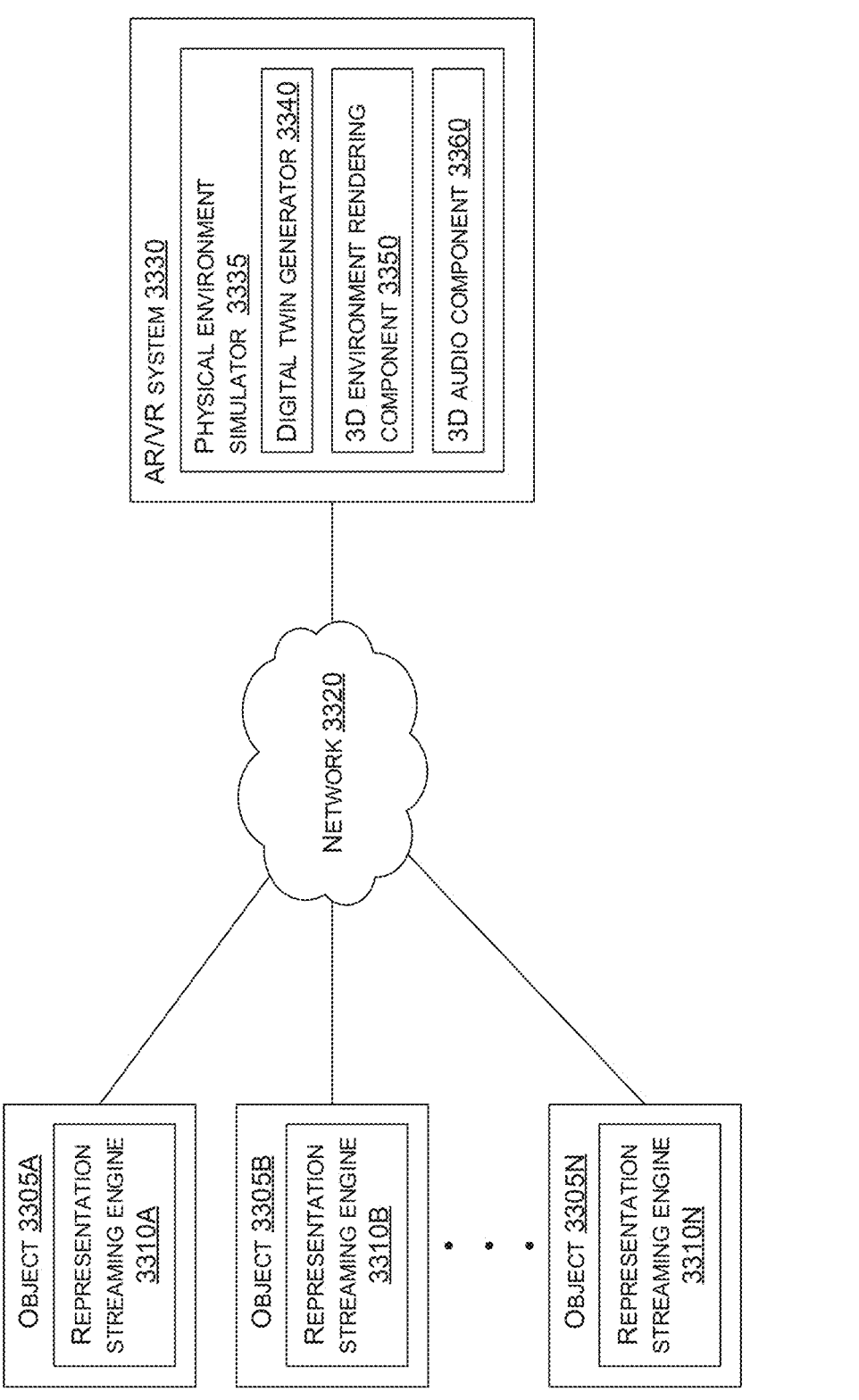

FIG. 32 is an example representation streaming system, in accordance with some embodiments of the present disclosure;

FIG. 33 is an example augmented reality and/or virtual reality simulator system, in accordance with some embodiments of the present disclosure;

FIG. 34 is a flow diagram showing a method for streaming representations of a physical environment, in accordance with some embodiments of the present disclosure;

Autonomous Vehicle

Figure 35A:
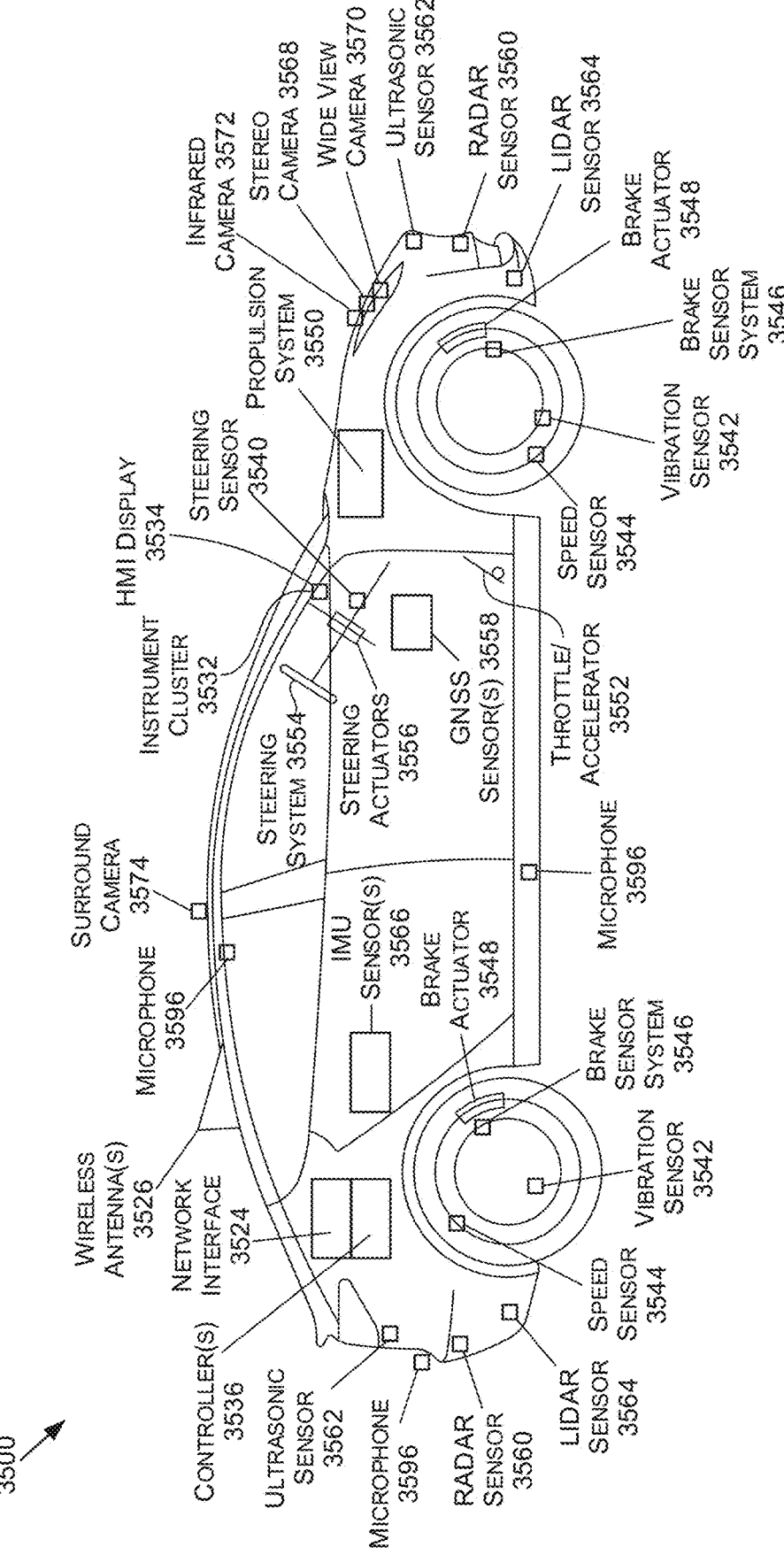
Figure 35B:
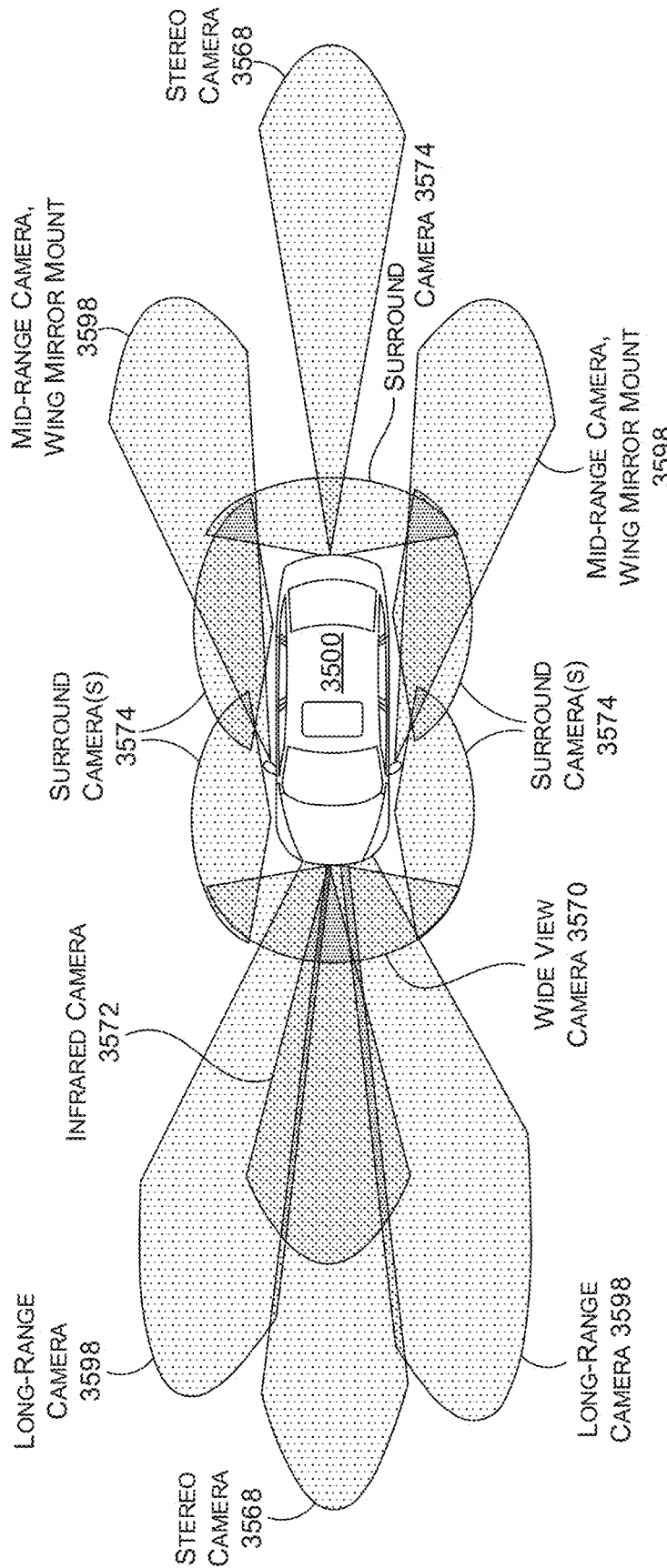
Figure 35C:
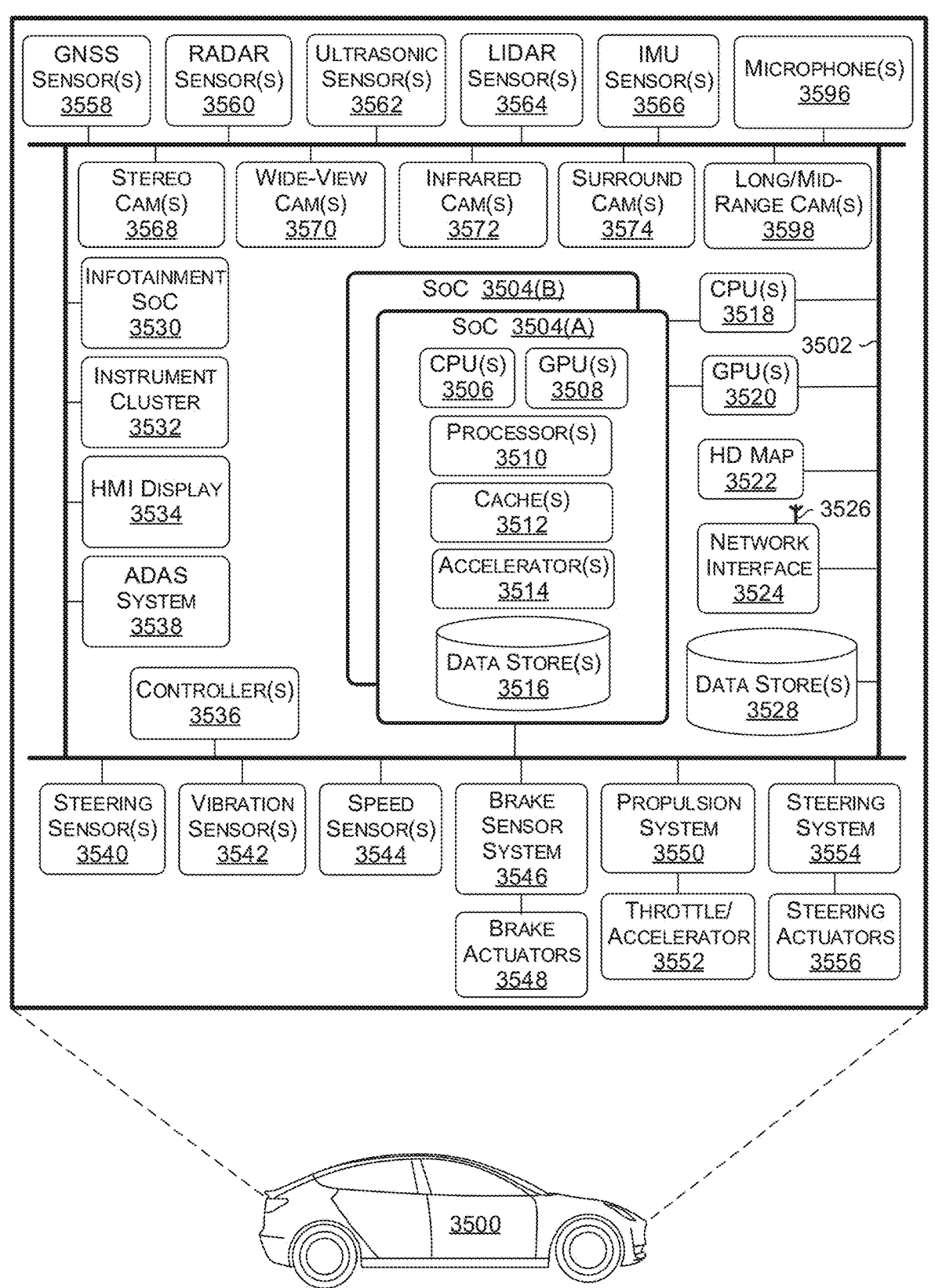
Figure 35D:
Figure 36:
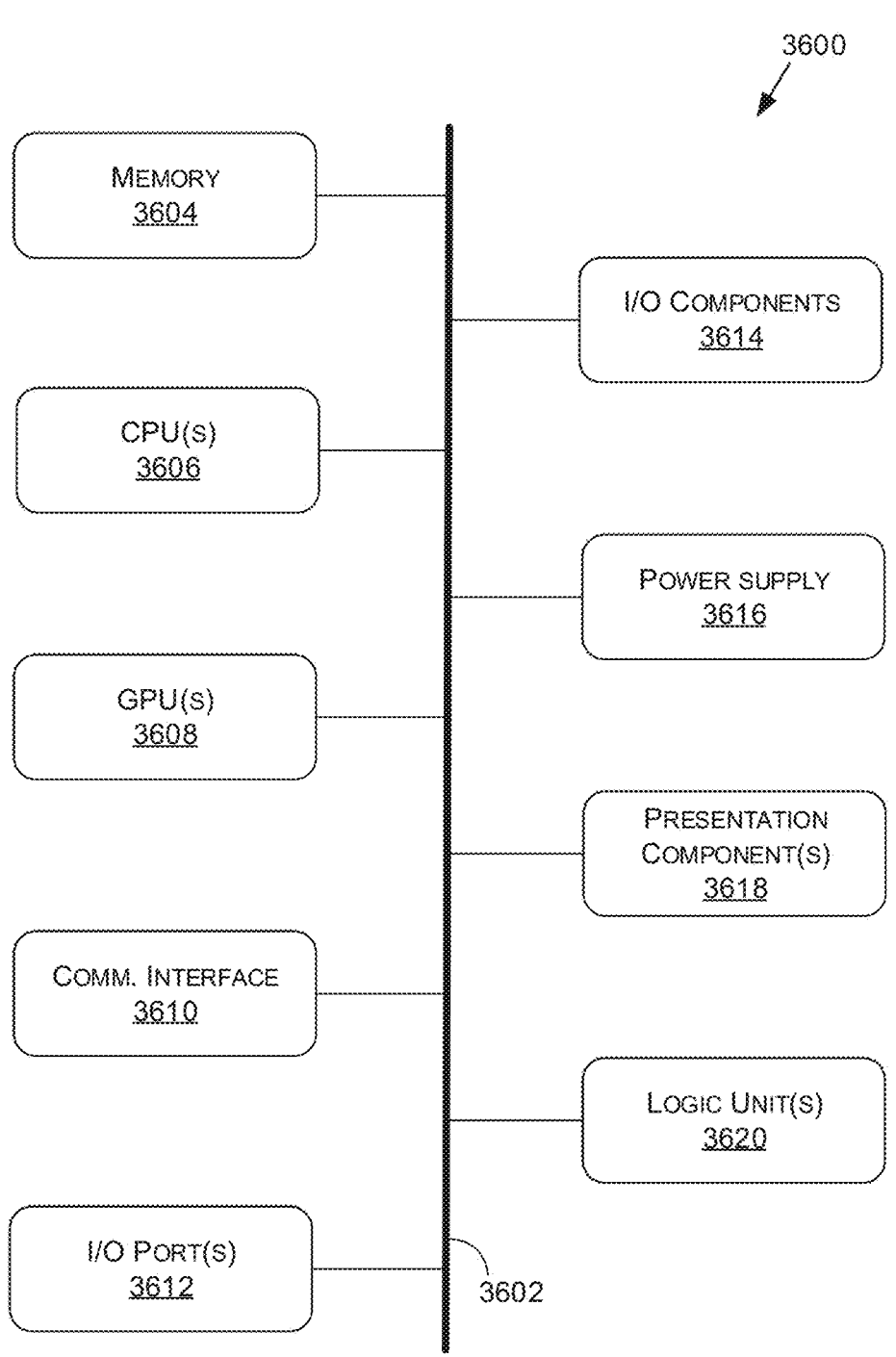
Figure 37:
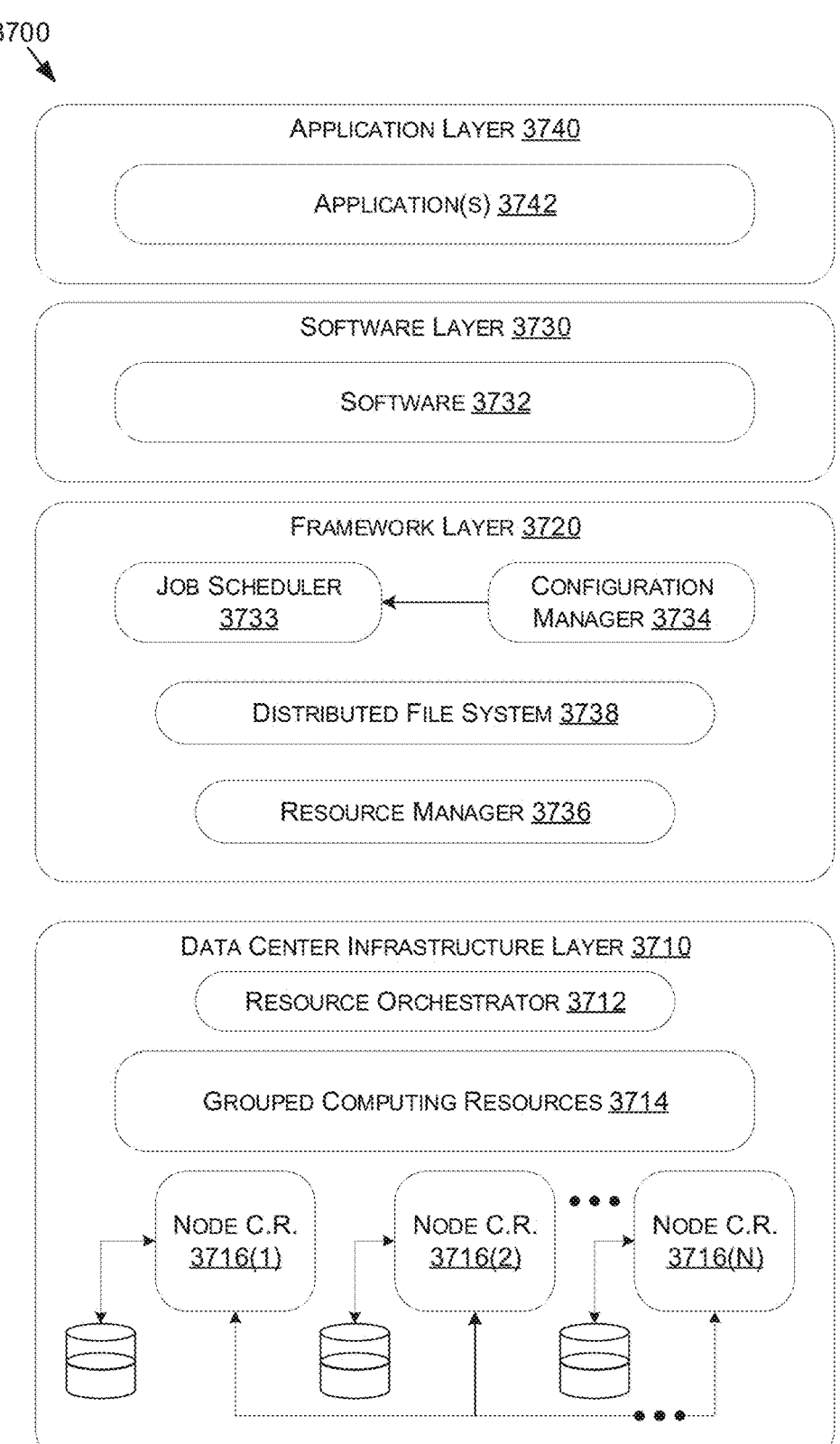

FIG. 35A is an illustration of an example autonomous vehicle, in accordance with some embodiments of the present disclosure;

FIG. 35B is an example of camera locations and fields of view for the example autonomous vehicle of FIG. 35A, in accordance with some embodiments of the present disclosure;

FIG. 35C is a block diagram of an example system architecture for the example autonomous vehicle of FIG. 35A, in accordance with some embodiments of the present disclosure;

FIG. 35D is a system diagram for communication between cloud-based server(s) and the example autonomous vehicle of FIG. 35A, in accordance with some embodiments of the present disclosure;

FIG. 36 is a block diagram of an example computing device suitable for use in implementing some embodiments of the present disclosure; and FIG. 37 is a block diagram of an example data center suitable for use in implementing some embodiments of the present disclosure.

DETAILED DESCRIPTION

Systems and methods are disclosed related to surround view or environment visualization, dynamic seam placement based on object saliency, dynamic seam placement based ego-object state, an adaptive 3D bowl that models the surrounding environment with a shape that depends on distance and direction to detected objects, reconstruction of the area under an ego-object, and/or streaming a representation of an environment in and around an ego-object. Although the present disclosure may be described with respect to an example autonomous vehicle 3500 (alternatively referred to herein as "vehicle 3500" or "ego-vehicle 3500," an example of which is described with respect to FIGS. 35A-35D), this is not intended to be limiting. For example, the systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle or types. In addition, although the present disclosure may be described with respect to surround view visualizations for vehicles, this is not intended to be limiting, and the systems and methods described herein may be used to provide one or more multi-view, composite view, and/or proximity view representations in augmented reality, virtual reality, mixed reality, robotics, camera probes (e.g., medical or surgical probes), security and surveillance, autonomous or semi-autonomous machine applications, and/or any other technology spaces where image stitching, environment visualization, and/or representation streaming may be used.

Dynamic Seam Placement and State-Dependent Stitching

Systems and methods relating to dynamic seam placement and state-dependent image stitching are disclosed. For example, systems and methods are disclosed that use dynamic seam placement to avoid salient objects, and state-dependent image stitching based on speed of ego-motion, direction of ego-motion, proximity to salient objects, active viewport, driver gaze, and/or other factors. The present techniques may be utilized to visualize an environment around an ego-object, such as a vehicle, robot, and/or other type of object, in systems such as parking visualization systems, Surround View Systems, and/or others.

At a high level, objects (e.g., salient objects) may be detected from sensor data (e.g., fisheye images) representing an environment surrounding an ego-object such as a vehicle. Image data representing the environment may be aligned to create an aligned composite image or surface (e.g., a panorama, a 360° image, bowl shaped surface) with regions of overlapping image data, and a representation of the detected objects (e.g., a saliency mask) may be projected onto the aligned composite image or surface. Seams may be positioned in the overlapping regions to avoid crossing salient objects, and the image data may be blended at the seams to create a stitched image or surface (e.g., a stitched panorama, stitched 360° image, stitched textured surface). In some embodiments, a state machine implementing a decision tree is used to determine whether to use a default seam placement or dynamic seam placement that avoids salient objects, and to enable and disable dynamic seam placement based on speed of ego-motion, direction of ego-motion, proximity to salient objects, active viewport, driver gaze, and/or other factors.

Object detection may be performed using 2D object detection (e.g., from images) or 3D object detection (e.g., from images, a 3D point cloud of LiDAR or RADAR detections). In some embodiments, salient objects may be identified from detected objects, for example, based on object class (e.g., emergency vehicles, road users, moving objects), driving scenario (e.g., surrounding vehicles when parking between the vehicles, any close object when parallel parking), distance to the vehicle, and/or other factors. Depending on the implementation, objects deemed to be non-salient may be ignored (filtered out), and/or salient objects may be assigned a higher priority (or weight) than non-salient objects. For example, object detection may generate a binary object mask representing whether or not each point (e.g., each pixel in a 2D mask corresponding to each image) corresponds to a depicted part of a detected object, and the binary object mask may be used to derive a weighted saliency mask representing a measure of saliency of each point (e.g., by weighting the binary object mask based on proximity of a corresponding detected object, prioritizing certain classifications of detected object, using logic that depends on driving scenario). In some embodiments, a machine-learning model may be trained to predict a weighted saliency mask using training data labeled with a measure of ground truth saliency (e.g., objects or regions deemed to be important by human labelers). In some cases, driver gaze may be monitored (e.g., using a camera of a driver monitoring system), the region of the environment where the driver is looking may be projected into a corresponding region of the saliency mask, and the corresponding region may be updated to represent a measure of saliency. In some cases, a salient portion of a designated viewport (e.g., pixels toward the center of the field of view of the designated viewport) may be projected into a corresponding region of the saliency mask, and the corresponding region may be updated to represent a measure of saliency to emphasize placing a seam toward the edge or boundary of the field of view of the designated viewport. These are just a few examples, and other techniques that quantify saliency are contemplated within the scope of the present disclosure.

In some embodiments, to identify detected objects and/or salient regions, object detection may be performed on multiple images of an environment to create multiple object and/or saliency masks. The images may be aligned to create a composite image or surface (e.g., a panorama, 360° image, or bowl shaped surface) with regions of overlapping image data, and the object and/or saliency masks may be projected onto the composite image or surface. In some cases (e.g., for some driving scenarios like parking, based on a threshold speed of ego-motion), objects determined to be beyond some threshold distance from the vehicle (e.g., determined using corresponding LiDAR or RADAR detections) may be discarded from the masks. As such, any given overlapping region of image data may be overlaid with two (or more) different object and/or saliency masks representing objects or other salient regions detected by multiple sensors.

Depending on the implementation, different techniques may be applied to determine where to place a seam within a region of overlapping image data. In some cases, a seam may be steered through each overlapping region to avoid or otherwise minimize cutting through or intersecting pixels of a salient region detected by multiple sensors (e.g., as represented in corresponding masks), for example, using an energy function that penalizes seams that cover salient pixels (e.g., weighted by saliency). Taking a straight seam and a substantially rectangular overlapping region as an example, one end of a seam may be placed at one end point in the region, such as a corner representing the closest portion of the environment to the vehicle, and a straight line may be drawn from that end point to another end point at an opposite portion of the region. For example, starting at the bottom right corner of the overlapping region, a ray may be projected out at an angle theta, a seam space may be scanned over different values of theta to cover the region (e.g., from 0-90°), and a corresponding path may be traversed through the pixels of the region and evaluated.

In some embodiments, scanning a seam space of candidate seams and evaluating candidate seams serves to identify a seam (e.g., whether straight or some other shape) that avoids salient regions represented in both overlaid masks. Additionally or alternatively (e.g., if no such candidate seam exists), candidate seams may be evaluated to identify a seam that minimizes intersected salient pixels, that minimizes an energy function (e.g., having a cost that penalizes candidate seams that intersect or cover salient pixels, is weighted by saliency or proximity, is based on multiple images from different time slices to promote temporal stability), and or otherwise. If there are multiple seams that would satisfy the designated criteria (e.g., that have the same cost or number of intersected salient pixels), temporal stability may be used to choose a seam location that minimizes the change in seam position compared to the previous frame. In some embodiments, costs for different seam shapes may be evaluated using a connected components analysis and/or using dynamic programming (e.g., based on designated permissible directions in which a seam may traverse to adjacent diagonal or edge pixels). In some embodiments, edge detection is performed (e.g., on image data in the overlapping region), and graph cuts and/or seam carving may be applied to carve out high frequency content (e.g., detected edges) of the overlapping region from potential solutions, such that candidate seams cannot travel through the graph cut. As a result, high frequency content like the edges of vehicles may be effectively designated as salient to discourage placing seams over detected edges, which may represent visually important information.

As such, seams may be placed in overlapping regions of aligned images to avoid or minimize crossing salient objects or regions, and image data from the aligned images may be blended at the seams to create a stitched image, such as a 360° ("surround view") visualization of the environment surrounding the vehicle, and a view of the surround view visualization may be rendered. The surround view visualization of the environment may take the form of a stitched panorama, a stitched 360° image, a top-down projection of a stitched 360° image, a textured 3D geometric surface modeling the surrounding environment in the shape of a 3D bowl, a rendering of one of the foregoing, and/or other forms. For example, stitched image data may be mapped onto a textured 3D surface in a 3D representation of the environment; a virtual camera may be placed in the 3D environment with a specified location and/or orientation and used to render a view of the textured 3D surface from the perspective of the virtual camera into a viewport; and/or the rendered view may be presented on a monitor visible to occupants (e.g., driver) of the vehicle.

In some embodiments, a state machine implementing a decision tree is used to determine whether to use a default seam placement or dynamic seam placement that avoids salient objects or regions, and to enable and disable dynamic seam placement based on speed of ego-motion, direction of ego-motion, proximity to salient objects, active viewport direction, driver gaze, and/or other factors. For example, taking a driving scenario when the vehicle is traveling forward, or when the viewport of the virtual camera is facing forward, when the speed of the vehicle is below a lower speed threshold (e.g., less than 5 km/hr) and the closest detected object is closer to the vehicle than some threshold proximity (e.g., less than 3 m), dynamic seam placement may be enabled. By contrast, when the speed of the vehicle is below a lower speed threshold and there are no detected objects within the threshold proximity, or when the speed of the vehicle is within some medium speed range (e.g., from 5-16 km/hr), dynamic seam placement may be disabled (e.g., in favor of a default seam, such as a horizontal seam). Taking a driving scenario when the vehicle is traveling in some other direction (e.g., backwards), or when the viewport of the virtual camera is facing in some other direction (e.g., backwards), when the speed of the vehicle is below a lower speed threshold (e.g., less than 5 km/hr), dynamic seam placement may be enabled. In contrast, when the speed of the vehicle is within some medium speed range (e.g., from 5-16 km/hr), a seam may be gradually moved by using a previous frame's seam when it avoids detected (salient) objects from a current time slice, and may otherwise be updated using dynamic seam placement.

As such, the techniques described herein may be used to dynamically place seams to avoid or minimize crossing salient objects or regions, such as emergency vehicles, road users, and moving objects. Furthermore, some embodiments apply state-dependent image stitching based on speed of ego-motion, direction of ego-motion, proximity to salient objects, active viewport direction, driver gaze, and/or other factors. Dynamically moving seams to avoid or minimize crossing salient objects or regions can reduce various geometric and/or texture artifacts such as object disappearance, ghosting, and discontinuities in salient regions of a stitched image. Furthermore, applying state-dependent image stitching serves to steer seams away from salient regions, depending on the driving scenario (e.g., based on the state of the ego-vehicle), effectively avoiding placement of seams over regions of a stitched image that are potentially important for a driver to safely maneuver a vehicle. As such, the techniques described herein may be used to reduce stitching artifacts, improve visual representations of useful information in a stitched image, improve visual quality of stitched images, and promote safe operation of the vehicle.

Adaptive 3D Bowl Model of the Surrounding Environment

Systems and methods relating to an adaptive 3D bowl geometry are disclosed. For example, systems and methods are disclosed that adapt the shape, orientation, and/or dimensions of a 3D bowl (e.g., a mesh) modeling the surrounding environment based on the distance to nearby detected objects and project image data onto the adapted 3D bowl. The present techniques may be utilized to visualize an environment around an ego-object, such as a vehicle, robot, and/or other type of object, in systems such as parking visualization systems, Surround View Systems, and/or others.

In an example embodiment, at a high level, 3D object detection may be performed to detect objects from sensor data (e.g., images, LiDAR data, RADAR data) representing an environment surrounding an ego-object such as a vehicle. In some embodiments, sensor data such as a LiDAR point cloud is projected onto a top-down 2D occupancy grid that represents locations of detected objects or a 3D occupancy grid that represents locations and projected or assumed heights of detected objects (e.g., assuming vehicles have a height of 2 or 3 meters above the ground surface). The 3D object detections and/or the 2D/3D occupancy grid may be used to compute distances to detected objects, and the distances may be populated in a radial distance map that represents distance to (e.g., a representative point(s) on) the closest detected object as a function of angle (e.g., representing a rotation around an axis of the vehicle coordinate system, such as yaw). The distances and/or the radial distance map may be used to adapt the shape of a 3D bowl (e.g., a mesh or other geometric model), for example, by (re)sizing the ground plane of the 3D bowl to fit within the distance to the closest detected object, or modifying the shape, size (e.g., along one or more dimensions or axes), or orientation (e.g., rotation relative to an ego-vehicle) of the 3D bowl to place (e.g., one or more points of) the closest detected object(s) between the ground plane of the bowl and the outer edge or rim of the bowl. In some embodiments, a state machine implementing a decision tree is used to determine whether to use a fixed 3D bowl or an adaptive 3D bowl that adapts its shape based on distance to detected object(s). As such, image data (e.g., four fisheye images) may be projected onto the applicable 3D bowl, and a view of the resulting textured 3D surface may be rendered and presented on a monitor or other display device visible to occupants (e.g., driver) of the vehicle.

Generally, distances to surrounding objects may be obtained or determined in various ways. In some embodiments, 3D object detection is performed (e.g., by processing sensor data) and/or a representation of detected 3D objects (e.g., 3D cuboids in rig coordinates) is accessed. For example, 2D bounding boxes and/or 3D cuboids may be predicted from image data (e.g., fisheye images), LiDAR or RADAR detections, and/or other sensor data using one or more machine learning models. As such, distances between the vehicle (e.g., the vehicle center) and one or more representative point(s) of the detected objects (e.g., a closest point that belongs to each detected object, a corner or point on an edge of a 3D bounding box of each detected object, the average location of N closest corners or edges of a 3D bounding box of each detected object) may be computed from predicted and/or sensed locations. Additionally or alternatively, sensor data such as a LiDAR or RADAR point cloud representing detected objects may be projected into a 2D top-down occupancy grid or 3D top-down occupancy grid (e.g., a height map storing projected or assumed heights), and 2D or 3D distances to detected objects may be computed from the 2D or 3D occupancy grid. Generally, any suitable ranging and/or depth/distance estimation technique may be used to determine distances to surrounding objects, such as computer vision and/or neural network techniques (e.g., 3D object detection, multi-view stereo, structure from motion, dense tracking and motion (DTAM), monocular depth estimation), measurements from depth sensor(s) (e.g., ultrasonic sensor(s), LiDAR sensor(s), RADAR sensor(s)), and/or otherwise.

In some embodiments, since different techniques may have different benefits, multiple techniques and/or sensors may be used (e.g., 3D object detection, ultrasonic depth) to generate different types of distance or depth estimations, and the different distance/depth estimations may be combined (e.g., projected into a common representation such as a depth map, height map, or radial distance map; taking a union or intersection of different types of estimations; resolving conflicts by prioritizing certain techniques or types of sensors; choosing or weighting different estimations based on corresponding confidence values, etc.).

In some embodiments, detected objects beyond some threshold distance to the vehicle (e.g., 3 m, 7 m, 15 m, etc.) and/or detected objects outside a field of view of an active (displayed) viewport may be filtered out or ignored (e.g., only considering detected objects within a threshold distance, only considering objects that are in the field of view of the displayed viewport) to free up computational resources and/or reduce distortion resulting from a wider range of detected objects.

As such, distances to detected objects may be computed, and the distances may be populated in a radial distance map that represents distance to (e.g., a representative point(s) on) the closest detected object (e.g., as a function of (e.g., yaw) angle, in a list of entries representing distance and direction from ego-center to each corner of a detected object, or in some other structure or form).

Generally, the distances and directions to the surrounding objects may be used to adapt various shapes of a 3D bowl (e.g., a mesh) that models the geometry of the environment surrounding the vehicle. In terms of bowl shape, the 3D bowl mesh when viewed from top-down may be circular, elliptical, or some other shape (whether regular or irregular), and the shape may be symmetrical or asymmetrical. In some embodiments, a symmetrical shape such as an ellipse may be used, and an axis of the ellipse (e.g., the short or long axis) may be aligned with an axis of the vehicle coordinate system (e.g., pointing to the front of the vehicle). Depending on the embodiment, distances to surrounding objects may be used to fit a symmetrical bowl shape, synthesize a shape using local deformations to accommodate different distances to different objects, or otherwise.

Taking an example symmetrical bowl shape such as an ellipse, a 3D bowl may be represented as a combination of an elliptical ground plane (an inner bowl) and an elliptical side rising from the ground plane to a peak height at the bowl edge or rim (an outer bowl). The inner and outer bowl may be separated by some distance, whether constant (e.g., 3 m) or variable, and the inner bowl may be sized to fit within the distance to the closest detected object. For example, a representative point on a closest detected object may be assumed to be at some point along the circumference of an ellipse that is aligned with and centered on the vehicle, and the ellipse may be parameterized using the standard equation for an ellipse to calculate representative parameters for the inner bowl (e.g., values of the short and long axes, foci, eccentricity, circumference, etc.). Additionally or alternatively, the representative points of multiple (e.g., filtered, clustered) detected objects may be used to fit an ellipse (or multiple ellipses), or some other shape, optionally rotated (e.g., to align a long or short axis with a particular detected object). In some embodiments, an optimization algorithm may be used to fit an ellipse (or some other shape), for example, by iterating over candidate radii and minimizing a cost function that evaluates the candidate radii based on the sum of the distances between the circumference of the candidate ellipse and the representative point(s) for each closest detected object (e.g., prioritizing/discarding particular classes of detected object (e.g., selecting or weighting vehicles over vegetation), prioritizing/discarding particular instances of detected objects (e.g., placing higher weights on closer objects)). These are just a few examples, and other ways of adapting the inner and/or outer bowl based on distance to a detected object may be implemented. In some embodiments, the 3D bowl is parameterized by parameters of the inner bowl and the outer bowl (e.g., short and long axes of the inner and outer bowls).

In some embodiments, the 3D bowl may be constructed using the distance to each point radially surrounding the vehicle. For example, the distance to the closest detected object in each radial direction may be determined, the resulting radial values may be used as the shape (or may be used to fit a shape) for the inner bowl, and the outer bowl may be set to some fixe d separation from the inner bowl (e.g., 3 m). To smooth out the bowl shape, a spatial filter may be applied over some angular range (e.g., 20-60°).

Generally, any number of spatial and/or temporal filters may be applied to parameters (or a combination of parameters) representing the 3D bowl (e.g., short and long axes of an elliptical bowl). A speed filter may be applied to enable or disable the adaptive bowl based on speed of the ego-vehicle (e.g., disabled at speeds above some threshold such as 16 km/hr, and enabled at lower speeds). In some embodiments (e.g., that use an elliptical bowl), a temporal filter may be applied over a temporal window (e.g., 30 frames of data buffered first-in-first-out) to a ratio of parameters (e.g., the ratio of the short to long axes) to stabilize the ratio, to individual parameters (e.g., short and long axes of an inner bowl), and/or otherwise. In some embodiments, temporal filtering is applied to a ratio before being applied to individual parameters in order to apply course filtering before finer smoothing. In some implementations, stochastic and/or Kalman filtering may be applied over a temporal window to smooth out transitions. These are just a few examples, and other filters may additionally or alternatively be applied.

In some embodiments, a state machine implementing a decision tree is used to determine whether to use a fixed 3D bowl or an adaptive 3D bowl that adapts its shape based on distance to detected object(s). In some scenarios, applying an adaptive 3D bowl to passing objects may create undesirable distortions or artifacts that can manifest as a blurred or "wobbling" effect To avoid or reduce these distortions, an adaptive 3D bowl may be selectively enabled in scenarios less likely to involve passing objects, for example, based on speed of ego-motion. For example, at low speeds, a vehicle may be embarking on a journey (e.g., from a stopped and/or parked position), approaching or stopping at an intersection such as a road sign or traffic light, or performing maneuvers at low speeds. Since a vehicle embarking on a journey is less likely to encounter passing objects, in some embodiments, when the speed of the vehicle is below a lower speed threshold (e.g., less than 1 km/hr) and the vehicle is embarking on a journey, adaptive 3D bowl may be enabled. When the speed of the vehicle is below a lower speed threshold (e.g., less than 1 km/hr) and the vehicle is not embarking on a journey, adaptive 3D bowl may be disabled (e.g., locked to a fixed bowl or the previous bowl shape). When the speed of the vehicle is within some medium speed range (e.g., from 1-16 km/hr), adaptive 3D bowl may be disabled. When the speed of the vehicle is above some medium speed range, the vehicle may be more likely to encounter passing objects, so adaptive 3D bowl may be disabled (e.g., and locked to a fixed bowl or the previous bowl shape).

As such, image data (e.g., four fisheye images) may be projected onto the applicable 3D bowl, and a view of the projected image data may be rendered and presented on a monitor visible to occupants (e.g., driver) of the vehicle. Adapting the shape of a 3D bowl based on the distance to nearby detected objects serves to reduce scale magnification and gross distortion artifacts for what are often the most important objects, the closest ones to the vehicle. As such, the techniques described herein may be used to generate improved visualizations that reduce visual artifacts, better represent useful visual information in a surround view visualization, and promote safe operation of the vehicle.

Under Vehicle Reconstruction

Systems and methods relating to reconstruction of the area under a vehicle are disclosed. For example, systems and methods are disclosed that use cached sensor data captured by a vehicle and ego-motion of the vehicle to reconstruct the area under the vehicle in real time. The present techniques may be utilized to visualize an environment around an ego-object, such as a vehicle, robot, and/or other type of object, in systems such as parking visualization systems, Surround View Systems, and/or others.

At a high level, sensor data captured over time by an ego-object may be cached to generate a map (e.g., a plurality of local maps, a composite map) that visualizes a drivable area, and ego-motion of the vehicle may be used to retrieve sensor data from the map to virtually reconstruct the area under the vehicle. In an example implementation, one or more sensors such as a front or back fisheye camera on a vehicle are utilized to build a local textured map of the environment (e.g., the drivable area) through which the vehicle travels, and maps generated at different timestamps may be cached and/or combined into a composite map. The vehicle's location and orientation within the local and/or composite map may be estimated, for example, using the vehicle ego-motion and/or pose. As such, a portion of the local and/or composite map corresponding to the area under the vehicle may be retrieved, and a representation of the retrieved portion may be presented as a virtual reconstruction of the under vehicle area. In some embodiments, this reconstructed under vehicle area (under vehicle reconstruction, or UVR) may be stitched together with a surround view visualization to provide a new surround view visualization with greater visible area.

As such, even though there may not be an image of the under vehicle area captured at any given moment, that area may be reconstructed from sensor data captured at a previous time. In some embodiments, the sensor (e.g., camera) used to cache observed sensor data for future UVR usage depends on the direction of ego-motion. For example, if a vehicle is moving forward, image data from a front-facing (e.g., fisheye) camera may be used, and/or if a vehicle is moving backward, image data from a rear-facing (e.g., fisheye) camera may be used. In some embodiments, such as those involving longer ego-objects such as long trucks or vehicles with trailers making sharp turns, image data from side (e.g., fisheye) cameras may additionally or alternatively be used. In some embodiments, sensor data from multiple sensors (e.g., fisheye cameras) is stitched together to form a composite view (e.g., a surround view or 360° image), and the composite view is used for UVR. Generally, any number and/or type of sensor may be used to capture sensor data for under vehicle reconstruction. In a scenario where the vehicle is starting from a parked position where ego-motion has not yet started, previously cached (e.g., the last cached) sensor data or UVR may be utilized (e.g., stitched) with current sensor data.

In an example implementation, sensor data is periodically captured to generate frames of sensor data (whether each frame is captured from an individual sensor or combined using sensor data captured from multiple sensors), where the frames represent different time slices (e.g., a video feed). For each time slice, the under vehicle area is retrieved from the local and/or composite map using ego-motion and/or pose of the vehicle. In some embodiments, in response to a new frame of sensor data being captured or generated, two tasks may be conducted. In one task, the sensor data (e.g., image data) from the new frame may be cached (e.g., in its entirety) and/or used to update a composite map. In another task, the under vehicle area at the moment represented by the time slice may be calculated and corresponding sensor data may be retrieved using ego-motion of the moment. In some embodiments, a representation of the under vehicle reconstruction is presented, for example, on a monitor visible to occupants (e.g., driver) of the vehicle. In one or more embodiments, the representation of the under vehicle reconstruction may be provided to a remote viewer (e.g., a remote operator), via, for example and without limitation, streaming over a wireless communication channel. In some embodiments, the under vehicle reconstruction is stitched together with the sensor data from which it was generated, a surround view, and/or a 360° visualization of the environment surrounding the vehicle, for example, forming a textured 3D geometric surface (e.g., in the shape of a bowl) that models the surrounding environment. A virtual camera may be specified and used to render a view of the 3D surface from the perspective of the virtual camera, and/or the rendered view may be presented on a monitor visible to the driver of the vehicle.

In some embodiments, one or more deep neural networks (DNNs) are used to detect or otherwise distinguish drivable space from moving objects, such as pedestrians, bicycles, and vehicles, represented in the captured sensor data and/or in the composite view of the environment, and sensor data representing moving objects is omitted from the local and/or composite map. This way, moving objects that are not part of the drivable space should not appear in the reconstructed area under the vehicle, and the driving surface under the vehicle may be visualized.

The present techniques may be used in a variety of visualizations and/or Advanced Driving Assistive System (ADAS) features. For example, a "Transparent Hood" visualization may render a 3D model of the vehicle over the reconstructed area, but with the hood of the vehicle transparent, allowing a driver to view the relative positions of the vehicle's front wheels and the ground. In another example, a "Transparent Vehicle" visualization may render the entire 3D model of the vehicle transparently, allowing a driver to view the reconstructed under vehicle area through the transparent vehicle. In another example, a "Transparent Trailer" visualization may render a 3D model of the trailer (and/or a vehicle it is attached to) transparently. These are just a few examples, and other visualizations may additionally or alternatively be provided.

As such, the techniques described herein may be used to cache sensor data representing a navigable surface into a composite map, and reconstruct the area under an ego-object using the composite map and the ego-motion of the ego-object. Unlike conventional visualizations that omit or occlude the under vehicle area, the present techniques provide a real-time view of the surface under the vehicle, improving driver perception of the surrounding environment, and therefore improving the driver's ability to perform many tasks, such as passing over speed bumps, avoiding potholes, driving on narrow roads with high curbs or unpaved terrain, and/or other maneuvers.

Optimized Visualization Streaming

Systems and methods relating to streaming a representation of an environment in and around an ego-object are disclosed. For example, systems and methods are disclosed that stream, render, and/or otherwise deliver a representation of various types of sensor data to a remote location to facilitate various remote experiences. The present techniques may be utilized to visualize and/or stream a representation of an environment in and around an ego-object, such as a vehicle, robot, and/or other type of object, in systems such as parking visualization systems, Surround View Systems, and/or others.

At a high level, sensor data may be captured by sensors of an ego-object, such as a vehicle traveling in a physical environment, and a representation of the sensor data may be streamed from the ego-object to a remote location to facilitate various remote experiences, such as streaming to a remote viewer (e.g., a friend or relative), streaming to a remote or fleet operator, streaming to a mobile app configured to self-park or summon an ego-object, rendering a 3D augmented reality (AR) or virtual reality (VR) representation of the physical environment, and/or others. In some embodiments, the stream includes one or more command channels used to control data collection, rendering, stream content, or even vehicle maneuvers, such as during an emergency, self-park, or summon scenario.

Depending on the embodiment and/or the scenario, the streamed content may take a variety of forms. Generally, an object in an environment (e.g., an ego-object such as a vehicle, robot, or person; a stationary object such as a sign, pole, wall, or bridge) may be affixed with one or more sensors, such as cameras, microphones, ultrasonic sensors, RADAR sensors, LiDAR sensors, or infrared sensors, to name a few examples. In some embodiments involving a vehicle with a cabin, the vehicle may be equipped with external sensors capturing a representation of the outside environment and/or internal sensors capturing a representation of the environment inside the cabin. In some cases, raw sensor data may be streamed (e.g., video feed(s), LiDAR data, RADAR data, audio narration). Additionally or alternatively, some rendering or other representation of the raw sensor data may be streamed. Taking a surround view visualization as an example, sensor data such as image or LiDAR data may be projected onto a 3D representation (e.g., a 3D surface), and a virtual camera may be used to render a view of the 3D representation in a 2D viewport. In some embodiments, the stream may transport the 3D representation, the 2D viewport, and/or some segment or portion thereof. The position and orientation of the virtual camera may be controlled in various ways, such as by a remote command (e.g., enabling a remote person to control what perspective is streamed); based on occupant gaze, head pose, or body pose (e.g., detected using a Driver Monitoring System (DMS) and/or an Occupant Monitoring System (OMS)); based on a driving scenario (e.g., parking, direction and/or speed of ego-motion); and/or otherwise.

Taking directional or surround audio as another example, an object (e.g., an ego-object) such as a vehicle may be affixed with multiple microphones around the vehicle. In some embodiments, raw audio data may be streamed to some remote location where directional or surround audio may be computed. In some cases, directional or surround audio may be computed at the vehicle and streamed. In either scenario, the directional or surround audio may be provided to and played back at a remote location, for example, to facilitate an immersive experience for a remote viewer or operator. In some embodiments, environmental noise (e.g., road noise) may be removed in various ways (e.g., using one or more machine learning models to subtract noise from an audio signal). In some embodiments, a remote operator may issue one or more commands steering the directional or surround audio. Additionally or alternatively, the environment may be analyzed for saliency (e.g., whether at the vehicle or at some remote location), and a direction of saliency may be used to emphasize audio from that direction. For example, an audio signal may be analyzed (e.g., by one or more machine learning models) to detect an emergency noise or other salient event such as a vehicle horn, siren, screeching tires, a collision, and/or others, and detection of the emergency noise or other salient event from a microphone pointing in a particular direction may be used to steer the directional audio in that direction.

In some embodiments, other sensor data may additionally or alternatively be used to detect an emergency or other salient event, and the detected event may be used to steer capturing or rendering of sensor data towards the direction of the detected salient event. For example, image data, video data, proximity data, LiDAR data, RADAR data, and/or other sensor data may be analyzed (e.g., by one or more machine learning models), and detection of a salient event may be used to steer directional audio and/or a viewport rendering of a 3D representation of the environment towards the direction of the detected event. The directed viewport rendering may be presented on a monitor visible to occupants (e.g., driver) of the vehicle, presented on a monitor at a remote location, presented in association with some alarm, presented picture-in-picture (e.g., with some other video feed such as one pointing in the direction of travel), and/or otherwise. In some embodiments, the detected salient event (e.g., an imminent collision) may be used to trigger commandeering control of the vehicle, avoiding a collision, and/or steering the vehicle to safety.

Generally, a transport system that streams a representation of the physical environment to a remote location may be triggered and controlled in various ways. In some embodiments, capture, rendering, and/or transport may be triggered by ego-object location (e.g., when a vehicle reaches a particular intersection, latitude/longitude, geofence), triggered by a detected salient event (e.g., an accident, encountered emergency vehicle), triggered at a designated time, triggered on demand (e.g., by a vehicle occupant, remote operator), and/or otherwise. The transport system may include one or more command channels configured to deliver and trigger execution of remotely issued commands (e.g., via remote control functionality, such as that provided by NVIDIA Remote Control (NVRC) technology).

The transport system may use any streaming technology to transport the representation of the environment over a wireless communication channel to a remote location. For example, the transport system may include dedicated communication channels for each type of content (e.g., one or more types of sensor data, one or more types of rendered content, two-way audio, each type of command), may support scalable streams (e.g., using scalable audio or video coders to adjust encoding quality based on bandwidth), and/or may implement a Quality of Service (QoS) mechanism to assign a priority to certain streamed content and/or commands and manage the stream accordingly. In some embodiments, the transport system implements a stream hierarchy that prioritizes particular types of content. For example, in some implementations that prioritize a rendered AR/VR visualization, the rendered AR/VR visualization may be prioritized for streaming and other sensor data such as LiDAR data may be deprioritized and dropped (e.g., to conserve bandwidth). In another example, in some implementations that deliver content to a mobile device, LiDAR data may be dropped because the mobile device may lack the functionality to handle that type of data. In some scenarios, raw sensor data may be streamed and all other content may be dropped. In yet another example, different modalities of sensor data may have different assigned priorities, and deprioritized sensor data may be dropped. These are just a few examples, and other hierarchies are contemplated within the scope of the present disclosure.

Depending on the implementation, the remote location may include one or more servers (e.g., a web or application server), one or more client devices (e.g., a mobile app on a mobile device), a data center or distributed computing platform, and/or others. In some embodiments, one or more servers are used to receive streamed content, generate a rendering (e.g., a horizontal 360° surround view visualization, a rendered AR/VR environment, a 2D viewport of a 3D environment), generate an adaptive 3D bowl on which to project a surround view visualization, and/or distribute streamed and/or generated content to one or more recipient (e.g., client) devices.

As such, the streaming techniques described herein may enable a variety of remote experiences. In an example remote user experience, a remote user operating a computing device may choose (and issue commands configuring) a particular view for rendering, may interact with a vehicle occupant (e.g., via two-way audio), and/or may issue commands steering a viewport, soundport, or sensorport (e.g., whether rendering is performed at the ego-object, on the device operated by the remote user, or at some other location). In some embodiments, a vehicle occupant may stream to a friend or remote operator at a remote location (e.g., using a mobile app, a monitor visible to a vehicle operated by the friend, an AR or VR headset). In some embodiments, multiple vehicles in a fleet may stream to a location where fleet monitoring occurs. In an autonomous or semi-autonomous driving application, a user may operate a mobile app on his or her mobile device, where the application is configured to communicate with his or her vehicle to initiate autonomous or semi-autonomous maneuvering (e.g., self-parking, summoning of the vehicle, traveling along designated waypoints or a traced path, etc.), and video or some other sensor data may be streamed to the mobile app so the user can monitor the vehicle while it is self-maneuvering. In another application, if there is a failure in autonomous maneuvering (e.g., a slow-down, stoppage in a lane) or a catastrophic health event, the vehicle may connect to an emergency operator and transmit a video feed or other sensor data, enabling the emergency operator to assess the situation and potentially take control and navigate the vehicle to safety.

In another example application, a 3D (e.g., AR or VR) representation of a physical (e.g., driving or navigational) environment may be rendered with a digital twin or other virtual representation of one or more ego-objects in the physical environment. For example, position and/or orientation of any number of ego-objects (e.g., different vehicles) in the physical environment may be sensed, streamed, and/or used to update the position and/or orientation of their corresponding virtual representations in an AR/VR representation of the physical environment, substantially in real-time. In some embodiments, the AR/VR representation of the physical environment may be rendered with a representation of sensor data (e.g., image data, LiDAR data, RADAR data, temperature, audio) detected and streamed by one or more objects (e.g., ego-objects) in the physical environment. As such, an AR or VR representation of the physical environment may be rendered and presented in a headset-worn by a remote user to provide an immersive experience representing the physical environment through which an ego-object is traveling.

As such, the techniques described herein may be used to capture, stream, render, and/or present a representation of a physical environment traversed by an ego-object to facilitate various remote experiences, from sharing a surround view rendering with your friend, to remote fleet monitoring, to rendering an immersive AR/VR representation of the physical environment, and other applications.

Example Surround View System

Figure 1:
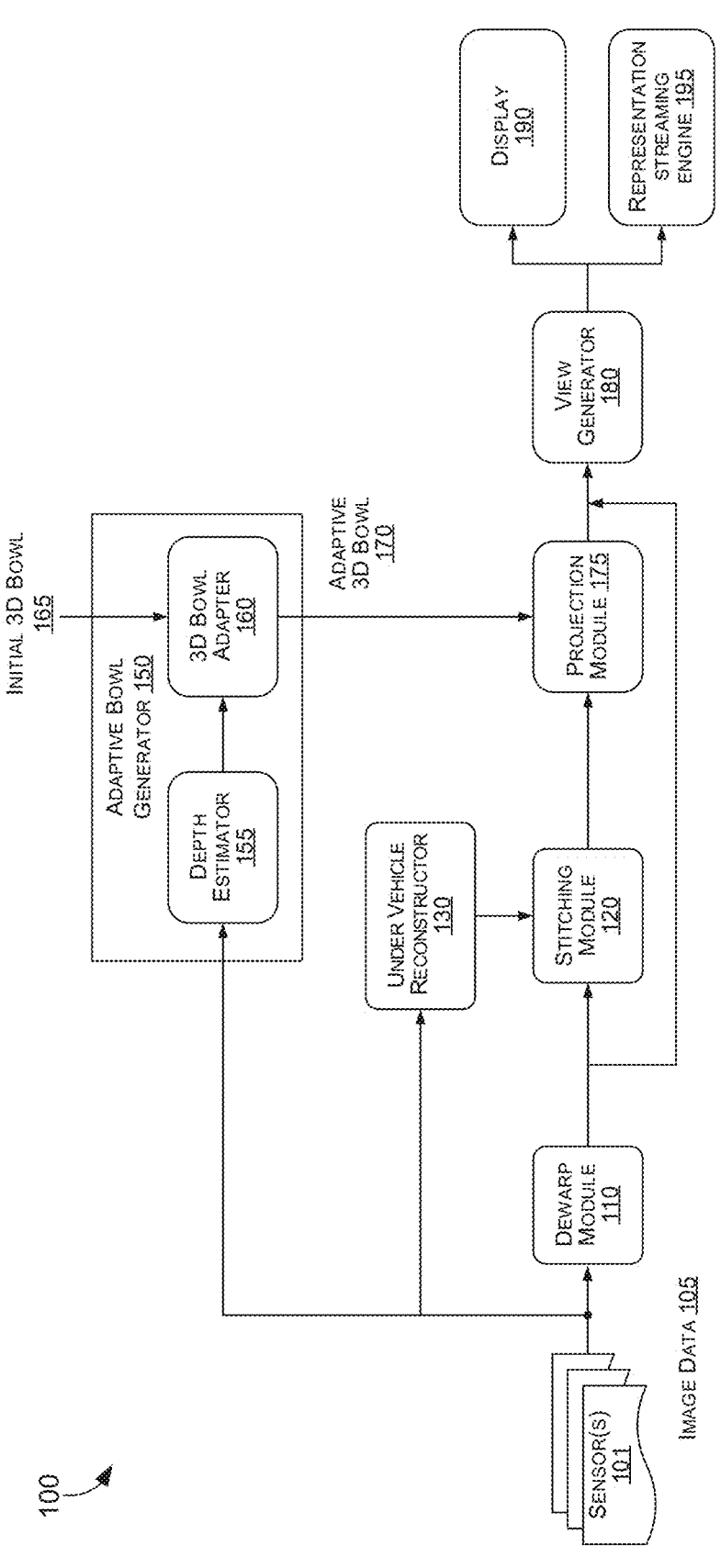
FIG. 1 is a diagram illustrating an example data flow through an example Surround View System, in accordance with some embodiments of the present disclosure.

With reference to FIG. 1, FIG. 1 is an example Surround View System 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 3500 of FIGS. 35A-35D, example computing device 3600 of FIG. 36, and/or example data center 3700 of FIG. 37.

As a high level overview, the Surround View System 100 may be incorporated into an ego-object, such as the autonomous vehicle 3500 of FIGS. 35A-35D. The Surround View System 100 may include any number and type of sensor(s) 101 such one or more cameras that capture sensor data (e.g., image data 105) representing the surrounding environment. The Surround View System 100 may use the image data 105 to generate a surround view visualization representing the surrounding environment, and/or present it on a display 190 visible to an occupant or operator of the ego-object (e.g., a driver or passenger). Additionally or alternatively, a representation streaming engine 195 may stream the surround view visualization, the sensor data, and/or some other representation of the environment in and/or around the ego-object to a remote location.

In an example embodiment, an ego-object (e.g., the autonomous vehicle 3500 of FIGS. 35A-35D) is equipped with any number and type of sensor(s) 101 (e.g., one or more cameras, such as fisheye cameras), and the sensor(s) 101 may be used to capture frames of overlapping sensor data (e.g., overlapping image data) for each time slice. Generally, any suitable sensor may be used, such as one or more of the stereo camera(s) 3568, wide-view camera(s) 3570 (e.g., fisheye cameras), infrared camera(s) 3572, surround camera(s) 3574 (e.g., 360° cameras), and/or long-range and/or mid-range camera(s) 3598, of the vehicle 3500 of FIG. 35A. Typically, different sensors have their own 3D coordinate systems. As such, some embodiments align sensor data from the sensor(s) 101 (e.g., image data) in a coordinate system defined relative to the ego-object, such as a vehicle rig coordinate system, as described in more detail with respect to FIG. 25. Additionally or alternatively, the environment surrounding the ego-object may be modeled in a global 3D coordinate system (world space), and the sensor data may be aligned in the global 3D coordinate system. In an example configuration, four fisheye cameras are installed at the front, left, rear and right side of a vehicle, where surrounding videos are continuously captured. Ego-motion of the vehicle may be generated using any known technique and synchronized with timestamps of the frames (e.g., images) of the videos. For example, absolute or relative ego-motion data (e.g., location, orientation, positional and rotational velocity, positional and rotational acceleration) may be determined using a vehicle speed sensor, gyroscope, accelerator, inertial measurement unit (IMU), and/or others.

In some embodiments, the Surround View System 100 includes a dewarp module 110, a stitching module 120, an under vehicle reconstructor 130, an adaptive 3D bowl generator 150, a projection module 175, a view generator 180, and/or a representation streaming engine 195. Taking an example implementation in which the sensor(s) are camera(s) (e.g., fisheye cameras) that capture image data 105 (e.g., fisheye images), the dewarp module 110 may remove distortion (e.g., barrel distortion, radial distortion) from the image data 105 using any known technique. The stitching module 120 may align and stitch the resulting image data into a stitched image, as explained in more detail with respect to FIGS. 2-12. The under vehicle reconstructor 130 may use cached sensor data from the sensor(s) 101 (e.g., the image data 105, dewarped image data) and ego-motion of the ego-object to reconstruct the area under the ego-object, as explained in more detail with respect to FIGS. 23-31. As such, the under vehicle reconstructor 130 may provide the resulting reconstruction to the stitching module 120 for inclusion in a stitched image.

In some embodiments, the Surround View System 100 uses a 3D model of the surrounding environment such as a 3D bowl to generate a surround view visualization. In some embodiments, the 3D bowl has an adaptive shape that depends on distance(s) and/or direction(s) to detected object(s). For example, the adaptive 3D bowl generator 150 may use sensor data from the one or more sensor(s) to generate an adaptive 3D bowl 170 that models the environment with a shape that depends on distance and/or direction to detected objects in the environment, as explained in more detail with respect to FIGS. 13-22. For example, the adaptive 3D bowl generator 150 may include a depth estimator 155 that estimates distance and/or direction to detected object(s) in the environment (e.g., using 3D objection detection, using a projection of sensor data onto a top-down 2D occupancy grid), and a 3D bowl adapter 160 may fit a shape for the adaptive 3D bowl 170 (e.g., by deforming an initial 3D bowl 165) based on the distance(s) and/or direction(s) to detected object(s).

The projection module 175 may project the stitched image generated by the stitching module 120 to generate a projection image (e.g., a top-down projection image) using estimated depth values (e.g., generated by the depth estimator 155), depth values sampled from a fixed 3D bowl, depth values sampled from the adaptive 3D bowl 170, and/or otherwise. Additionally or alternatively, the projection module 175 may map the stitched image generated by the stitching module 120 (or corresponding image data 105 or dewarped image data) onto a fixed 3D bowl, the adaptive 3D bowl 170, or some other 3D representation of the surrounding environment to generate a textured 3D model of the environment (e.g., a textured 3D bowl).

As such, the view generator 180 may output or render a view of one or more of the foregoing, as described in more detail with respect to FIGS. 13, 19, and 23. For example, the view generator 180 may position and orient a virtual camera in a 3D scene with the textured 3D bowl and render a view of the textured 3D bowl from the perspective of the virtual camera through a corresponding viewport. In some embodiments, the viewport may be selected based on a driving scenario (e.g., orienting the viewport in the direction of ego-motion), based on a detected salient event (e.g., orienting the viewport toward the detected salient event), based on an in-cabin command (e.g., orienting the viewport in a direction instructed by a command issued by an operator or occupant of the ego-object), based on a remote command (orienting the viewport in a direction instructed by a remote command), and/or otherwise. As such, the view generator 180 may output a visualization (e.g., a surround view visualization) of the surrounding environment to the display 190 (e.g., a monitor visible to an occupant or operator of the ego-object). Additionally or alternatively, a representation streaming engine 195 may stream the surround view visualization, the sensor data, and/or some other representation of the environment in and/or around the ego-object to a remote location, as explained in more detail with respect to FIGS. 32-34.

Image Stitching

Approaches in accordance with various embodiments provide for the generation, editing, or manipulation of image or video data. In particular, various embodiments provide for the generation of composite image or video data, using a system and methodology for combining (e.g., stitching) discrete image data into contiguous, composite surround or panoramic views. This may include, for example and without limitation, stitching individual frames captured using multiple sensors in an environment with at least partially overlapping fields of view such that each frame provides a larger field of view than is captured in any individual frame of the frames to be stitched together, such as a 180° or 360° view. At least some of the pixels may have their color values blended during the stitching or compositing process.

Stitched or composite image data generated using such a process may be utilized for various purposes. It should be understood that, at least for convenience of explanation, "image" data may be referred to herein, although image data may take many different forms, such as where individual images correspond to individual frames of video, or where image data is used to generate immersive video, augmented reality (AR), virtual reality (VR), or mixed reality (MR) experiences. In one example use case, live video data may be captured for a device or system such as a robot, or (autonomous or semi-autonomous) vehicle (collectively, an ego-vehicle). It may be desirable to combine the live video data from multiple cameras to generate a consistent view of the environment, such as a full view of the environment surrounding around that device or machine, which may be presented to an operator, monitoring system, occupant or passenger, remote viewer, or other such entity. For many of these systems, it may be helpful to generate such composite video representations in real time, such that an operator or monitoring system can take actions, if needed, based on real time observations.

Consider an autonomous or semi-autonomous vehicle that may include one or more passengers or occupants. The vehicle may include, or be associated with, multiple cameras (or at least one multi-part camera) that capture images of an environment in which that vehicle is located. In order to provide a seamless visualization of the environment to the passengers, it may be desirable to stitch or composite these images into a single representation of the environment that updates in real time, such as while the vehicle is in motion. Such a composite representation may also be transmitted to a remote system, such as a monitoring or control system that may analyze performance of the vehicle or potentially make changes in operation of the vehicle based at least in part upon aspects of the environment as determined from this representation. It may be desirable for these visualizations to be as realistic and free from defects, artifacts, or distortions as possible.

Figure 2A:
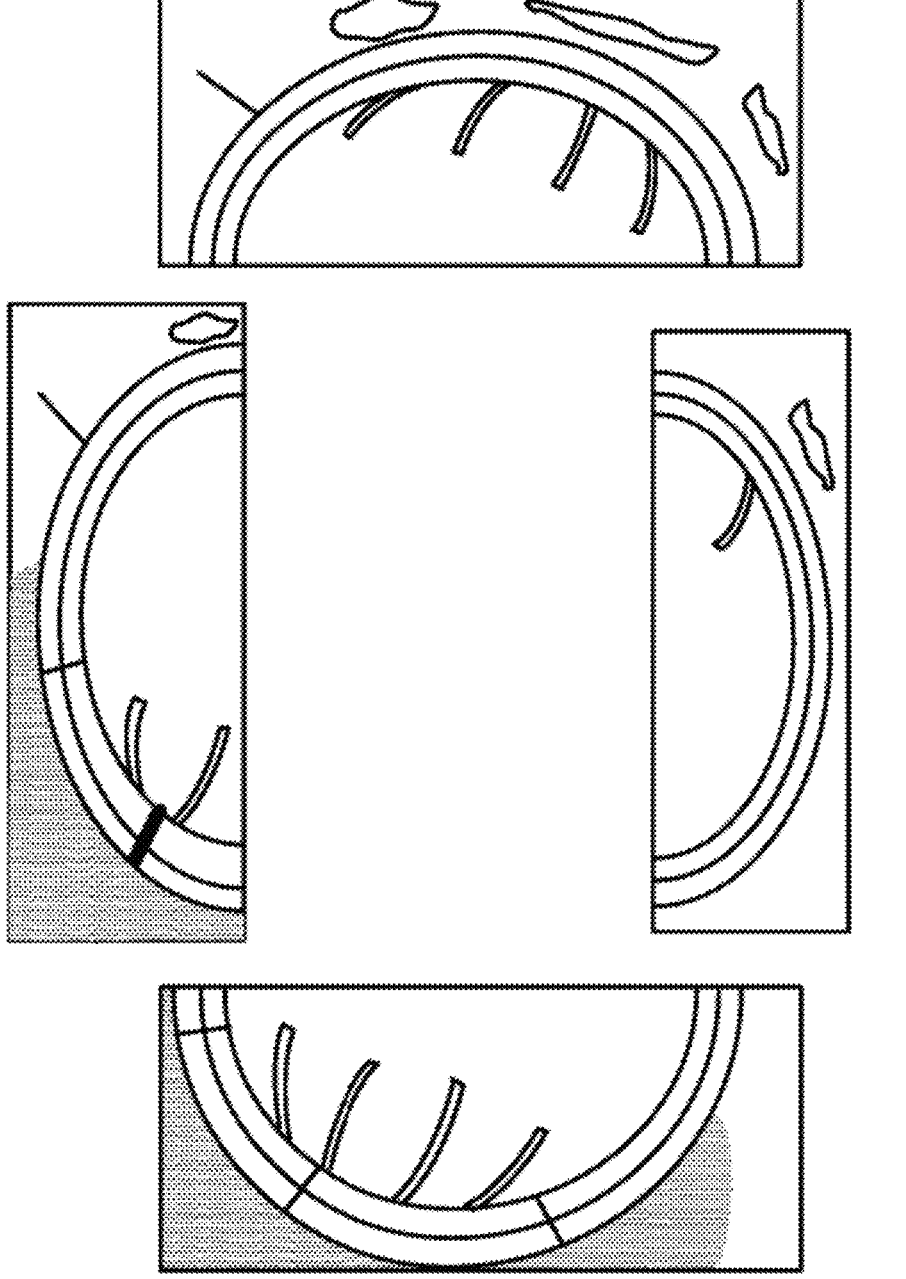

FIGS. 2A-2B illustrate an example of image stitching, in accordance with some embodiments of the present disclosure. FIG. 2A illustrates a set of four constituent images 200 that can be captured by respective cameras on, or associated with, an autonomous vehicle (e.g., the example autonomous vehicle 3500 of FIGS. 35A-35D) or other system or device in accordance with various embodiments. In this example, the cameras have different but partially overlapping fields of view, such that the images may be stitched together without gap filling or additional image data generation, although it should be understood that there may be other situations where cameras do not produce images with at least partially overlapping views that may require such tasks. In this example, each camera may have various intrinsic or extrinsic values that can impact the appearance of a captured image, where those values may relate to field of view, optical center, focal length, or camera pose, among other such options.

As mentioned, it may be desirable to generate a single, consistent view of this surrounding environment based at least in part upon these captured images 200. This may include, for example, generating a composite image 250 as illustrated in FIG. 2B. As illustrated, such a composite image may provide a single, consistent representation of the environment, whether a full 360° view or at least a portion of the angular range. Such a view may be presented as a single view showing the entire image 250, or portions of the image may be displayed at different times, where that view may be controllable by a user. In this example, an angular shape alpha map may be utilized instead of, for example, a perpendicular shape alpha map, at least to avoid the alpha discontinuity issue observed in various traditional stitching techniques. Blending region color continuity may be improved by extending the blending region(s) to hide a color discontinuity issue around corners or other such features.

Figure 3:
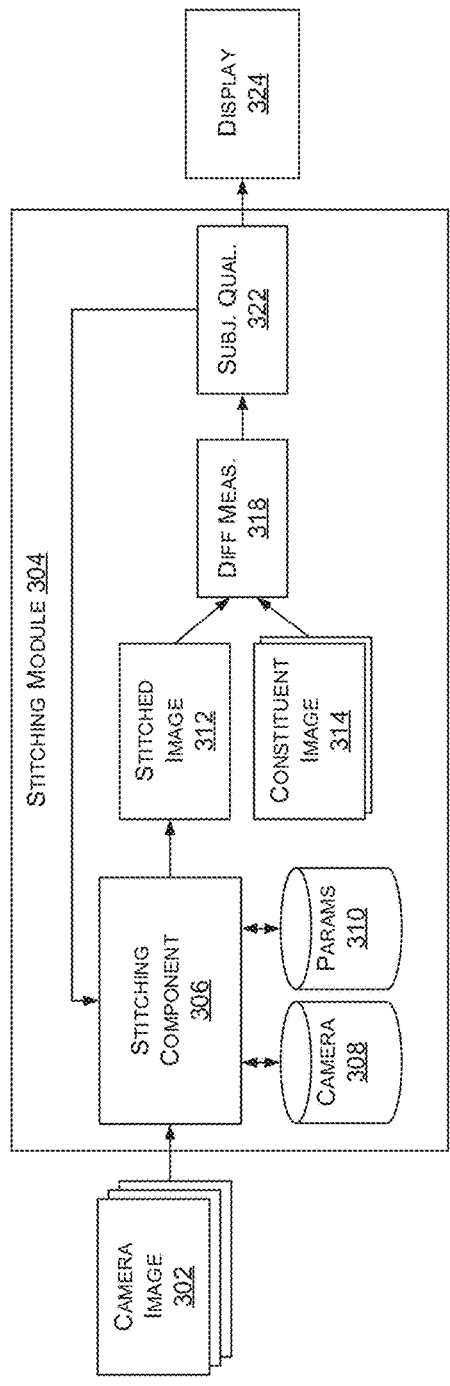
FIG. 3 is a diagram illustrating an example data flow through an example image stitching system, in accordance with some embodiments of the present disclosure.

FIG. 3 is a diagram illustrating an example data flow through an example image stitching system 300, in accordance with some embodiments of the present disclosure. In this example, a set of camera images 302 may be received as input, and may be received from multiple cameras associated with a given device or system (e.g., the example autonomous vehicle 3500 of FIGS. 35A-35D), or positioned with respect to a given environment, among other such options. In at least one embodiment, these images represent two or more different views of an environment that are, at most, partially overlapping. These images may represent a full, or partial, view of a scene, location, or environment. This image data may include "live" data that is streamed or transmitted shortly after image capture, or may include image data captured previously and provided in a more offline fashion.

In this example, the camera images may be provided to a stitching module 304 (some or all of which, may correspond to the stitching module 120 of FIG. 1) that may utilize these input camera images 302 to generate an output view or composite image, or video stream, for presentation via at least one display 324, such as a monitor, projector, or wearable display, among other such options. In this example, the camera images 302 may be provided to a stitching component 306 that will attempt to stitch multiple images together to generate a composite representation. The stitching module may use any of a number of different stitching or compositing algorithms, and may perform various blending or other image manipulation techniques. In at least one embodiment, the stitching module may utilize various intrinsic and extrinsic parameters of the cameras, at least to the extent values for these parameters are known and available from a camera database 308 or other such location, in order to properly assign the image data for compositing. This may include, for example, information such as the relative poses or orientation of these different cameras, such that at least an initial stitching position and orientation may be determined for each image. It should be understood that for image stitching and/or view generator systems that receive sequences of images or streams of video frame data, the images or frames to be composited may be those that correspond to, or were captured at, the substantially same point in time, at least to an extent to which such capture can be synchronized, or otherwise represent the same time slice.

The camera calibration parameters may be used to map the camera views into a stitched space, such as may correspond to a top-down view or "bowl" view in a projection space. This projection may be used to identify any overlapping regions between adjacent cameras, where one or more blending algorithms may be used to blend at least some of the pixels to make the stitching less visible or apparent. The stitching component 306 may utilize values for one or more stitching parameters, as may be stored to a parameter database 310 or other such location. Values for these parameters may determine aspects of how component images are stitched together, as may relate to weightings or locations for blending and other such aspects. Example stitching parameters include, but are not limited to, blending method (e.g., alpha blending or multiband blending), blending width, blending alpha map shape (e.g., angular based or perpendicular based), seam type (e.g., diagonal seam, vertical seam, or horizontal seam), and seam location. The stitching component 306 may utilize values for these various parameters with the input constituent images to generate a composite image, or stitched image 312, that provides a single representation of an environment, scene, or location at a point in time, such as a "current" point in time, accounting for some amount of latency in transmission and processing.

If a scene is not harmonized between cameras, it may be desirable to utilize a larger blending weight or radius (e.g., 200) to provide for a smoother transition between data from images. If it is a highly structured scene with lots of buildings and edges, for example, it may be desirable to utilize a smaller blending weight (e.g., 2) to avoid ghosting and other artifacts due to misalignment between cameras.

Single band blending may be utilized where images are blended in only one band (or a subset) of multiple bands. In at least one embodiment, constituent images are decomposed into different frequency bands or components, and different blending weights may be used for each of these bands or components.

In order to attempt to provide stitched images of high subjective quality, some amount of processing of a stitched image may be performed to attempt to assess the quality, as well as to use a result of that assessment to make any changes to the stitching parameters that may be desirable to improve the quality, at least where the determined quality is below a target or threshold value or determination. In this example, both the stitched image 312 from the stitching component 306, and the constituent images 314 used to generate that stitched image, may be utilized for a quality assessment determination. In some embodiments the constituent images may correspond directly to the input camera images 302, while in some embodiments these constituent images may have had at least some amount of processing performed, such as to reduce variations in brightness, color, or contrast, or to reduce a presence of noise or remove image artifacts, among other such options. In at least one embodiment, removing or reducing a presence of image artifacts in the individual constituent images before stitching may result in a higher quality stitched image.

In this example, the stitched image 312 and constituent images 314 may be processed to produce image data that better provides for one or more specific types of comparison. In at least one embodiment, this may include utilising a high pass filter 316 (or edge or feature detector) on the images to enhance or identify edges or other prominent features in the images. In some embodiments, a quality assessment 322 may be performed using any known technique, and if a measure of the quality assessment is below some designated threshold, the image data may be optimized in a loop, for example, by applying one or more geometric or photometric transforms and feeding the transformed image data back to the stitching component 306.

Dynamic Seam Placement and State-Dependent Image Stitching

One or more embodiments are directed to techniques for robust dynamic stitching of multiple images. These techniques maybe implemented in a Surround View System, such as one for a vehicle's cockpit, a vehicle occupant, or robotic remote operator, as example non-limiting embodiments. Existing systems move stitching seams to avoid cutting objects, where objects are detected by an Ultrasound Sensor (USS). Unfortunately, the typical usable distance of commercial USS systems is very short, thus only very close objects can be detected. Furthermore, the existing solution treats different viewports the same, and the viewport is selected manually. However, vehicle or robotic operators or occupants may have different preferences on where the seam location should be under different viewports, and automatically selecting viewports which best fit the underlying driving scenario is preferred.

As such, one or more embodiments are directed to a system that can be used with longer distance ranges and larger speed ranges relative to conventional systems, and provides improved visualization quality via viewport-dependent dynamic seam movement and automatically selecting viewports. For example, one or more embodiments provide a dynamic seam movement system that incorporates object detection, ego-vehicle speed, ego-vehicle moving direction, active viewport, driver gaze (e.g., a gaze heatmap), and/or visual saliency (e.g., a saliency mask) into a unified state machine that determines whether to use a default seam placement or dynamic seam placement that avoids salient regions or objects to achieve a better quality stitched view and automatic view selection. In some embodiments, dynamic seam placement may be enabled or disabled based on speed of ego-motion, direction of ego-motion, proximity to salient objects, active viewport, driver gaze, and/or other factors.

For example, according to one or more embodiments, a (e.g., visual) saliency mask may be computed to represent (and place higher weighting on) region(s) where drivers typically pay more attention to. For example, driver gaze may be monitored (e.g., using a camera or driver monitoring system), the region of the environment where the driver is looking may be determined from detected and projected into a corresponding region of a saliency mask, and the corresponding region (e.g., pixels corresponding to the driver's field of view, pixels within a bounding shape of a detected object the driver is looking at) may be updated to represent a measure of saliency. In this manner, a saliency mask that represents driver gaze may be used to steer seams away from regions where a driver is looking (e.g., when dynamic seam placement is enabled).

In embodiments, seams are placed to avoid cutting salient objects (e.g., certain detected objects) or salient regions (e.g., where a driver is looking based a detected direction of gaze). FIG. 4A shows an example surround view visualization 400 with a seam 404 placed vertically to avoid cutting a salient object or region (e.g., detected surrounding cars, regions where a driver is looking), in accordance with some embodiments of the present disclosure. When parking in between two cars, a driver may continuously check the distance from the ego-vehicle to neighboring or proximate cars and other objects to avoid collision. Accordingly, a saliency mask according to one or more embodiments may assign higher values or weights on the two cars, and the saliency mask may be used as input in dynamic seam placement. For example, in one or more embodiments, a position of one or more seams is adjusted to avoid regions assigned higher weights in a saliency mask. In FIG. 4A, depicting an example scenario, the two vehicles on each lateral/profile side of the center ego-vehicle may be assigned higher weights in a saliency mask, and a determination may be made to use a vertical seam (seam 404) to avoid stitching in portions of the underlying images that include or intersect the neighboring vehicles, thereby reducing distortion of the vehicles in a display or visualization.

In contrast, when driving on an open road, the driver may look more frequently in the front view rather than on the lateral sides. Accordingly, a saliency mask during this period of operation may assign higher weights to pixels corresponding to the front view and lower weights to pixels corresponding to the lateral sides. In this scenario, placement of one or more seams may be dynamically determined or adjusted to a horizontal or substantially horizontal position, placing a seam in a region corresponding to the lateral sides of the ego-vehicle to avoid the higher weighted saliency region in front of the ego-vehicle.

By way of illustration, assume a driver is looking to the left or right while driving a vehicle. In some embodiments, a seam may be placed vertically to avoid placing a seam in a region of a surround view visualization corresponding to the left or right of the vehicle, as in FIG. 4B, which shows an example surround view visualization 410 with a seam 415 extending vertically along the left surface of a vehicle. Now assume the driver is looking forward while driving the vehicle. In some embodiments, a seam may be placed horizontally to avoid placing a seam in a region corresponding to the front of the vehicle, as in FIG. 4C, which shows an example surround view visualization 420 with a seam 425 extending horizontally from the side surfaces of a vehicle to avoid creating artifacts in front of the vehicle.

In one or more embodiments, a saliency mask may be generated, determined, or obtained using a combination of object detection information, surrounding object distance information, ego-vehicle driving direction information, ego-vehicle speed information, current viewport information (e.g., direction of an active viewport), and/or other factors. For example, drivers typically pay most attention to the front when driving forward in an open space, so a default viewport scenario may place a viewport facing forward. As a result, a saliency mask may allocate higher weights/weighting in the center of the forward facing view based on the viewport facing forward, or the ego-vehicle driving forward, and a seam may be placed horizontally to present a better (less disrupted) forward facing view to the driver. However, when driving at low speeds and/or whenever an object (e.g., another vehicle) passes by closely (e.g., within a threshold distance), the driver may need to pay closer attention to the object passing by. As a result, in this case, a saliency mask may allocate higher weights to a region or pixels corresponding to the passing object, and a seam may be placed or relocated to avoid cutting through (intersecting or bisecting) the passing object. In another example, when navigating backward, the driver or operator may need to pay more attention to the rear of the ego-vehicle. As such, in this case, a seam may be placed (e.g., horizontally) to avoid cutting through objects behind the ego-vehicle. FIG. 4D is an example surround view visualization 430 updated with a backwards facing viewport 440 based on a vehicle traveling in reverse or the viewport 440 facing backwards.

In one or more embodiments, a saliency mask may be generated, determined, or obtained by training a machine learning model to predict a saliency mask under various viewports. In one or more embodiments, a dynamic seam location may be selected based on viewport information, with the location(s) of a seam(s) being dynamically determined or adjusted to avoid or minimize intersecting or bisecting salient objects. In embodiments, a salient object may be identified by any or a combination of: an object's distance to the ego-vehicle, a direction of movement of the ego-vehicle, or a driver's gaze direction (e.g., when the ego-vehicle drives forward, salient objects are determined to the front of the ego-vehicle, while when reversing, salient objects are determined to the back). As such, dynamically placing seams to avoid being placed in a saliency region avoids obvious visual artifacts appearing in a driver or operator's likely region or viewport of interest.

In one or more embodiments, a dynamic seam state machine dynamically changes under different viewports to correspond with different viewports. In one or more embodiments, a viewport can be dynamically changed based on driver's gaze information and/or direction of ego-motion. For example, when a driver drives along an alley, or if the driver continuously checks the surrounding cars to avoid collision when parking into a parking spot, then the viewport will be automatically selected or changed towards the driver's detected gaze direction or based on the ego-motion information to give the driver a better visualization. As such, in some embodiments, when driving or operating the ego-vehicle forward for a parking maneuver, the viewport may be changed to a forward-looking viewport; whereas when reversing during a parking maneuver, the viewport may be changed or selected to a backward-looking viewport.

In one or more embodiments, a dynamic seam location may be optimized to achieve high visual quality, e.g., to place seam on lower weight saliency region, and salient regions may be determined and/or weighted based on a designated or active viewport (e.g., which may be selected based on driving direction or scenario, driver gaze, etc.). FIG. 4E illustrates example surround view visualizations 450a-f with seams placed to avoid salient regions in various viewports. In FIG. 4E, surround view visualizations 450a-d represent side viewports and surround view visualizations 450e-f represent top-down viewports. In some embodiments, a designated (e.g., active) viewport may be assigned a viewport cost map, such as the one illustrated in FIG. 4F, which assigns a measure of saliency (e.g., higher values) to pixels in the center of the viewport and assigns a measure of non-saliency (e.g., lower values) to pixels toward the edge or boundary of the viewport. In some embodiments, the viewport cost map (or corresponding projected pixels) may be updated to represent a different region of saliency, for example, based on a determination that the driver's gaze is directed toward a different portion of the viewport. Additionally or alternatively, salient regions represented by the viewport cost map may be combined with other salient regions (e.g., representing detected objects, regions in the environment where the driver's gaze is directed) and the salient regions may be represented (e.g., by projecting corresponding pixels into) in a common saliency mask. Using and/or incorporating a viewport cost map may serve to encourage shorter seam lengths, since each seam may have endpoints that begin at a representation of the ego-vehicle in the center of the viewport (e.g., a black box, a computer graphic 3D model of the ego-vehicle, an under vehicle reconstruction) and terminate at the edge of the viewport. As a result, an optimal seam location may be dynamically determined or adjusted to avoid or minimize intersecting or bisecting salient regions, which may effectively identify the shortest candidate seam that crosses the fewest (e.g., projected) pixels of the viewport cost map and/or that encourages placing a seam towards the boundary of a viewport's field of view.

In in the surround view visualizations 450a-f of FIG. 4E, the non-optimized candidate seams 460a-f represent candidate seams that cross salient regions, and the optimized seams 470a-f represent optimized seams that avoid or minimize crossing salient regions. For example, in the surround view visualizations 450a-d and the upper half of the surround view visualization 450e, the non-optimized candidate seams 460a-f cross salient objects, so the corresponding optimized seams 470a-e have been selected to avoid crossing those salient objects. In the surround view visualization 450f, the non-optimized candidate seams 460f are longer than the optimized candidate seams 470f. As a result, using a corresponding measure of saliency in a cost function serves to assign the non-optimized candidate seams 460f a higher cost than the optimized candidate seams 470f because the non-optimized candidate seams 460f cross more salient pixels.

FIG. 5 is an example dynamic seam stitching module 500, in accordance with some embodiments of the present disclosure. The dynamic seam stitching module 500 may correspond to the stitching module 120 of FIG. 1 or the stitching module 304 of FIG. 3. In this example, the dynamic seam stitching module 500 includes an alignment component 510, a seam placement component 520, and a blending component 590. At a high level, the alignment component 510 may receive frames of image data (e.g., images) representing overlapping views of an environment, and use corresponding camera parameters to align the frames and create an aligned composite image (e.g., a panorama, a 360° image) with regions of overlapping image data. The seam placement component 520 may determine where in each overlapping region to place a seam, and the blending component 590 may use any suitable blending technique to blend the overlapping image data at each seam and create a stitched image (e.g., a panorama or 360° image).

In the embodiment illustrated in FIG. 5, the seam placement component 520 includes a dynamic seam toggling state machine 530 that determines whether to use a default seam placement or a dynamic one (e.g., based on object saliency). When using dynamic seam placement, an object detector 540 may perform or access results of object detection and generate one or more object and/or saliency masks for each frame. A projection component 550 may project each object and/or saliency mask onto the composite image to overlay each overlapping region of image data with two (or more) different object and/or saliency masks representing objects or other salient regions detected by multiple sensors. As such, a seam steering component 560 may determine a seam placement for each overlapping region (e.g., using a seam update state machine 570) to avoid (or attempt to avoid) placing a seam on salient regions represented in both overlaid masks. In some embodiments, a temporal filter may be applied over a temporal window (e.g., 30 frames of data buffered first-in-first-out) to signals used to determine dynamic seam locations (e.g., distances to detected objects) and/or determined seam locations to stabilize the seam over time and reduce or minimize jumps in seams from frame-to-frame.

Turning initially to the dynamic seam toggling state machine 530 of the seam placement component 520, the dynamic seam toggling state machine 530 may determine whether to use a default seam placement or dynamic seam placement that avoids salient objects or regions. FIG. 6 is an example dynamic seam placement state machine 600 that includes a dynamic seam toggling state machine 601, which may correspond to the dynamic seam toggling state machine 530 of FIG. 5. The dynamic seam placement state machine 600 of FIG. 6 implements an example decision tree that determines whether to use a default seam placement or dynamic seam placement that avoids salient objects or regions, and to enable and disable dynamic seam placement based on speed of ego-motion of an ego-vehicle, direction of ego-motion, proximity to salient objects, active viewport direction, driver gaze, and/or other factors. For example, for each time slice and a set of frames being stitched for that time slice, the dynamic seam placement state machine 600 may determine where to place a seam in each region of overlapping image data in an aligned composite image generated from the set of frames.

The dynamic seam placement state machine 600 of FIG. 6 includes a dynamic seam toggling state machine 601 (e.g., corresponding to the dynamic seam toggling state machine 530 of FIG. 5) that toggles between dynamic and default seam placements, and a seam update state machine 651 (e.g., corresponding to the seam update state machine 570 of FIG. 5) that determines a seam placement that avoids (or attempts to avoid) placing a seam on salient regions and/or gradually moves a seam over time.

The dynamic seam toggling state machine 601 includes a forward viewport or forward driving scenario 605 that is activated based on a determination that an ego-vehicle is traveling in a substantially forward direction (e.g., based on a signal representing the direction of ego-motion), or based on the viewport of a virtual camera facing forward. In this scenario, at block 610, ego-speed is determined (e.g., from a speed sensor). If ego-speed is below a lower speed threshold (e.g., less than 5 km/hr), at block 615, the dynamic seam toggling state machine determines the distance to the closest object (e.g., detected or salient object), as explained in more detail below. If the distance to the closest object is less than some threshold proximity (e.g., less than 3 m), the dynamic seam toggling state machine 601 enables dynamic seam placement at block 620. If the distance to the closest object is more than the threshold proximity, the dynamic seam toggling state machine 601 disables dynamic seam placement at block 625 and uses a default seam placement instead (e.g., horizontal or other default values, such as one that minimizes seam length visible in a particular viewport). Returning to block 610, when ego-speed is within some medium speed range (e.g., from 5-16 km/hr), the dynamic seam toggling state machine 601 disables dynamic seam placement in favor of a default seam (e.g., a horizontal seam).

Returning to block 615, distances to surrounding objects may be obtained or determined in various ways. In some embodiments, 3D object detection is performed (e.g., by processing sensor data) and/or a representation of detected 3D objects (e.g., 3D cuboids in rig coordinates) is accessed. For example, distance to objects may be computed using depth or stereo camera arrays; alternatively, 2D bounding boxes and/or 3D cuboids may be predicted from image data (e.g., fisheye images), LiDAR or RADAR detections, and/or other sensor data using one or more machine learning models. As such, distances between the vehicle (e.g., the vehicle center) and the detected objects may be computed from predicted and/or sensed locations. Additionally or alternatively, sensor data such as a LiDAR or RADAR point cloud representing detected objects may be projected into a 2D top-down occupancy grid, and distances to detected objects may be computed from the 2D occupancy grid. In some embodiments, some other ranging technique may be additionally such alternatively applied, for example, by feeding image data into a deep neural network trained on LiDAR data to predict a depth map representing distances to detected objects. These are just a few examples, and other ranging techniques may additionally or alternatively be applied.

The dynamic seam toggling state machine 601 also includes a scenario 630 for other viewports or driving directions besides forward facing or forward moving. In this example, scenario 630 may be activated based on a determination that an ego-vehicle is traveling in some other direction besides substantially forward (e.g., based on a signal representing the direction of ego-motion), or based on the viewport of a virtual camera facing some other direction besides forward. In this scenario, at block 635, ego-speed is determined (e.g., from a speed sensor). If ego-speed is below a lower speed threshold (e.g., less than 5 km/hr), the dynamic seam toggling state machine 601 enables dynamic seam placement at block 640. If ego-speed is within some medium speed range (e.g., from 5-16 km/hr), the dynamic seam toggling state machine 601 enables dynamic seam placement at block 645.

The example illustrated in FIG. 6 shows an example scenario in which blocks 620 and 640 trigger the seam update state machine 651 to activate a close object priority scenario 655, and block 645 triggers the seam update state machine 651 to activate a gradual move scenario 675, but this is just an example. Generally, the dynamic seam toggling state machine 601 may trigger any dynamic seam placement technique, including but not limited to the close object priority scenario 655, the gradual move scenario 675, techniques implemented by the seam placement component 520 of FIG. 5, techniques involved in the seam steering 760 of FIG. 7A, and/or others.

For example, returning briefly to FIG. 5, in some embodiments, the dynamic seam toggling state machine 530 of the seam placement component 520 triggers dynamic seam placement using the object detector 540, the projection component 550, and the seam steering component 560. FIG. 7A is a diagram illustrating an example dynamic seam placement technique 700 using corresponding steps for object detection 740, projection 750, and seem steering 760.

The example dynamic seam placement technique 700 operates on input images 705a-d, which in this example, are fisheye images representing front, right, rear, and left fields of view with respect to an ego-vehicle (e.g., a car), respectively.

In some embodiments, the input images 705a-d are processed (e.g., by the object detector 540 of FIG. 5) using object detection 740 to generate corresponding masks 745a-d (e.g., object or saliency masks). Generally, object detection 740 may be performed using 2D object detection (e.g., applied on the input images 705a-d) or 3D object detection (e.g., from the images 705a-d, a 3D point cloud of corresponding LiDAR or RADAR detections). In some embodiments, salient objects may be identified from detected objects, for example, based on a detected object class (e.g., emergency vehicles, road users, moving objects), driving scenario (e.g., surrounding vehicles when parking between the vehicles, any close object when parallel parking), distance to the vehicle, and/or other factors. In some embodiments, detected objects beyond some threshold distance to the ego-vehicle (e.g., 3 m, 7 m, 15 m, etc.) may be filtered out or ignored to free up computational resources. Depending on the implementation, objects deemed to be non-salient may be filtered out or ignored, and/or salient objects may be assigned a higher priority (or weight) than non-salient objects in the masks 745a-d. In some embodiments, object detection 740 may generate a binary object mask representing whether or not each point (e.g., each pixel in a 2D mask corresponding to each image) corresponds to a depicted part of a detected (salient) object represented by each input image 705a-d, and the binary object masks for the input image 705a-d may be used as the masks 745a-d. In some embodiments, a binary object mask may be used to derive a weighted saliency mask representing a measure of saliency of each point (e.g., by weighting the binary object mask based on proximity of a corresponding detected object, prioritizing certain classifications of detected object, using logic that depends on driving scenario), and the weighted saliency masks for the input image 705a-d may be used as the masks 745a-d. In some embodiments, a machine-learning model may be trained to predict a weighted saliency mask using training data labeled with a measure of ground truth saliency (e.g., objects or regions deemed to be important by human labelers). In some cases, driver gaze may be monitored, the region of the environment where the driver is looking may be projected into a corresponding region of the masks 745a-d, and the corresponding region (e.g., corresponding pixels) may be updated in the masks 745a-d to represent a measure of saliency. These are just a few examples, and other techniques that quantify saliency are contemplated within the scope of the present disclosure.

Projection 750 may be performed (e.g., by projection component 550 of FIG. 5) to project the masks 745a-d onto a 2D or 3D representation of the environment surrounding the ego-machine (e.g., a top-down representation such as a representation of the ground) using camera calibration parameters representing each corresponding camera's position and orientation in the environment to generate corresponding mask projections 755*a-d* that are aligned with the environment. For example, the projection component 550 may perform a top-down projection to project each of the masks 745*a-d* onto a ground plane of the environment to generate corresponding mask projections 755*a-d*. In this example, since the input images 705*a-d* had overlapping fields of view (e.g., the same nearby vehicle is visible in input images 705*a* and 705*d*), the corresponding masks 745*a-d* have overlapping fields of view (e.g., masks 745*a* and 745*d* have corresponding pixels that indicate the presence of the nearby vehicle), and the corresponding mask projections 755*a-d* have overlapping fields of view (e.g., mask projections 755*a* and 755*d* have corresponding pixels that indicate the presence of the nearby vehicle).

Generally, since the input images 705*a-d* represent different perspectives, the same object may be represented in different images with different shapes and sizes. As a result, an overlapping region between two of the mask projections 755*a-d* may have different representations of the same object that do not align perfectly. Accordingly, some embodiment may consider data from multiple overlapping mask projections when determining where to place a seam for a stitched image 770.

More specifically, overlapping regions between the mask projections 755*a-d* may be determined. For example, projection 750 may include identifying the portion of two or more of the mask projections 755*a-d* that lands in an overlapping region between the projections 755*a-d*. The mask projections 755*a-d* may be represented as corresponding 2D (e.g., top-down) or 3D representations of the environment that at least partially overlap with one another, forming a 2D or 3D overlapping region in which object or saliency data from the masks 745*a-d* projects onto the same point (e.g., pixel, voxel). Taking an overlapping region in a 2D top-down representation of the surrounding environment as an example, any given pixel in the overlapping region may represent different values for different mask projections 755*a-d*. In the example illustrated in FIG. 7A which involves four input images 705*a-d*, projection 750 may serve to identify four overlapping regions corresponding to the front-left, front-right, rear-right, and rear-left of the ego-vehicle, with each overlapping region including two overlapping mask projections. FIG. 7B is an enlarged view of the overlapping mask projections 762*a* and 762*b*, 764*a* and 764*b*, 766*a* and 766*b*, 768*a* and 768*b*, respectively.

Each set of overlapping mask projections in an overlapping region represents an overlapping field of view represented by corresponding input images 705*a-d*. In order to stitch the corresponding input images 705*a-d*, seam steering 760 may be performed (e.g., by seam steering component 560 of FIG. 5) to determine a seam placement for each overlapping region (e g., seams 782*a* and 782*b*, 784*a* and 784*b*, 786*a* and 786*b*, 788*a* and 788*b* of FIG. 7B). Based on correspondences between input images 705*a-d*, an aligned representation thereof (e.g., a composite image such as a panorama or 360° image, a 2D or 3D top-down projection), and the overlapping mask projections 762*a-768b*, the overlapping mask projections 762*a-768b* may be thought of as being overlaid on or projected onto the composite image or surface. As such, the overlapping mask projections 762*a-768b* may share a coordinate system with the composite image or surface, and as a result, a seam placement determined with respect to the overlapping mask projections 762*a-768b* may implicitly determine a seam placement in the same coordinate system as the image data to be stitched. Generally, seam placement may be determined at any stage and any coordinate system and may be translated, (un)projected, or otherwise transferred to a corresponding stage of an image stitching pipeline. For the purposes of illustration, the example represented by FIGS. 7A and 7B involves projecting the input images 705*a-d* and the masks 745*a-d* into corresponding 2D top-down representations with 2D overlapping regions, and a seam is placed in (or on a boundary of) each 2D overlapping region.

Seam steering 760 may place (or attempt to place) a seam in each overlapping region that avoids (or minimizes) crossing (salient) objects or regions represented in each of the overlapping mask projections 762*a-768b*. In some cases, a seam may be steered through each overlapping region to avoid or minimize cutting through or intersecting object or salient pixels represented in the overlapping mask projections 762*a-768b*. Seams of any shape may be used, whether straight, curved, segmented, or otherwise. Any suitable technique may be used to iterate or scan through possible seam placements, and each candidate seam placement may be evaluated to determine whether and/or to what extent the candidate seam intersects object or salient pixels (e.g., a binary indication, count of intersected pixels, a sum of intersected pixels weighted by saliency).

FIG. 7B illustrates an example involving a straight seam and a substantially rectangular overlapping region between the overlapping mask projections 762*a* and 762*b*. One end of a seam may be placed at one end point in the region, such as a corner representing the closest portion of the environment to the ego-vehicle (e.g., corners 770*a*, 770*b*), and a straight line may be drawn from that end point to another end point at an opposite portion of the region. For example, starting at the corners 770*a*, 770*b*, a ray may be projected out at an angle 775, a seam space may be scanned over different values of the angle 775 to cover the overlapping mask projections 762*a* and 762*b* (e.g., from 0-90°), and each corresponding candidate seam (e.g., seam 782) may be traversed through the pixels of the region and evaluated. In the example illustrated in FIGS. 7A and 7B, seam steering 760 identified seams 782*a* and 782*b*, 784*a* and 784*b*, 786*a* and 786*b*, and 788*a* and 788*b* that avoid or minimize intersecting object or salient pixels.

In some situations, scanning a seam space and evaluating candidate seams serves to identify multiple candidate seams (e.g., whether straight or some other shape) that avoid object or salient pixels. If there are multiple candidate seams, seam steering 760 may select one that minimizes the distance to the seam placement from the previous time slice, maximizes separation from salient or object pixels, or otherwise.

In some situations, there may be no candidate seam that avoids object or salient pixels. In some such situations, seam steering 760 may select a default seam placement (e.g., vertical, horizontal, diagonal) or a seam placement from the previous time slice. Additionally or alternatively, seam steering 760 may include evaluating candidate seams to identify a seam that minimizes the amount of intersected object or salient pixels, that minimizes an energy function (e.g., having a cost that penalizes candidate seams that intersect or cover object or salient pixels, is weighted by saliency or proximity, is based on multiple images from different time slices to promote temporal stability), and or otherwise. If there are multiple candidate seams that would satisfy the designated criteria (e.g., that have the same cost or number of intersected object or salient pixels), seam steering 760 may include selecting a seam location that minimizes the distance to the seam placement from the previous time slice.

In some embodiments, costs for different seam shapes may be evaluated using a connected components analysis and/or using dynamic programming (e.g., based on designated permissible directions in which a seam may traverse to adjacent diagonal or edge pixels). In some embodiments, edge detection is performed (e.g., on image data in the overlapping region), and graph cuts and/or seam carving may be applied to carve out high frequency content (e.g., detected edges) of the overlapping region from potential solutions, such that candidate seams cannot travel through the graph cut. As a result, high frequency content like the edges of vehicles may be effectively designated as salient to discourage placing seams over detected edges, which may represent visually important information.

By way of non-limiting example, and returning to FIG. 6, in some cases, seam steering 760 may implement the close object priority scenario 655 of the seam update state machine 651 of FIG. 6. In this example, at block 660, the closest detected object to the ego-vehicle is identified (e.g., using any of the ranging techniques described herein), and a determination is made whether it is possible to avoid placing a seam that avoids the closest detected object (e.g., using any of the techniques described herein). In some embodiments, the identification of the closest detected object is represented in a corresponding object or saliency mask, and the determination of whether there a seam that avoids the closest detected object uses the seam scanning techniques described herein. If it is possible to avoid the closest detected object, at block 665, a seam placement that avoids the closest object is selected (e.g., using any of the techniques described herein). If it is not possible, at block 670, a default seam placement is used (e.g., horizontal, vertical, diagonal, the default seam placement for the applicable scenario 605 and 630).

In another non-limiting example, in some cases, seam steering 760 may implement the gradual move scenario 675 of the seam update state machine 651 of FIG. 6. In this example, at block 680, the previous frame's seam is retrieved, and, at block 685, is used as a baseline to determine whether the previous frame's seam crosses an object in the current frame (e.g., using the seam scanning techniques described herein). If the previous frame's seam does not cross an object in the current frame, at block 690, the previous frame's seam is selected for the current frame. If the previous frame's seam does cross an object in the current frame, at block 695, distant objects may be removed from the mask projection being evaluated (e.g., detected objects that are farther than some distance such as 15 meters, detected objects that are less than some length in pixels such as 500 pixels), a vertical or horizontal seam is selected when the entire mask projection being evaluated (the overlapping region) is occupied by a detected object (to avoid the object), and/or a seam is selected that crosses the least number of (remaining) object pixels (e.g., using proximity to the previous frame's seam as a tie-breaker).

As such, and returning to the example illustrated in FIGS. 7A and 7B, seam 782a and 782b may be selected for overlapping mask projections 762a and 762b, seam 784a and 784b may be selected for overlapping mask projections 764a and 764b, seam 786a and 786b may be selected for overlapping mask projections 766a and 766b, and seam 788a and 788b may be selected for overlapping mask projections 768a and 768b. Accordingly, the input images 705a-d may be aligned, stitched at the seams, and projected (or aligned, projected, and stitched at the seams) to create the stitched image 770 (in this example, a stitched top-down projection image).

FIGS. 8A and 8B are example images and surround view visualizations with and without dynamic seam placement, in accordance with some embodiments of the present disclosure. More specifically, in FIG. 8A, front image 801 and right image 802 show fields of view in front and to the right of an ego-vehicle, respectively. Circles 805 and 806 identify where the same object (a nearby vehicle) appears in the front image 801 and the right image 802, respectively. In FIG. 8B, the left column shows two stitched images 810, 830 in which the front image 801 and the right image 802 (as well as rear and left images, not depicted) have been stitched together, and the right column shows corresponding visualizations 850, 860 of the seam locations in the stitched images 810, 830. The top row illustrates a scenario in which a fixed diagonal seam (e.g., seam 855) is used, and the bottom row illustrates a scenario in which dynamic seam placement is used to steer a seam to avoid detected or salient objects. The vehicle shown in circles 805 and 806 of FIG. 8A is shown in circle 820 in the enlarged view 815 of the top right portion of the stitched image 810 and in circle 840 in the enlarged view 835 of the top right portion of the stitched image 830. In the fixed diagonal seam scenario, since the seam 855 cuts through the vehicle represented in circle 820, ghosting has occurred. By contrast, in the dynamic seam placement scenario, seam 865 was selected to avoid crossing the vehicle, and as a result, there is no ghosting in the circle 840.

FIG. 9 shows example surround view visualizations with and without dynamic seam placement, in accordance with some embodiments of the present disclosure. In FIG. 9, the top row shows surround view visualizations 910, 920 that use fixed seam placement, and the bottom row shows corresponding surround view visualizations 930, 940 that use dynamic seam placement. In surround view visualizations 910, a fixed seam placement results in ghosting in circle 915, whereas in surround view visualizations 930, dynamic seam placement does not result in ghosting in circle 935. Similarly, in surround view visualizations 920, a fixed seam placement causes ghosting in circle 925, whereas in surround view visualizations 940, dynamic seam placement does not result in ghosting in circle 945.

Now referring to FIGS. 10, 11, and 12, each block of methods 1000, 1100, and 1200, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 1000, 1100, and 1200 may be understood, by way of example, with respect to the stitching module 120 of FIG. 1, the stitching module 304 of FIG. 3, or the dynamic seam stitching module 500 of FIG. 5. However, these methods may additionally or alternatively be executed by any one system, or any combination of systems, including, but not limited to, those described herein.

FIG. 10 is a flow diagram showing a method 1000 for determining a position for a seam using projected masks, in accordance with some embodiments of the present disclosure. The method 1000, at block B1002 includes generating two or more aligned image frames captured during a first time slice and representative of two or more overlapping viewpoints around an ego-object in an environment. For example, with respect to FIG. 5, the alignment component 510 may access frames of image data (e.g., images) representing overlapping views of an environment, and use corresponding camera parameters to align the frames and create an aligned composite image (e.g., a panorama, a 360° image, a top-down projection image) with regions of overlapping image data.

The method 1000, at block B1004 includes generating two or more projected masks comprising overlapping representations of detected objects depicted in the two or more aligned image frames. For example, with respect to FIG. 5, the projection component 550 may project two or more object and/or saliency masks onto an aligned composite image to overlay each overlapping region of image data with two (or more) different object and/or saliency masks representing objects or other salient regions detected by multiple sensors.

The method 1000, at block B1006 includes determining a candidate position for a seam in an overlapping region of the two or more aligned image frame. For example, with respect to FIG. 5, the seam steering component 560 may determine a seam placement for each overlapping region to avoid (or attempt to avoid) placing a seam on salient regions represented in two or more overlaid (projected) masks. As such and with respect to FIG. 7B, seam steering 760 may be performed (e.g., by seam steering component 560 of FIG. 5) to determine a seam placement for each overlapping region (e g., seams 782a and 782b, 784a and 784b, 786a and 786b, 788a and 788b of FIG. 7B). In an example with a straight seam, starting at the corners 770a, 770b, a ray may be projected out at an angle 775, a seam space may be scanned over different values of the angle 775 to cover the overlapping mask projections 762a and 762b (e.g., from 0-90°), and one or more corresponding candidate seams (e.g., seam 782) may be traversed through the pixels of the region and evaluated. In some embodiments, the seam update state machine 651 of FIG. 6 may retrieve a previous frame's seam and use the previous frame's seam as a candidate seam for the current frame. Generally, seams of any shape may be used, whether straight, curved, segmented, or otherwise.

The method 1000, at block B1008 includes updating the candidate position for the seam to an updated position based at least on an intersection of the seam at the candidate position with pixels of the detected objects in one or more of the two or more projected masks. For example, with respect to FIG. 7B, seam steering 760 may be performed (e.g., by seam steering component 560 of FIG. 5) by evaluating each of a plurality of candidate seams to determine whether and/or to what extent each candidate seam intersects object or salient pixels (e.g., a binary indication, count of intersected pixels, a sum of intersected pixels weighted by saliency), and an updated seam position that avoids (or minimizes) crossing (salient) objects or regions represented in each of the overlapping mask projections 762a-768b may be determined.

In some embodiments, the seam update state machine 651 of FIG. 6 may determine whether a previous frame's seam crosses an object in the current frame (e.g., using the seam scanning techniques described herein). If the previous frame's seam does cross an object in the current frame, at block 695, distant objects may be removed from the mask projection being evaluated (e.g., detected objects that are farther than some distance such as 15 meters, detected objects that are less than some length in pixels such as 500 pixels), a vertical or horizontal seam is selected when the entire mask projection being evaluated (the overlapping region) is occupied by a detected object (to avoid the object), and/or a seam is selected that crosses the least number of (remaining) object pixels (e.g., using proximity to the previous frame's seam as a tie-breaker).

The method 1000, at block B1010 includes generating a visualization composite image frame based at least on stitching the two or more aligned image frames using the updated position of the seam. For example, with respect to FIG. 5, the blending component 590 may use any suitable blending technique to blend overlapping image data at each seam and create a stitched image (e.g., a panorama, 360° image, projection image).

FIG. 11 is a flow diagram showing a method 1100 for determining a position for a seam based at least on projected overlapping representations of one or more salient regions, in accordance with some embodiments of the present disclosure. The method 1100, at block B1102 includes generating two or more saliency masks representing one or more salient regions depicted in corresponding image frames captured using two or more cameras of an ego-object in an environment during a first time slice. For example, the object detector 540 may perform or access results of object detection and generate one or more object and/or saliency masks for each image frame. In some embodiments, and with respect to FIG. 7A, object detection 740 may generate a binary object mask representing whether or not each point (e.g., each pixel in a 2D mask corresponding to each image) corresponds to a depicted part of a detected (salient) object represented by each input image 705a-d, and the binary object masks for the input image 705a-d may be used as the masks 745a-d. In some embodiments, a binary object mask may be used to derive a weighted saliency mask representing a measure of saliency of each point (e.g., by weighting the binary object mask based on proximity of a corresponding detected object, prioritizing certain classifications of detected object, using logic that depends on driving scenario).

The method 1100, at block B1104 includes generating an aligned composite representation that aligns the corresponding image frames and includes a region of overlapping image data. For example, with respect to FIG. 5, the alignment component 510 may access frames of image data (e.g., images) representing overlapping views of an environment, and use corresponding camera parameters to align the frames and create an aligned composite image (e.g., a panorama, a 360° image, a top-down projection image) with regions of overlapping image data.

The method 1100, at block B1106 includes generating projected overlapping representations of the one or more salient regions based at least on projecting the two or more saliency masks onto a portion of the aligned composite representation corresponding to the region of overlapping image data. For example, with respect to FIG. 5, the projection component 550 may project two or more object and/or saliency masks onto an aligned composite image to overlay each overlapping region of image data with two (or more) different object and/or saliency masks representing objects or other salient regions detected by multiple sensors.

The method 1100, at block B1108 includes determining a seam location in the region of overlapping image data based at least on the projected overlapping representations of the one or more salient regions. For example, with respect to FIG. 5, the seam steering component 560 may determine a seam placement for each overlapping region to avoid (or attempt to avoid) placing a seam on salient regions represented in two or more overlaid (projected) masks.

The method 1100, at block B1110 includes generating a stitched representation of the environment based at least on stitching the image data in the overlapping region at the seam location. For example, with respect to FIG. 5, the blending component 590 may use any suitable blending technique to blend overlapping image data at each seam and create a stitched image (e.g., a panorama, 360° image, projection image).

FIG. 12 is a flow diagram showing a method 1200 for determining whether to use a default placement or a dynamic placement for a seam, in accordance with some embodiments of the present disclosure. The method 1200, at block B1202 includes generating two or more aligned image frames captured during a first time slice and representative of two or more overlapping viewpoints around an ego-object in an environment. For example, with respect to FIG. 5, the alignment component 510 may access frames of image data (e.g., images) representing overlapping views of an environment, and use corresponding camera parameters to align the frames and create an aligned composite image (e.g., a panorama, a 360° image, a top-down projection image) with regions of overlapping image data.

The method 1200, at block B1204 includes determining, based at least on an active viewport or a state of the ego-object, whether to use a default placement for a seam, or a dynamic placement that attempts to avoid placing the seam in a salient region. For example, with respect to FIG. 6, the dynamic seam toggling state machine 601 may determine whether to use a default seam placement or a dynamic one, and enable and disable dynamic seam placement based on speed of ego-motion of an ego-vehicle, direction of ego-motion, proximity to salient objects, active viewport direction, driver gaze, and/or other factors. For example, for each time slice and a set of frames being stitched for that time slice, the dynamic seam placement state machine 600 may determine where to place a seam in each region of overlapping image data in an aligned composite image generated from the set of frames.

The method 1200, at block B1206 includes generating a visualization composite image frame based at least on stitching image data of the two or more aligned image frames using the default placement or the dynamic seam placement of the seam. For example, with respect to FIG. 5, the blending component 590 may use any suitable blending technique to blend overlapping image data at each seam and create a stitched image (e.g., a panorama, 360° image, projection image).

Adaptive 3D Bowl Model of the Surrounding Environment

One or more embodiments are directed to techniques for visualizing an environment surrounding an ego-object (e.g., a vehicle, such as the example autonomous vehicle 3500 of FIGS. 35A-35D) using an adaptive 3D bowl that models the surrounding environment and has a 3D shape that changes based on the distance to nearby detected objects. As such, image data representing the surrounding environment may be projected onto an adaptive 3D bowl to generate a textured 3D bowl that reduces visual distortion over prior techniques, and a view of the textured 3D bowl may be rendered from the perspective of a virtual camera.

By way of background, FIG. 13 illustrates an example data flow through an example surround view visualization system 1300 that uses a 3D bowl 1320, in accordance with some embodiments of the present disclosure. In FIG. 13, the input images 1310 are four fisheye images captured by fisheye cameras located at the front, left, rear and right sides of a vehicle body. In an example embodiment, the stitching module 1325 and the projection module 1335 process the input images 1310 to generate a top-down view 1330 of the input images. For example, the input images 1310 may be aligned by the stitching module 1325, stitched by the stitching module 1325, and projected by the projection module 1335 into the top-down view 1330 (or aligned, projected, and stitched). In some embodiments, to perform a top-down projection, the projection module 1335 back-projects 2D points in pixel coordinates to 3D points using corresponding depth values obtained from a 3D model of the surrounding environment (e.g., the 3D bowl 1320), from a depth map or range image (e.g., captured using LiDAR or RADAR sensor(s); generated by a deep neural network from image data, LiDAR or RADAR detections, and/or other sensor data), and/or otherwise. With the image data assigned to corresponding 3D points, the projection module 1335 may orthographically project the 3D points, for example, into the top-down view 1330. In some embodiments, a UV mapping module 1345 maps the top-down view 1330 onto the 3D bowl 1320, texturizing the 3D bowl 1320 with image data, to generate a textured 3D bowl 1340 (e.g., a UV mapped mesh, using forward or reverse mapping), and a viewport renderer 1355 may position and orient a virtual camera in a 3D scene with the textured 3D bowl 1340 and use the virtual camera to render a view (e.g., image 1350) of the textured 3D bowl 1340 for a corresponding viewport.

Note that the surround view visualization system 1300 is meant simply as an example, and other techniques may be used to render a surround view visualization in a desired viewport. For example, given a desired viewport (e.g., with designated position, orientation, size, shape), a view of a 3D representation of the surrounding environment through the viewport may be rendered directly from captured image data using a reverse projection to determine which pixel in the captured image data each pixel of the viewport rendering maps to (e.g., without generating the top-down view 1330 or the textured 3D bowl 1340).

In embodiments that orthographically project image data into a 2D projection image (e.g., a top-down view) using depth values retrieved from a 3D bowl (e.g., the 3D bowl 1320), and/or embodiments that project image data onto a 3D bowl (e.g., using UV mapping), the shape of the 3D bowl may impact the appearance of the projected image data. FIG. 14 shows example surround view visualizations of textured circular and elliptical 3D bowls, in accordance with some embodiments of the present disclosure. In FIG. 14, surround view visualization 1410 is a rendering of a circular 3D bowl textured with image data from the environment surrounding the black car, and surround view visualization 1440 is a rendering of an elliptical 3D bowl textured with image data from the environment surrounding the black car. The circular 3D bowl used to render the surround view visualization 1410 is represented to the left by circle 1420, which corresponds to a top-down view of the inner bowl of the circular 3D bowl. The circle 1420 illustrates an example position and dimensions of the inner bowl with respect to an example vehicle represented by top-down vehicle outline 1430. The elliptical 3D bowl used to render the surround view visualization 1440 is represented by ellipse 1450, which corresponds to a top-down view of the inner bowl of the elliptical 3D bowl. The ellipse 1450 illustrates an example position and dimensions of the inner bowl with respect to an example vehicle represented by top-down vehicle outline 1460. Notice how objects in front of the vehicle are depicted in the surround view visualizations 1410 and 1440 with different sizes, due to the underlying image data being projected different distances in that direction between the vehicle and the sides of the circular and elliptical 3D bowls. For example, the bushes in front of the vehicle are closer to the vehicle than the front side of the elliptical 3D bowl, so projecting an image of the buses onto the front side of the elliptical 3D bowl creates a scale magnification.

More generally, FIG. 15 shows some example artifacts that can arise in surround view visualizations that use a 3D bowl. In a scale magnification scenario, the front car 1510 has a rear-mounted camera with a field of view 1515 that includes the rear car 1520. Using a 3D bowl with a side 1525, the rear car 1520 is inside the side 1525 of the 3D bowl. As a result, projecting an image of the rear car 1520 captured by the rear-mounted camera onto the side 1525 of the 3D bowl will create a scale magnification since the assumed depth (distance to the side 1525 of the 3D bowl) is greater than the actual depth (distance to the rear car 1520).

In a ghosting scenario, multiple cameras mounted on the car 1530 pick up an object 1540 that is farther away than the side of the 3D bowl 1550 (e.g., outside the 3D bowl 1550). In this case, projecting multiple images of the object 1540 onto the side of the 3D bowl 1550 leads to ghosting or duplication, as the projected object 1560 appears twice on the side of the 3D bowl 1550.

In an object disappearance scenario, an object 1570 that is inside the 3D bowl 1580 is partially or completely lost during the projection process, leading to partial or complete object disappearance.

To reduce visual artifacts such as these, some embodiments that use a 3D bowl that models the surrounding environment (e.g., a 3D bowl mesh) adapt the shape of the 3D bowl based on distance to detected objects. FIG. 16 illustrates an example adaptive 3D bowl generator 1600 that adapts a 3D bowl based on distance to detected objects, in accordance with some embodiments of the present disclosure. The adaptive 3D bowl generator 1600 may correspond to the adaptive 3D bowl generator 150 of FIG. 1 (e.g., the 3D object detector 1620 and the radial distance mapper 1630 may correspond to the depth estimator 155 of FIG. 1, and the 3D bowl parameter controller 1650 may correspond to the 3D bowl adapter 160 of FIG. 1). At a high level, one or more sensors (e.g., cameras) of an ego-object (e.g., a vehicle) may be used to capture input images 1610 and/or other sensor data. A 3D object detector 1620 may perform 3D object detection on the sensor data (e.g., the input images 1610, corresponding RADAR or LiDAR data) representing the surrounding environment. In some embodiments, sensor data such as a LiDAR point cloud may be projected onto a top-down 2D occupancy grid that represents locations of detected objects. A radial distance mapper 1630 may compute distance(s) to the closest detected object as a function of angle (e.g., representing a rotation around an axis of the coordinate system of the ego-object, such as yaw). A 3D bowl parameter controller 1650 may use the distances and directions to adapt the shape of a 3D bowl (e.g., a mesh or other geometric model), for example, by (re)sizing the ground plane of the 3D bowl to fit within the distance to the closest detected object, or modifying the shape, size (e.g., along one or more dimensions or axes), or orientation (e.g., rotation relative to an ego-vehicle) of the 3D bowl to place the closest detected object(s) between the ground plane of the bowl and the outer edge or rim of the bowl. As such, the adaptive 3D bowl generator 1600 may generate a 3D bowl by identifying representative parameters for the 3D bowl that adapt based on distance and/or direction to detected objects.

As such, the adapted 3D bowl may be used to render a surround view visualization of the input images 1610. In some embodiments, the input images 1610 are aligned, stitched, and orthographically projected (or aligned, orthographically projected, and stitched) using corresponding depth values from the adapted 3D bowl to generate a projection image (e.g., corresponding to output image 1670). In some embodiments, the projection image is mapped onto the adapted 3D bowl, or the input images 1610 are otherwise aligned, stitched, and projected onto the adapted 3D bowl (or aligned, projected, and stitched), to create a textured 3D bowl surface. In some embodiments, a view of the textured 3D bowl surface is rendered, and the rendered view may be presented on a monitor or other display device visible to an occupant or operator (e.g., driver) of the ego-object.

Generally, distances and directions to surrounding objects may be obtained or determined in various ways. In the example illustrated in FIG. 16, the 3D object detector 1620 performs any known technique to identify 3D points that belong to surrounding objects, and the radial distance mapper 1630 calculates distances and directions to the 3D points. The 3D object detector 1620 may include or trigger one or more machine learning models (e.g., neural networks) to predict 3D cuboids from the input images 1610, corresponding LiDAR or RADAR detections, and/or other sensor data, and distances and directions between the ego-object (e.g., vehicle center) to detected objects (e.g., closest point, 3D cuboids corner(s), center) may be computed from the predicted 3D cuboids. In some embodiments, the 3D object detector 1620 uses one or more machine learning models (e.g., neural networks) to predict (e.g., top down) 2D bounding boxes, for example, from an orthographic projection of image data (e.g., fisheye images), LiDAR or RADAR detections, and/or other sensor data, and distances and directions between the ego-object and detected objects (e.g., closest point, bounding box corner(s), center) may be computed from the predicted 2D bounding boxes. FIG. 16 illustrates example detected objects 1625 surrounding an ego-object 1627, where the detected objects 1625 may correspond to predicted 2D top-down bounding boxes, and/or top-down projections of predicted 3D bounding boxes or cuboids.

In another example technique for determining distances to surrounding objects, sensor data such as a LiDAR or RADAR point cloud representing detected objects may be projected into a 2D top-down occupancy grid, and distances to the closest LiDAR or RADAR point in the 2D top-down occupancy grid may be computed (e.g., by the depth estimator 155 of FIG. 1). FIG. 17A shows an example 2D top-down occupancy grid 1710 where the ego-object is represented in the middle of the 2D top-down occupancy grid 1710, occupied cells in the grid are illustrated as white, and the distances and directions to surrounding objects are represented with grey lines extending radially outward from the ego-object. In some embodiments, some other ranging technique may be additionally or alternatively applied, for example, using depth or stereo camera arrays, sensor data, and/or a machine learning model (e.g., a neural network) to generate or predict depth values, a depth map, range ranges, or a range image (e.g., a LiDAR range image); and distances to surrounding objects may be determined from corresponding depth or range values.

Regardless of how the surrounding detected objects are represented (e.g., detected 3D objects, occupied cells in a 2D occupancy grid), in some embodiments, detected objects beyond some threshold distance to the ego-object (e.g., 3 m, 7 m, 15 m, etc.) may be filtered out or ignored to free up computational resources and/or reduce distortion resulting from a wider range of detected objects. In some embodiments, the range threshold used during range filtering may be variable, for example, based on the distance to the closest detected objects. An example implementation might start with an initial range threshold (e.g., 5 m), and expand to a farther range threshold (e.g., 7 m) based on no detected objects being within the initial range threshold, or reduce to a closer range threshold (e.g., 3 m) based on detected objects being within the initial range. As such, some embodiments may serve to identify one or more closest detected objects within a variable range threshold. In some cases, detected objects outside the applicable range threshold may be filtered out or otherwise ignored from consideration.

As such, the radial distance mapper 1630 may compute distances and directions to the (remaining) object detections 1625 using any of the techniques described herein, and a representation of the distances and directions may be generated. In some embodiments, the distances and directions (illustrated by visualization 1635) are represented in a radial distance map, list of entries, or some other structure that represents distance to the closest detected object and direction (e.g., distance a function of an angle, such as yaw). For example, the representation of the distances and directions may take the form of a 2D array with a radial component (e.g., identifying an angular increment, such as 1 degree) and one or more distance components (representing the distance to the closest detected object in the direction represented by a corresponding angular increment, representing the distance to a particular corner or center of the closest detected object in that direction). In FIG. 16, the visualization 1635 illustrates one or more values that may be stored in an example radial distance map. The visualization 1635 depicts an ego-object 1640 (corresponding to the ego-object 1627), bounding boxes of detected objects 1645 (corresponding to a set of the detected objects 1625 within a threshold range of the ego-object 1627), and distances between the ego-object 1640 and the corners of the bounding boxes of the detected objects 1645.

Based on the distances and directions between the ego-object 1640 and the detected objects 1645, the 3D bowl parameter controller 1650 may adapt the shape of a 3D bowl modeling the surrounding environment based on the distances and directions to the detected objects 1645. In terms of bowl shape, the 3D bowl (e.g., a mesh) when viewed from top-down may be circular, elliptical, or some other shape (whether regular or irregular), and the shape may be symmetrical or asymmetrical. Depending on the embodiment, the distances and directions to the detected objects 1645 may be used to fit a (e.g., symmetrical) bowl shape, synthesize a shape using local deformations to accommodate different distances to different objects, or otherwise. For example, the 3D bowl parameter controller 1650 may use the distances and directions to adapt the shape of a 3D bowl, for example, by (re)sizing the ground plane of the 3D bowl to fit within the distance to the closest detected object, or modifying the shape, size (e.g., along one or more dimensions or axes), and/or orientation (e.g., rotation relative to an ego-vehicle) of the 3D bowl to place (one more points that belong to) the closest detected object(s) between the ground plane of the bowl and the outer edge or rim of the bowl.

The implementation illustrated in FIG. 16 involves an elliptical 3D bowl with an inner bowl 1655 and an outer bowl 1660 separated by some distance, whether constant (e.g., 3 m) or variable, and an axis of the ellipse (e.g., the short or long axis) may be aligned with an axis of the vehicle coordinate system (e.g., pointing to the front of the vehicle). In some embodiments, the 3D bowl parameter controller 1650 may size the inner bowl 1655 to fit within the distance to the closest detected object of the detected objects 1645. For example, the closest point to a detected object may be assumed to be at some point along the circumference of an ellipse that is aligned with and centered on the ego-object 1652 (e.g., which corresponds to the ego-object 1640 and the ego-object 1627), and the ellipse may be parameterized using the standard equation for an ellipse to calculate representative parameters for the inner bowl (e.g., values of the short and long axes, foci, eccentricity, circumference, etc.). In some embodiments, the 3D bowl parameter controller 1650 may filter and/or cluster points that belong to multiple detected objects (e.g., the closest point for each detected object, a center point for each detected object), and use the filtered and/or clustered points to fit an ellipse (or multiple ellipses), or some other shape, optionally rotated (e.g., to align a long or short axis with a particular detected object). For example, the 3D bowl parameter controller 1650 may identify a number of detected objects (e.g., with center points that fall) within a particular range (e.g., corresponding to a desired separation between the inner bowl 1655 and the outer bowl 1660, or a subset thereof), and may fit shapes for the inner bowl 1655 and the outer bowl so the identified detected objects (or identified points of the detected objects) fit within the inner bowl 1655 and the outer bowl 1660. The 3D bowl may be parameterized by parameters of the inner bowl 1655 and/or the outer bowl 1660 (e.g., short and long axes of the inner and outer bowls), so 3D bowl parameter controller 1650 may effectively adapt the 3D bowl based on distance and direction to detected object(s) by determining a set of 3D bowl parameters for each time slice. These are just a few examples, and other ways of adapting the inner bowl 1655 and/or the outer bowl 1660 based on distance and direction to a detected object may be implemented (e.g., an example of which is discussed in greater detail with respect to FIG. 17B).

As such, the adapted 3D bowl may be used to render a surround view visualization (e.g., the output image 1670) of the input images 1610. By way of nonlimiting example, the input images 1610 are aligned, stitched, and orthographically projected (or aligned, orthographically projected, and stitched) using corresponding depth values from the adapted 3D bowl to generate a top-down projection image corresponding to output image 1670. In some embodiments, the projection image is mapped onto the adapted 3D bowl, or the input images 1610 are otherwise aligned, stitched, and projected onto the adapted 3D bowl (or aligned, projected, and stitched), to create a textured 3D bowl surface, a view of the textured 3D bowl surface is rendered, and/or the rendered view is presented on a monitor or other display device visible to an occupant or operator (e.g., driver) of the ego-object (e.g., corresponding to the ego-object 1627, 1640, and 1652).

Another example technique for using distance and direction to a detected object to adapt a 3D bowl uses the distance and direction to the closest detected object in each radial direction (e.g., stored in, represented by, or identified using a 2D top-down occupancy grid) as a corresponding dimension of the 3D bowl (e.g., the radius of the inner bowl or the outer bowl in a corresponding direction). For example, the distance to the closest detected object in each radial direction may be used as the radius (or may be used to fit a shape) for the inner bowl, and the outer bowl may be set to some fixed or dynamic separation from the inner bowl (e.g., 3 m) (or distances to the closest detected object may be used to determine a shape for the outer bowl, and the inner bowl may be separated from the outer bowl by some fixed or dynamic distance). To smooth out the bowl shape, a spatial filter may be applied over some angular range (e.g., 20-60°).

FIG. 17A is an example 2D top-down occupancy grid 1710, and FIG. 17B illustrates an example adaptive 3D bowl generation technique 1700 that adapts a 3D bowl using the 2D top-down occupancy grid 1710, in accordance with some embodiments of the present disclosure. Generally, dense sensor data (e.g., a LiDAR point cloud) captured by one or more sensors of an ego-object may be projected to a top-down view, and a grid of cells (with a designated ground resolution) may be populated with an (e.g., binary) indication of whether or not a sensor detection (e.g., a LiDAR point) landed on the cell during the projection. FIG. 17A shows an example 2D top-down occupancy grid 1710 where the ego-object (e.g., a vehicle) is represented in the middle of the 2D top-down occupancy grid 1710, occupied cells in the grid (corresponding to detected objects) are illustrated as white, and the distances and directions to surrounding detected objects are represented with grey lines extending radially outward from the ego-object. FIG. 17B illustrates an example stitched image 1760 of the scene represented by the 2D top-down occupancy grid 1710, where the example stitched image 1760 uses a fixed 3D bowl (e.g., the initial 3D bowl 1720). The correspondence between three vehicles represented in the 2D top-down occupancy grid 1710 and the stitched image 1760 are illustrated with grey arrows. Note how the vehicle 1765 is distorted due to a scale magnification.

By contrast, in some embodiments, an initial 3D bowl 1720 (e.g., a circular 3D bowl) is deformed using the 2D top-down occupancy grid 1710 to generate a deformed 3D bowl 1730. More specifically, for each angular increment (e.g., 1°), the distance to the closest detected object in that direction is determined using the 2D top-down occupancy grid 1710 (e.g., by computing and retrieving a corresponding value from a radial distance map that stores distance as a function of angle), and a radius is set for the deformed 3D bowl 1730 in a corresponding direction to equal the distance to the closest detected object in that direction.

In some embodiments, a circle or ellipse is fitted to the radii of the deformed 3D bowl 1730 to generate a filtered 3D bowl 1740. Additionally or alternatively, the radii of the deformed 3D bowl 1730 (or a corresponding fitted shape) are filtered using one or more spatial and/or temporal filters to generate a filtered 3D bowl 1740 that has smoothed radial values that change gradually as a function of angle (e.g., forming an elliptical 3D bowl). Generally, any number of spatial and/or temporal filters may be applied to parameters (or a combination of parameters) representing the 3D bowl (e.g., radius). For example, a temporal filter may be applied over a temporal window (e.g., 30 frames of data buffered first-in-first-out) to a ratio of parameters (e.g., the ratio of the short to long axes of an elliptical 3D bowl) to stabilize the ratio, to individual parameters (e.g., short and long axes of an inner bowl), and/or otherwise. In some embodiments, temporal filtering is applied to a ratio before being applied to individual parameters in order to apply course filtering before finer smoothing. In some implementations, stochastic and/or Kalman filtering may be applied over a temporal window to smooth out transitions. These are just a few examples, and other filters may additionally or alternatively be applied.

FIG. 17B illustrates an example stitched image 1750 of the scene represented by the 2D top-down occupancy grid 1710, where the example stitched image 1750 uses the filtered 3D bowl 1740. Note how the vehicle 1755 is less distorted in the stitched image 1750, reducing the scale magnification present in the stitched image 1760.

In some embodiments, a stitched image or surround view visualization is generated from images captured during each time slice, and an adaptive 3D bowl is generated for each time slice. In some embodiments, a determination is made whether to use an adaptive 3D bowl during each time slice. For example, a state machine implementing a decision tree may be used to determine whether to use a fixed 3D bowl or an adaptive 3D bowl that adapts its shape based on distance to detected object(s). For example, an adaptive 3D bowl may be selectively enabled in scenarios less likely to involve passing objects, for example, based on speed of ego-motion. This may be thought of as applying a speed filter to enable or disable adaptive 3D bowl (e.g., choosing between the filtered 3D bowl 1740 and the initial 3D bowl 1720, or between the filtered 3D bowl 1740 and a 3D bowl from a preceding time slice) based on speed of the ego-object. In an example implementation, adaptive 3D bowl may be disabled at speeds at or above a designated threshold speed (e.g., 16 km/hr) and enabled at speeds below the designated threshold.

FIG. 18 is an example adaptive 3D bowl state machine 1800, in accordance with some embodiments of the present disclosure. In this example, at block 1810, ego-speed is determined (e.g., from a speed sensor). If ego-speed is above a speed threshold (e.g., less than 1 km/hr), at block 1820, the adaptive 3D bowl state machine 1800 determines whether the ego-object is starting a journey (e.g., based on ego-speed increasing from 0 km/hr and not exceeding the lower speed threshold). If ego-speed is below the lower speed threshold and the ego-vehicle is starting on a journey, at block 1830, the adaptive 3D bowl state machine 1800 enables adaptive 3D bowl. If ego-speed is below the lower speed threshold and the ego-vehicle is not starting on a journey (e.g., ego-speed decreased from above the lower speed threshold), at block 1840, the adaptive 3D bowl state machine 1800 disables adaptive 3D bowl. Example use cases for this scenario include the ego-object slowing down and stopping at a road intersection, stop sign, or traffic light; cross-traffic scenarios (e.g., another ego-object is approaching from the left or right and crossing the ego-object's path, such as when the ego-object is backing out of a parking space); maneuvers at low speed; and/or others. If ego-speed is above the lower speed threshold and below a higher speed threshold (e.g., 16 km/hr), at block 1850, the adaptive 3D bowl state machine 1800 enables adaptive 3D bowl. Example use cases for this scenario include parking search and other driving maneuvers.

FIG. 19 is a diagram illustrating an example data flow 1900 through a Surround View System that includes adaptive 3D bowl and dynamic seam placement state machines, in accordance with some embodiments of the present disclosure. At a high level, one or more sensors (e.g., cameras) of an ego-object (e.g., a vehicle) may be used to capture input images 1610 and/or other sensor data during each time slice. For each time slice, an adaptive 3D bowl state machine 1920 (e.g., which may correspond to the adaptive 3D bowl state machine 1800 of FIG. 18) may determine whether to enable or disable adaptive 3D bowl (e.g., based on ego-speed 1933). When disabled, the adaptive 3D bowl state machine 1920 may lock an applicable 3D bowl to a fixed bowl or the previous bowl shape from the preceding time slice. When enabled, the adaptive 3D bowl state machine 1920 may trigger generation (e.g., by the adaptive 3D bowl generator 1600 of FIG. 16, using the adaptive 3D bowl generation technique 1700 of FIG. 17B) of an adaptive 3D bowl 1930 (e.g., based on distance(s) to detected object(s) 1934).

In some embodiments, the input images 1910 may be aligned (e.g., by the alignment component 510 of FIG. 5), creating one or more overlapping regions. A dynamic seam placement state machine 1940 (e.g., which may correspond to the dynamic seam placement state machine 600 of FIG. 6, the dynamic seam placement technique 700 of FIG. 7, and/or some portion thereof) may determine, for each time slice, whether to use a default seam placement or dynamic seam placement (e.g., based on ego-speed 1933, distance(s) to detected object(s) 1934, direction of ego-motion, corresponding active viewport direction 1935), and a corresponding seam placement may be determined for each overlapping region (e.g., by the seam placement component 520 of FIG. 5) in each overlapping region of the input images 1910. As such, the image images 1910 may be stitched using the determined seam placements for each overlapping region (e.g., by the blending component 590 of FIG. 5).

In some embodiments, the stitched image may be orthographically projected (e.g., to a top-down view) to generate a stitched projection image 1950, backprojecting each pixel of the stitched image into a 3D scene representing the surrounding environment using corresponding distances sampled from the adaptive 3D bowl 1930. As such, the stitched projection image 1950 may be mapped onto the adaptive 3D bowl 1930 (e.g. using UV mapping) to generate a textured 3D bowl 1960, and a view of the textured 3D bowl 1960 (e.g., the viewport rendering 1970) through an applicable, active, and/or designated viewport (e.g., corresponding to the viewport direction 1935) may be rendered. In some embodiments, the viewport rendering 1970 is presented on a monitor or other display device visible to occupants (e.g., driver) of the ego-object.

FIG. 20 shows example surround view visualizations 2010 and 2020 with and without an adaptive 3D bowl, in accordance with some embodiments of the present disclosure. The surround view visualization 2010 represents a rendering that uses a fixed 3D bowl, while the surround view visualization 2020 represents a rendering that relies on an adaptive 3D bowl. Both surround view visualizations 2010 and 2020 represent the same 3D scene (also represented by 2D top-down occupancy grid 2030) in which a vehicle 2040 is parked between two adjacent vehicles 2050 and 2060. Note that the adjacent vehicles 2050 and 2060 are both distorted in the surround view visualization 2010 that used a fixed 3D bowl, and that the distortion of the adjacent vehicles 2050 and 2060 is reduced in the surround view visualization 2020 that used an adaptive 3D bowl.

Now referring to FIGS. 21 and 22, each block of methods 2100 and 2200, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 2100 and 2200 may be understood, by way of example, with respect to the adaptive 3D bowl generator 150 of FIG. 1, the surround view visualization system 1300 of FIG. 13, or the adaptive 3D bowl generator 1600 of FIG. 16. However, these methods may additionally or alternatively be executed by any one system, or any combination of systems, including, but not limited to, those described herein.

FIG. 21 is a flow diagram showing a method 2100 for generating a surround view visualization based at least on an adaptive 3D bowl, in accordance with some embodiments of the present disclosure. The method 2100, at block B2102, includes determining a distance from an ego-object to a detected object in an environment. For example, with respect to FIG. 16, the 3D object detector 1620 may perform 3D object detection on sensor data captured by the ego-object (e.g., the input images 1610, corresponding RADAR or LiDAR data), and the radial distance mapper 1630 may compute distance(s) to the detected objects (e.g., the closest detected object in a direction corresponding to each angular increment). In another example, the adaptive 3D bowl generator 150 of FIG. 1 (e.g., the depth estimator 155 of the adaptive 3D bowl generator 150) may project sensor data captured by the ego-object such as a LiDAR point onto a top-down 2D occupancy grid that represents locations of detected objects, and the radial distance mapper 1630 may compute distance(s) to the detected objects using the top-down 2D occupancy grid.

The method 2100, at block B2120, includes generating an adaptive three-dimensional (3D) bowl that models the environment with a shape based at least on the distance to the detected object. For example, with respect to FIG. 16, the 3D bowl parameter controller 1650 may use the distance to the detected object to size the ground plane (e.g., the inner bowl) of the adaptive 3D bowl to fit within the distance to the closest detected object. In some embodiments, the 3D bowl parameter controller 1650 may modify the shape, size (e.g., along one or more dimensions or axes), and/or orientation (e.g., rotation relative to an ego-vehicle) of the 3D bowl to place (e.g., one or more points that belong to) the closest detected object(s) between the ground plane of the bowl and the outer edge or rim of the bowl. Depending on the embodiment, the 3D bowl parameter controller 1650 may use distance to one or more detected objects to fit a (e.g., symmetrical) bowl shape, synthesize a shape using local deformations to accommodate different distances to different detected objects, apply one or more temporal filters, apply one or more spatial filters, and/or otherwise.

The method 2100, at block B2130, includes generating a surround view visualization of the environment based at least on the adaptive 3D bowl. For example, with respect to FIG. 13, the projection module 1335 may generate an orthographic projection of image data captured by the ego-object (e.g., aligned image data, stitched image data) using corresponding depth values from the adaptive 3D bowl to generate a (e.g., stitched) top-down projection image. In some embodiments, the UV mapping module 1345 may map image data captured by the ego-object (e.g., a top-down projection image) onto the adaptive 3D bowl to generate a textured 3D bowl (e.g., the textured 3D bowl 1340), and the viewport renderer 1355 may position and orient a virtual camera in a 3D scene with the textured 3D bowl 1340 and use the virtual camera to render a view (e.g., image 1350) of the textured 3D bowl 1340 for a corresponding viewport FIG. 22 is a flow diagram showing a method 2200 for generating a surround view visualization based at least on an adaptive 3D bowl with a shape that depends on distance to the closest detected object, in accordance with some embodiments of the present disclosure. The method 2200, at block B2202, includes generating a top-down two-dimensional (2D) occupancy grid based at least on projecting LiDAR data into a top-down view of an environment. For example, with respect to FIG. 1, the adaptive 3D bowl generator 150 (e.g., the depth estimator 155 of the adaptive 3D bowl generator 150) may project sensor data captured by an ego-object such as a LiDAR point onto a top-down 2D occupancy grid that represents locations of detected objects.

The method 2200, at block B2220, includes determining distance to a closest detected object as a function of angle using the top-down 2D occupancy grid. For example, the adaptive 3D bowl generator 150 of FIG. 1 (e.g., the depth estimator 155 of the adaptive 3D bowl generator 150) or the radial distance mapper 1630 of FIG. 16 may compute distance(s) to the closest detected object as a function of angle (e.g., representing a rotation around an axis of the coordinate system of the ego-object, such as yaw) by computing the number of cells and/or the corresponding distance between the position of the ego-object and the closest occupied cell in a corresponding direction in the top-down 2D occupancy grid.

The method 2200, at block B2230, includes generating an adaptive three-dimensional (3D) bowl that models the environment with a shape that depends on the distance to the closest detected object and the angle. For example, with respect to FIG. 16, the 3D bowl parameter controller 1650 may use the distance to the detected object and the corresponding angle to size the ground plane (e.g., the inner bowl) of the adaptive 3D bowl to fit within the distance to the closest detected object in that direction. In some embodiments, the 3D bowl parameter controller 1650 may modify the shape, size (e.g., along one or more dimensions or axes), and/or orientation (e.g., rotation relative to an ego-vehicle) of the 3D bowl to place (e.g., one or more points that belong to) the closest detected object(s) between the ground plane of the bowl and the outer edge or rim of the bowl. Depending on the embodiment, the 3D bowl parameter controller 1650 may use distance to one or more detected objects to fit a (e.g., symmetrical) bowl shape, synthesize a shape using local deformations to accommodate different distances to different detected objects, apply one or more temporal filters, apply one or more spatial filters, and/or otherwise.

Under Vehicle Reconstruction

FIG. 23 is a diagram illustrating an example data flow through an under vehicle reconstruction system 2300, in accordance with some embodiments of the present disclosure. At a high level, the under vehicle reconstruction system 2300 uses cached sensor data from sensor(s) 2301 (e.g., image data from one or more cameras) of an ego-object (e.g., a vehicle) and ego-motion data 2340 of the ego-object to reconstruct the area under the ego-object (e.g., the example autonomous vehicle 3500 of FIGS. 35A-35D).

In the example illustrated in FIG. 12, an ego-object may be equipped with any number of sensor(s) 2301 (e.g., one or more cameras, such as fisheye cameras, which may correspond to the sensor(s) 101 of FIG. 1). For each set of frames of sensor data from the sensor(s) 2301 (e.g., each set of images) representing a particular time slice, an under vehicle reconstructor 2315 (e.g., which may correspond to the under vehicle reconstructor 130 of FIG. 1) may update a representation of the ground plane (e.g., composite map 2335) that caches one or more visualizations (e.g., a plurality of local maps, a composite map that merges a plurality of local maps) of a navigable area using the sensor data from the sensor(s) 2301, and may use ego-motion data 2340 of the ego-object to retrieve a portion of the representation of the ground plane (e.g., corresponding pixels of composite map 2335, corresponding pixels from a plurality of local maps) corresponding to the ego-object's current position to virtually reconstruct the area under the ego-object. In some embodiments, the under vehicle reconstructor 2315 selects and caches image data (e.g., the image data 105 of FIG. 1) from one of the sensor(s) 2301 corresponding to the direction of ego-motion of the ego-object. For example, if a vehicle is moving forward, image data from a front-facing (e.g., fisheye) camera may be used, and/or if a vehicle is moving backward, image data from a rear-facing (e.g., fisheye) camera may be used. In some embodiments, the stitching module 2305 (e.g., which may correspond to the stitching module 120 of FIG. 1) may stitch image data from multiple sensor(s) 2301 (e.g., multiple fisheye images) into a composite or stitched image, and the under vehicle reconstructor 2315 selects and caches a portion of the composite or stitched image corresponding to the direction of ego-motion. As such, the under vehicle reconstructor 2315 may use the ego-object's ego-motion data 2340 to retrieve a corresponding portion(s) of the cached local maps and/or the composite map 2335 (the under vehicle reconstruction or UVR).

In some embodiments, the stitching module 2305 may stitch the UVR with image data from the sensor(s) 2301 to generate a composite stitched image, and the projection module 2350 (e.g., which may correspond with the projection module 175 of FIG. 1) may project the composite stitched image onto a 2D or 3D representation of the environment surrounding the ego-object (e.g., a top-down or ground 2D projection, a textured 3D surface such as a 3D bowl). In other embodiments, the projection module 2350 may project image data from the sensor(s) 2301 and the UVR onto the 2D or 3D representation of the environment, and the projected image data may be stitched. As such, the view generator 2355 (e.g., which may correspond with the view generator 180 of FIG. 1) may generate a rendered view 2360 of the projected image data from the perspective of a virtual camera (e.g., based on a pre-configured virtual camera position and orientation, based on the state of the ego-object), and the rendered view 2360 (e.g., a 2D image) may be presented on a monitor visible to an operator or occupant of the ego-object.

In FIG. 23, the under vehicle reconstructor 2315 includes a map generator 2320 (comprising a local map generator 2325 and a composite map updater 2330) and a local map retriever 2345. In some embodiments, the local map generator 2325 uses the ego-motion data 2340 to identify a direction of ego-motion and construct a local map of the environment, the ground, and/or the navigable space (e.g., the road), where the local map faces in the direction of ego-motion and may include a length that depends on the speed of ego-motion. The cells in the grid may have known 3D coordinates in world space based on a specified length, width, and grid spacing. The local map generator 2325 may texturize the local map with image data (e.g., from the sensor(s) 2301 and/or the stitching module 2305) by assigning a color value to each cell in the grid from a corresponding pixel of the image data, as explained in more detail below.

In some embodiments, one or more deep neural networks (DNNs) (not depicted in FIG. 23) are used to segment the image data from the sensor(s) 2301 or the stitched image data from the stitching module 2305 to generate navigable space segmentation data 2310 distinguishing a navigable (e.g., drivable) space from moving (or moveable) objects, such as pedestrians, bicycles, and vehicles, represented in the image data. As such, the local map generator 2320 may omit color values for pixels that are part of moving (moveable) objects from the local map and/or may only include color values for pixels that are part of the navigable space so the local map represents the navigable space (e.g., the road) without the moving (moveable) objects.

As such, the composite map updater 2330 may cache the local map generated for any particular time slice by merging the local map into a composite map 2335 that stores a composite representation of local maps generated for previous time slices. Any known merging, fusing, blending, stitching, or combining technique may be applied to combine data from overlapping regions. In some embodiments, the composite map updater 2330 may apply one or more image filters to fuse sensor data from different sources of same modality, and/or from different modalities, where the fusing may be weighted based on a detected measure of image quality. In some embodiments, to save memory, the composite map updater 2330 may limit the size of the composite map 2335 (e.g., limited to representing local maps generated for a designated number of time slices or frames of image data, with a length that is limited based on speed of ego-motion). Although the embodiment illustrated in FIG. 23 contemplates merging the local map into the composite map 2335, some embodiments additionally or alternatively cache each local map in association with a representation of the ground plane, such that the representation of the ground plane (e.g., the composite map 2335) stores multiple unmerged color values for certain pixels in regions where overlapping local maps were cached. For example, each pixel of the composite map 2335 may store one or more color values (e.g., merged color value, one or more unmerged color values) in different dimensions or layers, or may otherwise reference the one or more color values).

As such, the local map retriever 2345 may (e.g., use the ego-motion data 2340 to) determine the position of the ego-object in world coordinates, and construct a local map representing the region underneath the ego-object textured with image data retrieved from the composite map 2335 (the UVR). For example, a grid may be defined under the ego-object with a specified length, width, and grid spacing, so the cells in the grid have known 3D coordinates in the world space. As such, the local map retriever 2345 may texturize the UVR with image data from the composite map 2335 by assigning a color value to each cell in the grid from a corresponding pixel of the image data (e.g., a merged pixel cached in the composite map 2335, a composite value such as an average value generated from multiple unmerged color values cached from different local maps in a particular pixel in the composite map 2335), as explained in more detail below.

The resulting UVR may be visualized in various ways. In the embodiment illustrated in FIG. 23, the stitching module 2305 stitches the UVR with a composite image representing a composite view of the surrounding environment to generate a stitched image, and the projection module 2350 projects the stitched image onto a representation of the environment, such as a 3D surface (e.g., a 3D bowl) to generate a textured 3D surface. In some embodiments, a 3D model of the ego-vehicle may be rendered over the textured 3D surface (e.g., as a transparent vehicle, with a transparent hood, with a transparent trailer). FIG. 24 is an example surround view visualization 2400 with a transparent vehicle 2410 rendered over an under vehicle reconstruction 2420 on a textured 3D surface 2430 (e.g., a 3D bowl), in accordance with some embodiments of the present disclosure.

In order to facilitate under vehicle (or under object) reconstruction, the environment surrounding the vehicle may be modeled as a geometric model in world space, and the geometric model may be used to align image data from the sensor(s) 2301, the ego-motion data 2340, and/or a 3D model of the vehicle. Typically, different sensors have their own 3D coordinate systems. As such, some embodiments align coordinate systems for the sensor(s) 2301 and the vehicle (e.g., a vehicle rig) with respect to the world space. FIG. 25 shows example vehicle rig and camera coordinate systems, in accordance with some embodiments of the present disclosure. In this example, a vehicle rig coordinate system 2510 is defined with an origin $O_{RIG}$ located at the ground projection of the center of the rear vehicle axis 2520. The vehicle rig coordinate system 2510 includes an $X_{RIG}$ axis that points to front of the vehicle, a $Y_{RIG}$ axis that points to the left, and a $Z_{RIG}$ axis that points upward. Vehicle ego-motion may be defined as the pose of the vehicle rig coordinate system 2510 with respect to a world space. Camera extrinsic parameters (e.g., location and orientation) may be calibrated relative to the vehicle rig coordinate system 2510 to align each camera's coordinate system (e.g., front camera coordinate system 2530) in the world space.

In some embodiments, the vehicle's surrounding environment is modeled using a 3D surface, such as a 3D bowl. FIG. 26 illustrates a cross-section view of an example 3D bowl, in accordance with some embodiments of the present disclosure. The 3D bowl includes an inner bowl 2610 which may be a circle or ellipse positioned on the ground plane in world space, and an outer bowl 2620 that rises up from the ground plane. In an example embodiment, the inner bowl 2610 is a circle with a radius $R_{INNER}$ and a height value in world space (e.g., $Z_{RIG}$ value in the vehicle rig coordinate system) of zero. The outer bowl 2620 may be a monotonic increasing curve defined by a function g(r) where r is the distance to the bowl center. In an example embodiment, the height value of a point $P(x_p, y_p)$ on the outer bowl 2620 in the vehicle rig coordinate system is given by:

$$g(r) = c_1 * r^{c_2} \qquad \text{(Eq. 1)}$$

where $r = \sqrt{(x_p - x_o)^2 + (y_p - y_o)^2}$, $(x_o, y_o)$ are the coordinates of the center of the 3D bowl in the vehicle rig coordinate system, $c_1$ is a constant that controls the scale of the 3D bowl's height, and $c_2$ is a parameter that controls the shape of the curve (e.g., $c_2=2$ for a quadratic curve).

FIG. 26 also includes a virtual camera coordinate system 2650 that represents a position and orientation of a virtual camera in world space, such that a 2D view (e.g., an image) of the 3D bowl may be rendered from the perspective of the virtual camera. In some embodiments, an image generated using a front camera (with a position and orientation in world space corresponding to a camera coordinate system 2660) may be projected and/or mapped onto the 3D bowl, effectively texturing the 3D bowl with image data, such that an arbitrary point $P_4$ on the 3D bowl may be assigned a pixel value determined by the front camera using physical world point $P_2$'s information. As a result, rendering a view of the textured 3D bowl effectively images much more of the surrounding environment within the field of view of the virtual camera than without using a 3D bowl model.

FIG. 26 also illustrates an under vehicle area 2630 which is outside of the field of view of the front camera. To facilitate reconstructing the under vehicle area 2630, in some situations (e.g., when the vehicle is traveling forward), a local map 2640 extending in front of the vehicle may be generated (e.g., by the local map generator 2325 of FIG. 23). In some embodiments, the local map 2640 is a textured 2D planar surface, and may be representing using a grid. The grid may have a specified length, width, and grid spacing that define the resolution of the local map 2640. By way of non-limiting example, each cell of the grid may be a square with some fixed or variable length (e.g., 1 cm×1 cm). Although some embodiments involve a rectangular local map 2640, other shapes are possible.

For any time slice, the cells in the grid may be assigned color values from an image captured in that time slice by a camera pointing in the direction of ego-motion. For example, if the vehicle is moving forward, an image captured using a front camera on the vehicle may be used to populate color values in the local map 2640. In some cases, the grid spacing of the local map 2640 represents a distance, while the unit of the image may be a pixel. Since each pixel in the image defines a ray, the ray may be back projected onto the ground plane onto a corresponding cell of the local map 2640. As such, a color value for a particular cell in the grid of the local map 2640 may be identified by retrieving the color value of the corresponding pixel of the image. In some embodiments, the process is repeated to populate each cell in the grid with a corresponding pixel value. In other embodiments, color values for pixels that do not belong to a navigable space (e.g., a road) (e.g., as denoted by navigable space segmentation data 2310) are omitted from the local map 2640. Taking a rectangular local map 2640 in front of the vehicle as an example, the distance between the furthermost map edge (the front edge) to the front of the vehicle may be denoted as $d_{map}$ (as illustrated in FIG. 26), and the width of the map may be denoted as $w_{map}$. In this example, the process of creating the local map 2640 may retrieve a value (or determine not to) for each cell within this $d_{map} \times w_{map}$ map area.

In some embodiments that involve fisheye cameras, the distortion introduced by the camera's fisheye lens may be represented using the F-theta model, and the lens's distortion coefficients may be given by $k_0, k_1, \ldots, k_N$ (e.g., N=4). For any cell in the grid of the local map 2640, the cell may be represented by a point $P_i(r_x, r_y, r_z)$, where $r_x$, $r_y$, and $r_z$ are the point's coordinates in the vehicle rig coordinate system. Taking the front camera centered at the origin $O_{CAM\_f}$ of the front camera coordinate system 2660 and having an optical axis $Z_{CAM\_f}$ pointing forward and parallel to the ground plane, the angle $\theta$ between (i) a ray vector $P_iO_{CAM\_f}$ pointing from the camera center to the point $P_i$ (e.g., ray 2670 for point $P_2$) and (ii) the front camera optical axis $Z_{CAM\_f}$ may be given by:

$$\theta = \cos^{-1}(r_z/\sqrt{r_x^2 + r_y^2 + r_z^2}) \qquad \text{(Eq. 2)}$$

Within a fisheye image generated by the front camera, the distance $f(\theta)$ between an imaged point $p_i$ (in the fisheye image) that images point $P_i$ and the fisheye principal point $(u_0, v_0)$ (given as part of the intrinsic parameters) may be given by:

$$f(\theta) = k_0 + k_1\theta + k_2\theta^2 + \ldots + k_N\theta^N \qquad \text{(Eq. 3)}$$

As such, in this example, the color value for a particular cell in the grid of the local map 2640 may be retrieved from the pixel in the fisheye image whose coordinates are given by:

$$\begin{cases} x = u_0 + f(\theta)r_x/\sqrt{r_x^2 + r_y^2} \\ y = v_0 + f(\theta)r_y/\sqrt{r_x^2 + r_y^2} \end{cases} \qquad \text{(Eqs. 4 and 5)}$$

In some embodiments, the grid of the local map 2640 may be populated using a forward approach (e.g., for each 3D point in the 2D grid, identify its corresponding imaged 2D point) or a backward approach (e.g., for each pixel/imaged 2D point in an image, identify its corresponding 3D point in the 2D grid). Some embodiments may favor the forward approach since it may identify a corresponding pixel for every cell in the grid without missing any cells.

Continuing with the example using an image generated with the front camera, since the field of view of the front camera typically does not include the under vehicle area 2630, the local map 2640 generated for a particular time slice will not typically represent the under vehicle area 2630 at that time slice. As such, the local map 2640 generated for a particular time slice may be cached by merging it into a composite map (e.g., by the composite map updater 2330 of FIG. 23) for future use. In order to reconstruct the under vehicle area 2630 for the current time slice, a previously constructed corresponding portion of the composite map may be retrieved (e.g., by the local map retriever 2345 of FIG. 23). As such, once multiple local maps have been generated and merged together into the composite map, and the vehicle travels over a region of the composite map that is populated with a local map from a previous time slice, the under vehicle area may be retrieved.

More specifically, the local map constructed for each time slice $t_i$, i=0, 1, . . . , T may be denoted as $M_{t_i}$, and the updated composite map that merges (e.g., all, n) previous local maps may be denoted as $$M'_{t_i}.$$

At time $t_{i+1}$, a map updating process (e.g., executed by the composite map updater 2330 of FIG. 23)) may create $$M'_{t_{i+1}}$$

by combining the new local map $M_{t_{i+1}}$ with $$M'_{t_i},$$

for example, as:

$$M'_{t_{i+1}} = M'_{t_i} \cup M_{t_{i+1}} \qquad \text{(Eq. 6)}$$

where $\cup$ is a map union operator that merges two aligned maps together (e.g. using blending).

FIG. 27 illustrates an example technique for updating a composite map that visualizes a drivable area, in accordance with some embodiments of the present disclosure. Assume a vehicle 2710 is moving along a path 2720, and both vehicle position and orientation change as the vehicle 2710 moves along the path 2720. $O_{t_i}$ represents the origin of the vehicle rig coordinate system of the vehicle 2710 at the time $t_i$. Local map $M_{t_i}$ is the rectangular area in front of the vehicle 2710 at time $t_i$ (e.g., local map 2730 is $M_{t_i}$ at time $t_1$). As the vehicle 2710 moves forward, each newly perceived local map $M_{t_i}$ may be continuously digested into a composite map formed by the union of the previously created local maps. When the vehicle 2710 moves on top of a populated area of the composite map, the area under the vehicle 2710 may be available for retrieving.

Vehicle ego-motion (e.g., the vehicle ego-motion data 2340 of FIG. 23) may provide the relative pose relationship between vehicle rig origin $O_{t_i}$ and $O_{t_{i+1}}$ at times $t_i$ and $t_{i+1}$, respectively, and the relative pose relationship may be used to geometrically align a new local map $M_{t_{i+1}}$ and the previously created composite map $$M'_{t_i}.$$

More specifically, the translation vectors of the vehicle rig coordinate system at times $t_i$ and $t_{i+1}$ may be denoted as $T_{t_i}$ and $T_{t_{i+1}}$, and the respective rotation matrices may be denoted as $R_{t_i}$ and $R_{t_{i+1}}$. For each point in the world coordinate system $P_w$, its corresponding points $P_{t_i}$ and $P_{t_{i+1}}$ in the vehicle rig coordinate system at times $t_i$ and $t_{i+1}$ may be represented as:

$$\begin{cases} P_w = R_{t_i} P_{t_i} + T_{t_i} \\ P_w = R_{t_{i+1}} P_{t_{i+1}} + T_{t_{i+1}} \end{cases} \quad \text{(Eqs. 7 and 8)}$$

By equating equations 7 and 8 and solving for $P_{t_{i+1}}$, the value of $P_{t_{i+1}}$ at time $t_{i+1}$ may be retrieved as:

$$P_{t_{i+1}} = R_{t_{i+1}}^{-1}\left(R_{t_i} P_{t_i} + T_{t_i} - T_{t_{i+1}}\right) \quad \text{(Eq. 9)}$$

where $T_{t_i}$, $T_{t_{i+1}}$, $R_{t_i}$, and $R_{t_{i+1}}$ may be included in, or determined based on, vehicle ego-motion.

Equation 9 establishes a geometric transformation relationship between a new local map $M_{t_{i+1}}$ and a previously constructed composite map $$M'_{t_i},$$

which provides a correspondence between any point in $M_{t_{i+1}}$ and its corresponding point in $$M'_{t_i},$$

and vice versa. As such, once enough of the composite map has been constructed, at any time the location of the vehicle 2710 in world space may be determined (e.g., using vehicle ego-motion), a desired area under the vehicle divided into a grid of cells may be identified, and the coordinates of each cell in the world space may be identified (e.g., based on the relationship between the vehicle rig coordinate system, the size of the vehicle, and/or the ground). Each cell in the under vehicle area may be represented as a point in world space that moves from $P_{t_i}$ to $P_{t_{i+1}}$ from time $t_i$ to $t_{i+1}$. As such, a pixel value for a point $P_{t_{i+1}}$ in the under vehicle area at time $t_{i+1}$ may be retrieved from a corresponding pixel in the composite map identified using the geometric transformation defined by equation 9. As such, color values for the cells in the grid in the under vehicle area may be retrieved from the composite map to reconstruct the under vehicle area.

In some embodiments, this UVR may be used to fill a missing under vehicle area in a textured 3D surface (e.g., a textured 3D bowl) using the updated composite map. In some cases, a UVR may be stitched into a composite image (e.g., a panorama, 360° image, composite ground projection), and the composite image with the UVR may be projected onto the 3D surface (e.g., the 3D bowl). As such, a 3D bowl may be fully textured, and a view of the textured 3D bowl may be rendered with a specified viewport.

In some embodiments, at the very beginning of a trip, there may not be anything cached in a composite map until the vehicle starts to move and the vehicle moves over an area that was previously perceived (e.g., by camera frames). In some embodiments, a cached composite map from a previous trip may be used to initialize a composite map for initial UVR(s) for a new trip.

FIG. 28 shows an example under vehicle reconstruction 2830 using simulated fisheye images 2810*a-d*, in accordance with some embodiments of the present disclosure. In this example, an ego-vehicle and its four fisheye cameras are simulated with a virtual front fisheye camera installed in the center of front bumper area, left and right virtual fisheye cameras installed inside the mirror frames, and a virtual rear fisheye camera installed at the back of the ego-vehicle above the license plate. This example uses global ego-motion to provide the ego-vehicle's pose with respect to a pre-defined world space (e.g., the global coordinate system for the simulated 3D environment). For each set of synchronized simulated fisheye images 2810*a-d* from the four virtual fisheye cameras, a corresponding simulated ego-motion entry specifies the ego-vehicle rig's position and orientation within the global coordinate system. The image 2820 represents a top-down (e.g., a birds' eye) view of a 3D bowl model textured with the four simulated fisheye images 2810*a-d* and an example under vehicle reconstruction 2830. In this example, the circle 2840 represents the inner circle of the 3D bowl model, and the under vehicle reconstruction 2830 fills in the area under the vehicle. Note that the white arrow in the center of the image 2820 includes two parts, the top of which is from the front simulated fisheye image 2810*a*, and the bottom which is from the under vehicle reconstruction 2830. As such, the image 2820 aligns these two parts together and provides a complete visualization of the arrow shape.

FIG. 29 shows an example under vehicle reconstruction 2930 using real fisheye images 2910*a-d*, in accordance with some embodiments of the present disclosure. In this example, four fisheye cameras are installed at the four sides of a real car and are calibrated against the vehicle rig coordinate system, and relative ego-motion provides a relative vehicle rig transformation matrix (e.g., representing rotation and translation matrices) for nearby time slices (e.g., timestamps) when fisheye images are captured. In this example, the car is driven on a road with the landmark "STOP" letters printed on its surface. Image 2920 represents rendered top-down view of a 3D bowl model textured with the four fisheye images 2910*a-d* and an example under vehicle reconstruction 2930. In this example, the circle 2940 represents the inner circle of the 3D bowl model, and the under vehicle reconstruction 2930 fills in the area under the vehicle. Note that the "STOP" letters include into two parts. The left bottom part is under the vehicle and invisible to all the four fisheye cameras, while the rest of the letters are within the field of view of the front and right fisheye cameras. In the final reconstructed result in the center of the image 2920, these parts are aligned, making the letters clearly recognizable from a bird's eye view.

As such, a UVR may be used to fill in a missing blind-spot in a surround view visualization. In some embodiments, a 3D model of the vehicle may be rendered on top of a UVR with a (configurable) degree of transparency, allowing an operator to see through a 3D model of the vehicle from the perspective of a virtual camera positioned outside (or even inside) the 3D model, which may be beneficial in various use cases, such as assisting lane changing in the freeway.

Now referring to FIGS. 30 and 31, each block of methods 3000 and 3100, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 3000 and/or 3100 may be understood, by way of example, with respect to the system 100 of FIG. 1 or the under vehicle reconstruction system 2300 of FIG. 23. However, these methods may additionally or alternatively be executed by any one system, or any combination of systems, including, but not limited to, those described herein.

FIG. 30 is a flow diagram showing a method for virtually reconstructing an area of a ground plane under an ego-object, in accordance with some embodiments of the present disclosure. The method 3000, at block B3002, includes generating, using image data generated using one or more cameras of an ego-object during a first time slice, a local map representing an observed portion of a ground plane of an environment surrounding the ego-object. For example, with respect to FIG. 23, the local map generator 2325 may use the ego-motion data 2340 to identify a direction of ego-motion of the ego-object and construct a local map of the ground plane and/or the navigable space (e.g., the road). The local map may face in the direction of ego-motion and may include a length that depends on the speed of ego-motion. The local map generator 2325 may texturize the local map with the image data generated using one or more cameras by assigning a color value to each cell in the grid from a corresponding pixel of the image data.

The method 3000, at block B3004, includes updating a representation of the ground plane based at least on the local map. For example, with respect to FIG. 23, the composite map updater 2330 may merge the local map into a composite representation of local maps generated for previous time slices. Any known merging, fusing, blending, stitching, or combining technique may be applied to combine data from overlapping regions. In another example, the composite map updater 2330 may separately cache each of a plurality of local maps.

The method 3000, at block B3006, includes virtually reconstructing an area of the ground plane under the ego-object during the first time slice based at least on retrieving a corresponding portion of the representation of the ground plane. For example, with respect to FIG. 23, the local map retriever 2345 may determine the position of the ego-object in world coordinates and construct a local map representing the region underneath the ego-object textured with image data retrieved from a composite map. For example, for any given pixel, the local map retriever 2345 may retrieve a merged value from a composite representation of the ground plane and/or a plurality of separately cached values from multiple cached local maps. In the latter instance, the local map retriever 2345 may merge (e.g., average) the plurality of separately cached values to generate a merged value for the given pixel.

FIG. 31 is a flow diagram showing a method for merging a local map into a representation of the ground plane for virtually reconstructing an area of the ground plane under an ego-object, in accordance with some embodiments of the present disclosure. The method 3100, at block B3102, includes merging, into a representation of a ground plane representing portions of the ground plane observed by one or more sensors of an ego-object, a local map representing a portion of the ground plane observed by the one or more sensors during a first time slice. For example, with respect to FIG. 23, the local map generator 2325 may use the ego-motion data 2340 to identify a direction of ego-motion of the ego-object and construct a local map of the ground plane and/or the navigable space (e.g., the road) facing in the direction of ego-motion, and the composite map updater 2330 may merge the local map into a composite representation of local maps generated for previous time slices using any known merging, fusing, blending, stitching, or combining technique to combine data from overlapping regions.

The method 3100, at block B3104, includes virtually reconstructing an area of the ground plane under the ego-object during the first time slice based at least on retrieving a corresponding portion of the representation of the ground plane. For example, with respect to FIG. 23, the local map retriever 2345 may determine the position of the ego-object in world coordinates and construct a local map representing the region underneath the ego-object textured with image data retrieved from the composite map.

Optimized Visualization Streaming

One or more embodiments are directed to techniques for streaming a representation of an environment in and/or around an ego-object (e.g., a vehicle, such as the example autonomous vehicle 3500 of FIGS. 35A-35D). For example, systems and methods are disclosed that stream, render, and/or otherwise deliver a representation of various types of sensor data to a remote location to facilitate various remote experiences. The present techniques may be utilized to visualize and/or stream a representation of an environment in and around an ego-object, such as a vehicle, robot, and/or other type of object, in systems such as parking visualization systems, Surround View Systems, and/or others.

FIG. 32 is an example representation streaming system 3200, in accordance with some embodiments of the present disclosure. At a high level, the representation streaming system 3200 includes an object 3201, which may be an ego-object such as a vehicle, robot, or person; a stationary object such as a sign, pole, wall, or bridge. The object 3201 may be stationary or traverse through an environment, and a representation streaming engine 3205 associated with the object 3201 may use one or more sensors (e.g., such as cameras, microphones, ultrasonic sensors, RADAR sensors, LiDAR sensors, infrared sensors) to capture sensor data representing the environment and stream a representation of the sensor data to a remote device 3270 via a network 3260 that includes at least one wireless communication channel. Depending on the embodiment, the streamed representation of the environment may take a variety of forms and may facilitate various remote experiences at the remote device 3270, such as streaming to a remote viewer (e.g., a friend or relative) operating or wearing the remote device 3270, streaming to a remote or fleet operator using the remote device 3270, streaming to a mobile app on the remote device 3270 configured to self-park or summon the object 3201 (e.g., in embodiments in which the object 3201 is an autonomous vehicle, such as the autonomous vehicle 3500 of FIGS. 35A-35D), rendering a 3D augmented reality (AR) or virtual reality (VR) representation of the physical environment on the remote device 3270, and/or others. In some embodiments, the representation streaming engine 3205 may operate a stream that includes one or more command channels used to control data collection, rendering, stream content, and/or object maneuvers, such as during an emergency, self-park, or summon scenario.

Generally, the object 3201 may be, include, or be associated with a computing device that includes the representation streaming engine 3205. In some embodiments, the representation streaming engine 3205 (or a portion thereof) may correspond to the representation streaming engine 195 of FIG. 1 (or a portion thereof). Depending on the embodiment, the computing device with the representation streaming engine 3205 and/or the remote device 3270 may take various forms, such as a vehicle computer system, a monitoring system, an embedded system controller, a camera, a smartphone, a wearable computer (e.g., a smart watch, an AR/VR headset), a handheld communications device, a consumer electronic device, a workstation, a desktop computer, a laptop computer, a tablet computer, a server, and/or or any other suitable computing device.

In the implementation illustrated in FIG. 32, the representation streaming engine 3205 communicates with one or more computing devices, such as the remote device 3270 and/or a server (not shown in FIG. 32), via the network 3260. The network 3260 may include one or more local area networks (LANs), wide area networks (WANs), wireless communication channels, and/or other communication networks, as will be understood by those of ordinary skill in the art.

Depending on the embodiment, various allocations of functionality are implemented across any number and/or type(s) of devices. In the example illustrated in FIG. 32, the representation streaming engine 3205 and the remote device 3270 are illustrated with various components. In other examples, one or more of the components of the representation streaming engine 3205 and/or the remote device 3270 (or some portion thereof) are executed elsewhere (e.g., as part of the representation streaming engine 3205, the remote device 3270, a server between the representation streaming engine 3205, the remote device 3270). In another example, one or more components of the representation streaming engine 3205 and/or the remote device 3270 (or some portion thereof) are distributed across some other number and/or type(s) of devices (e.g., hosted on a server, such as one operating within a communication channel between the representation streaming engine 3205 and the remote device 3270) that coordinate via the network 3260 to execute the functionality described herein. These are just examples, and any suitable allocation of functionality among these or other devices is possible within the scope of the present disclosure.

Although not depicted in FIG. 32, the representation streaming engine 3205 may include or receive sensor data generating using any number and type of sensor, such as global navigation satellite systems ("GNSS") sensor(s) 3558 (e.g., Global Positioning System sensor(s)), RADAR sensor(s) 3560, ultrasonic sensor(s) 3562, LIDAR sensor(s) 3564, inertial measurement unit (IMU) sensor(s) 3566 (e.g., accelerometer(s), gyroscope(s), magnetic compass(es), magnetometer(s), etc.), microphone(s) 3596, stereo camera(s) 3568, wide-view camera(s) 3570 (e.g., fisheye cameras), infrared camera(s) 3572, surround camera(s) 3574 (e.g., 360° cameras), long-range and/or mid-range camera(s) 3598, speed sensor(s) 3544 (e.g., for measuring the speed of the vehicle 3500), vibration sensor(s) 3542, steering sensor(s) 3540, brake sensor(s) (e.g., as part of the brake sensor system 3546), and/or other sensor types.

To begin with a high level overview, in some embodiments, the representation streaming engine 3205 includes a surround view system 3210, an audio system 3220, a salient event detector 3230, a stream transport system 3240, and/or a remote controlled maneuvering component 3250. The surround view system 3210 (e.g., which may correspond to the surround view system 100 of FIG. 1) may use one or more sensors (e.g., cameras) to capture sensor data and/or generate a corresponding representation of the environment (e.g., a projection image, a stitched image, an adaptive 3D bowl, a textured 3D bowl, a rendered view of one of the foregoing). The audio system 3220 may use one or more microphones to capture audio data and/or generate a corresponding representation of the environment (e.g., a representation of directional or surround audio). The salient event detector 3230 may detect instances of supported salient events (e.g., particular classes of audio or visual events) and corresponding directions using the sensor data (e.g., using one or more machine learning models). When the salient event detector 3230 detects an instance of a salient event, the surround view system 3210 may use the determined direction of the salient event to render a visualization of the environment through a viewport looking in that direction, the audio system 3220 may use the determined direction of the salient event to emphasize audio from that direction. The stream transport system 3240 may use any streaming technology to transport one or more representations of the environment to the remote device 3270. The remote controlled maneuvering component 3250 may include remote control functionality (e.g., NVRC) that allows a remote operator using the remote device 3270 to issue commands that maneuver the object 3201.

Continuing with a high level overview, the remote device 3270 may include a remote experience application 3280, which may provide a variety of functionality. For example, depending on the embodiment, the remote experience application 3280 may provide one-way or two-way video and/or audio streams between the object 3201 and the remote experience application 3280 (e.g., video and/or feed(s) from outside or inside a cockpit or vehicle cabin); rendering a 3D AR or VR representation of the environment in and/or around the object 3201 using the streamed representation of the environment; providing one or one or more command channels to the representation streaming engine 3205 to control data collection, rendering, streamed content, and/or maneuvers of the object 3201 (e.g., during an emergency, self-park, or summon scenario); and/or other functionality.

In some embodiments, the remote experience application 3280 includes a stream presentation component 3282, a viewport controller 3284, an audio component 3286, a self-parking component 3292, and/or a summoning component 3294. The stream presentation component 3282 may cause the remote device 3270 to display a representation of the environment based on the streamed data received from the representation streaming engine 3205 (e.g., raw sensor data, video feed(s), audio feed(s), an AR or VR visualization of the environment). The viewport controller 3284 may control a user interface that accepts a command from a remote operator using the remote device 3270 designating a viewport for rendering by the surround view system 3210. The audio component 3286 may generate directional or surround audio, control audio playback, and/or steer directional or surround view audio generated by the audio system 3220 of the representation streaming engine 3205. The self-parking component 3292 may control a user interface that accepts a command from a remote operator using the remote device 3270 instructing the remote controlled maneuvering component 3250 to self-park the object 3201 (e.g., an autonomous or semi-autonomous vehicle). The summoning component 3294 may control a user interface that accepts a command from a remote operator using the remote device 3270 instructing the remote controlled maneuvering component 3250 to summon the object 3201 (e.g., an autonomous or semi-autonomous vehicle).

Taking an example embodiment in which the object 3201 is a vehicle with a cabin, the object 3201 may be equipped with external sensors capturing a representation of the outside environment and/or internal sensors capturing a representation of the environment inside the cabin. In some cases, the stream transport system 3240 may stream raw sensor data (e.g., video feed(s), LiDAR data, RADAR data, audio narration). Additionally or alternatively, the stream transport system 3240 may some rendering or other representation of the raw sensor data. For example, the surround view system 3210 may project sensor data such as image or LiDAR data onto a 3D representation (e.g., a 3D bowl) and use a virtual camera to render a view of the 3D representation in a 2D viewport. In some embodiments, the stream transport system 3240 may transport the 3D representation, the rendered 2D viewport, and/or some segment or portion thereof. The surround view system 3210 may set the position and orientation of the virtual camera in various ways, such as using a position and orientation (or corresponding scenario) specified by a remote command received via the remote controlled maneuvering component 3250 (e.g., enabling a remote person to control what perspective is rendered and/or streamed); using a position and orientation corresponding to occupant gaze, head pose, or body pose (e.g., detected using a Driver Monitoring System (DMS) and/or an Occupant Monitoring System (OMS)); using a position and orientation corresponding to a driving scenario (e.g., parking, direction and/or speed of ego-motion); and/or otherwise.

Taking an example embodiment involving directional or surround audio, the object 3201 (e.g., a vehicle) may be affixed with multiple microphones around the object 3201. In some embodiments, the audio system 3220 may capture raw audio data. The audio system 3320 of the representation streaming engine 3205 may remove environmental noise (e.g., road noise) from audio data in various ways (e.g., using one or more machine learning models to subtract noise from an audio signal). In some embodiments, the stream transport system 3240 may stream the raw audio data to some remote location (e.g., the audio component 3286 of the remote experience application 3280, a server) where directional or surround audio may be computed. In some cases, the audio system 3220 computes directional or surround audio, and the stream transport system 3240 streams a representation of the directional or surround audio.

In some embodiments, the audio system 3220 may set the position and orientation of a soundport for the directional or surround audio in various ways, such as using a position and orientation (or corresponding scenario) specified by a remote command (received via the audio component 3286 of the remote experience application 3280) steering the directional or surround audio (e.g., enabling a remote person to control what perspective is rendered and/or streamed). Additionally or alternatively, the salient event detector 3230 may analyze sensor data to detect instances of supported salient events (e.g., whether implemented in the representation streaming engine 3205, the remote experience application 3280, or elsewhere) and determine a corresponding direction, and the determined direction be used to emphasize audio from that direction. For example, the salient event detector 3230 may include one or more machine learning models (e.g., any known audio classifier) that analyze a captured audio signal to detect one or more supported audio classes representing a salient audio event (e.g., an emergency noise or other salient audio event such as a vehicle horn, siren, screeching tires, a collision, and/or others). Upon detecting a supported salient audio event from a microphone pointing in a particular direction, the audio system 3220 may steer the directional audio in that direction.

As such, the remote experience application 3280 (e.g., the audio component 3286) may receive, compute, and/or playback directional or surround audio, for example, to facilitate an immersive experience for a remote viewer or operator.

In some embodiments, the salient event detector 3230 may use other sensor data to detect an emergency or other salient event, and the representation streaming engine 3205 may use the detected salient event to steer capturing or rendering of sensor data towards the direction of the detected salient event. For example, the salient event detector 3230 may include one or more machine learning models that detect salient events by analyzing a representation of image data, video data, proximity data, LiDAR data, RADAR data, and/or other sensor data; and upon detecting a salient event, the representation streaming engine 3205 may steer directional audio and/or a viewport rendering of a 3D representation of the environment towards the direction of the detected event, and the surround view system 3210 may present the directed viewport rendering on a monitor visible to occupants (e.g., driver) of the object 3201 (e.g., the vehicle). Additionally or alternatively, the stream transport system 3240 may stream the directional audio and/or the directed viewport rendering to the remote experience application 3280, the stream presentation component 3282 may present the directed viewport rendering, and/or the audio component 3286 may play back the directional audio. In some embodiments, the directional audio and/or the directed viewport rendering may be presented in association with some alarm, presented picture-in-picture (e.g., with some other video feed such as one pointing in the direction of travel), and/or otherwise. In some embodiments, the remote controlled maneuvering component 3250 may use a detected salient event (e.g., an imminent collision) to trigger commandeering control of the object 3201 (e.g., the vehicle), avoiding a collision, and/or steering the object 3201 to safety.

In some embodiments, the stream transport system 3240 may trigger generation and/or streaming of a representation of the environment in various ways. In some embodiments, the stream transport system 3240 triggers capture, rendering, and/or transport based on location of the object 3201 (e.g., when a vehicle reaches a particular intersection, latitude/longitude, geofence), a detected salient event (e.g., an accident, encountered emergency vehicle), a designated time, on demand (e.g., triggered by a command from a vehicle occupant, remote operator), and/or otherwise. The stream transport system 3240 may include one or more command channels configured to deliver and trigger the remote controlled maneuvering component 3250 to execute remotely issued commands (e.g., via remote control functionality, such as NVRC).

The stream transport system 3240 may use any streaming technology to transport a representation(s) of the environment over the network 3260 to a remote location (e.g., a remote server, the remote device 3270). For example, the stream transport system 3240 may include dedicated communication channels for each type of content (e.g., one or more types of sensor data, one or more types of rendered content, two-way audio, each type of command), may support scalable streams (e.g., using scalable audio or video coders to adjust encoding quality based on bandwidth), and/or may implement a Quality of Service (QoS) mechanism to assign a priority to certain streamed content and/or commands and manage the stream accordingly. In some embodiments, the stream transport system 3240 implements a stream hierarchy that prioritizes particular types of content. For example, in some implementations that prioritize a rendered AR/VR visualization, the stream transport system 3240 may prioritize the rendered AR/VR visualization for streaming and deprioritize or drop other sensor data such as LiDAR data (e.g., to conserve bandwidth). In another example, in some implementations that deliver content to a mobile device, the stream transport system 3240 may drop LiDAR data because the mobile device may lack the functionality to handle that type of data. In some scenarios, the stream transport system 3240 may stream raw sensor data and drop all other content. In yet another example, the stream transport system 3240 may assign different priorities to different modalities of sensor data, and drop deprioritized sensor data. These are just a few examples, and other hierarchies are contemplated within the scope of the present disclosure.

In an example remote user experience, a remote user operating the remote experience application 3280 may interact with one or more user interfaces (e.g., graphical user interfaces) that accept input identifying (and issue commands configuring) a particular view for rendering, use the one or more user interfaces to interact with (e.g., via two-way audio) an occupant or operator of the object 3201 (e.g., a vehicle occupant), and/or use the one or more user interfaces to issue commands steering a viewport, soundport, or sensorport (e.g., whether rendering is performed by the representation streaming engine 3205, by the remote experience application 3280, or at some other location). In an example embodiment in which the object 3201 is a vehicle; the remote experience application 3280 may be mobile app, may control a display or monitor visible to a vehicle operated by the friend, and/or may control an AR or VR headset; and a vehicle occupant may use the representation streaming engine 3205 to stream to a friend or remote operator using the remote experience application 3280. In some embodiments, multiple vehicles in a fleet may stream to a location where fleet monitoring occurs.

In an autonomous or semi-autonomous driving application, the remote experience application 3280 may be a mobile app, and a user may operate the remote experience application 3280 on his or her mobile device to maneuver the object 3201 (e.g., his or her autonomous or semi-autonomous vehicle). For example, the remote experience application 3280 may be configured to communicate with the remote controlled maneuvering component 3250 to initiate autonomous or semi-autonomous maneuvering (e.g., self-parking, summoning of the vehicle, traveling along designated waypoints or a traced path, etc.), and the stream transport system 3240 may stream video or some other sensor data to the remote experience application 3280 so the user can monitor the object 3201 while it is self-maneuvering. In another application, if there is a failure in autonomous maneuvering (e.g., a slow-down, stoppage in a lane) or a catastrophic health event, the stream transport system 3240 may connect to an emergency operator and transmit a video feed or other sensor data, enabling the emergency operator to assess the situation and potentially take control and navigate the vehicle to safety via the remote controlled maneuvering component 3250.

In another example application, the remote experience application 3280 may render a 3D (e.g., AR or VR) representation of a physical (e.g., driving or navigational) environment with a digital twin or other virtual representation of one or more ego-objects in the physical environment. By way of non-limiting example, FIG. 33 is an example AR and/or VR system (AR/VR system) 3330, in accordance with some embodiments of the present disclosure. In this example, the AR/VR system 3330 includes objects 3305*a-n*

(e.g., which may correspond to the object 3201 of FIG. 32) in communication with an AR/VR system 3330 (e.g., which may include or correspond to the remote device 3270 of FIG. 32) via a network 3260 (e.g., which may correspond to the network 3260 of FIG. 32). In this example, any number of objects 3305*a-n* (e.g., different vehicles) in the physical environment may include corresponding representation stream engines 3310*a-n* that sense, stream, and/or use position and/or orientation of the objects 3305*a-n* to update the position and/or orientation of their corresponding virtual representations (e.g., digital twins) in an AR/VR representation of the physical environment, substantially in real-time. As such, the AR/VR system 3330 may render an AR/VR representation of the physical environment that includes the digital twins and/or a visual or auditory representation of sensor data (e.g., image data, LiDAR data, RADAR data, temperature, audio) streamed from the objects 3305*a-n*, and the AR/VR system 3330 may present the AR/VR representation of the physical environment to a user outside the physical environment to provide an immersive experience representing the physical environment through which the objects 3305*a-n* are traveling.

In the example illustrated in FIG. 33, the AR/VR system 3330 includes a physical environment simulator 3335 that generates a simulated AR/VR representation of the physical environment using a digital twin generator 3340, a 3D environment rendering component 3350, and/or an audio component 3360. The digital twin generator 3340 may receive streamed representations of positions and orientations of the objects 3305*a-n* from the objects 3305*a-n*, and track, update, and manage representations of corresponding positions and orientations of digital twins representing the objects 3305*a-n* in a corresponding 3D representation of the physical environment. As such, the 3D environment rendering component 3350 may render an AR and/or VR representation of the 3D environment that includes digital twins of the objects 3305*a-n* at their streamed positions and orientations. In some embodiments, the 3D environment rendering component 3350 renders an AR/VR representation of the physical environment that includes a visual representation of streamed sensor data (e.g., image data, LiDAR data, RADAR data, temperature) detected and streamed by one or more of the objects 3305*a-n* in the physical environment. Additionally or alternatively, the audio component 3360 (e.g., which may correspond to the audio component 3286 of FIG. 32) may playback audio (e.g., raw audio, directional or surround audio) using streamed audio from the one or more of the objects 3305*a-n*. As such, the AR/VR system 3330 may render an AR or VR representation of the physical environment (e.g., in a headset worn by a remote user) to provide an immersive experience representing the physical environment through which the objects 3305*a-n* are traveling.

Now referring to FIG. 34, each block of method 3400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, the method 3400 is described, by way of example, with respect to the representation streaming system 3200 of FIG. 32. However, these methods may additionally or alternatively be executed by any one system, or any combination of systems, including, but not limited to, those described herein.

FIG. 34 is a flow diagram showing a method 3400 for streaming representations of a physical environment, in accordance with some embodiments of the present disclosure. The method 3400, at block 3402, includes issuing a remote command to an ego-object in a physical environment from a remote device in a remote location outside the physical environment. For example, with respect to FIG. 32, the viewport controller 3284 may control an interface of the remote experience application 3280 that accepts a command from a remote operator using the remote device 3270 designating a viewport for rendering by the surround view system 3210, and the viewport controller 3284 may issue the command to the representation streaming engine 3205 via the network 3260. In another example, the audio component 3286 may issue a command steering directional or surround view audio generated by the audio system 3220 of the representation streaming engine 3205. In another example, the self-parking component 3292 may control a user interface that accepts and issues a command from a remote operator using the remote device 3270 instructing the remote controlled maneuvering component 3250 to self-park the object 3201 (e.g., an autonomous or semi-autonomous vehicle). In another example, the summoning component 3294 may control a user interface that accepts and issues a command from a remote operator using the remote device 3270 instructing the remote controlled maneuvering component 3250 to summon the object 3201 (e.g., an autonomous or semi-autonomous vehicle).

The method 3400, at block 3404, includes receiving, from the ego-object, by the remote device, a stream of representations of the physical environment that were generated by the ego-object based at least on the remote command. For example, with respect to FIG. 32, the stream transport system 3240 may use any streaming technology to transport one or more representations of the environment to the remote device 3270 via the network 3260, and the stream presentation component 3282 may receive the streamed data. The representations of the physical environment transported by the stream may include one or more types of data (e.g., captured or generated by the representation streaming engine 3205, by a remote server) representing a particular time slice, and the stream may include updated representations of the one or more types of data in each successive time slice.

The method 3400, at block 3406, includes causing the remote device to present a visualization of the representations of the physical environment. For example, with respect to FIG. 32, the stream presentation component 3282 may cause the remote device 3270 to display a representation of the environment based on the streamed data (e.g., raw sensor data, video feed(s), audio feed(s), an AR or VR visualization of the environment). In some embodiments, the stream presentation component 3282 may present the representation of the environment in association with some alarm, presented picture-in-picture (e.g., with some other video feed such as one pointing in the direction of travel), and/or otherwise. In another example, with respect to FIG. 33, 3D environment rendering component 3350 may render an AR and/or VR representation of the physical environment that includes a digital twin of the ego-object at a position (and orientation) included in the representations of the physical environment. These are just a few examples, and other implementations are contemplated within the scope of the present disclosure.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

FIG. 35A is an illustration of an example autonomous vehicle 3500, in accordance with some embodiments of the present disclosure. The autonomous vehicle 3500 (alternatively referred to herein as the "vehicle 3500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 3500 may be capable of functionality in accordance with one or more of Level 3-Level 5 of the autonomous driving levels. The vehicle 3500 may be capable of functionality in accordance with one or more of Level 1-Level 5 of the autonomous driving levels. For example, the vehicle 3500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 3500 or other machine, such as being fully autonomous, being highly autonomous, being conditionally autonomous, being partially autonomous, providing assistive autonomy, being semi-autonomous, being primarily autonomous, or other designation.

The vehicle 3500 may include components such as a chassis, a vehicle body, wheels (e.g., 2, 4, 6, 8, 18, etc.), tires, axles, and other components of a vehicle. The vehicle 3500 may include a propulsion system 3550, such as an internal combustion engine, hybrid electric power plant, an all-electric engine, and/or another propulsion system type. The propulsion system 3550 may be connected to a drive train of the vehicle 3500, which may include a transmission, to enable the propulsion of the vehicle 3500. The propulsion system 3550 may be controlled in response to receiving signals from the throttle/accelerator 3552.

A steering system 3554, which may include a steering wheel, may be used to steer the vehicle 3500 (e.g., along a desired path or route) when the propulsion system 3550 is operating (e.g., when the vehicle is in motion). The steering system 3554 may receive signals from a steering actuator 3556. The steering wheel may be optional for full automation (Level 5) functionality.

The brake sensor system 3546 may be used to operate the vehicle brakes in response to receiving signals from the brake actuators 3548 and/or brake sensors.

Controller(s) 3536, which may include one or more system on chips (SoCs) 3504 (FIG. 35C) and/or GPU(s), may provide signals (e.g., representative of commands) to one or more components and/or systems of the vehicle 3500. For example, the controller(s) may send signals to operate the vehicle brakes via one or more brake actuators 3548, to operate the steering system 3554 via one or more steering actuators 3556, to operate the propulsion system 3550 via one or more throttle/accelerators 3552. The controller(s) 3536 may include one or more onboard (e.g., integrated) computing devices (e.g., supercomputers) that process sensor signals, and output operation commands (e.g., signals representing commands) to enable autonomous driving and/or to assist a human driver in driving the vehicle 3500. The controller(s) 3536 may include a first controller 3536 for autonomous driving functions, a second controller 3536 for functional safety functions, a third controller 3536 for artificial intelligence functionality (e.g., computer vision), a fourth controller 3536 for infotainment functionality, a fifth controller 3536 for redundancy in emergency conditions, and/or other controllers. In some examples, a single controller 3536 may handle two or more of the above functionalities, two or more controllers 3536 may handle a single functionality, and/or any combination thereof.

The controller(s) 3536 may provide the signals for controlling one or more components and/or systems of the vehicle 3500 in response to sensor data received from one or more sensors (e.g., sensor inputs). The sensor data may be received from, for example and without limitation, global navigation satellite systems ("GNSS") sensor(s) 3558 (e.g., Global Positioning System sensor(s)), RADAR sensor(s) 3560, ultrasonic sensor(s) 3562, LIDAR sensor(s) 3564, inertial measurement unit (IMU) sensor(s) 3566 (e.g., accelerometer(s), gyroscope(s), magnetic compass(es), magnetometer(s), etc.), microphone(s) 3596, stereo camera(s) 3568, wide-view camera(s) 3570 (e.g., fisheye cameras), infrared camera(s) 3572, surround camera(s) 3574 (e.g., 360° cameras), long-range and/or mid-range camera(s) 3598, speed sensor(s) 3544 (e.g., for measuring the speed of the vehicle 3500), vibration sensor(s) 3542, steering sensor(s) 3540, brake sensor(s) (e.g., as part of the brake sensor system 3546), and/or other sensor types.

One or more of the controller(s) 3536 may receive inputs (e.g., represented by input data) from an instrument cluster 3532 of the vehicle 3500 and provide outputs (e.g., represented by output data, display data, etc.) via a human-machine interface (HMI) display 3534, an audible annunciator, a loudspeaker, and/or via other components of the vehicle 3500. The outputs may include information such as vehicle velocity, speed, time, map data (e.g., the High Definition ("HD") map 3522 of FIG. 35C), location data (e.g., the vehicle's 3500 location, such as on a map), direction, location of other vehicles (e.g., an occupancy grid), information about objects and status of objects as perceived by the controller(s) 3536, etc. For example, the HMI display 3534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 3500 further includes a network interface 3524 which may use one or more wireless antenna(s) 3526 and/or modem(s) to communicate over one or more networks. For example, the network interface 3524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 3526 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

FIG. 35B is an example of camera locations and fields of view for the example autonomous vehicle 3500 of FIG. 35A, in accordance with some embodiments of the present disclosure. The cameras and respective fields of view are one example embodiment and are not intended to be limiting. For example, additional and/or alternative cameras may be included and/or the cameras may be located at different locations on the vehicle 3500.

The camera types for the cameras may include, but are not limited to, digital cameras that may be adapted for use with the components and/or systems of the vehicle 3500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 3500 (e.g., front-facing cameras) may be used for surround view, to help identify forward facing paths and obstacles, as well aid in, with the help of one or more controllers 3536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 3570 that may be used to perceive objects coming into view from the periphery (e.g., pedestrians, crossing traffic or bicycles). Although only one wide-view camera is illustrated in FIG. 35B, there may be any number (including zero) of wide-view cameras 3570 on the vehicle 3500. In addition, any number of long-range camera(s) 3598 (e.g., a long-view stereo camera pair) may be used for depth-based object detection, especially for objects for which a neural network has not yet been trained. The long-range camera(s) 3598 may also be used for object detection and classification, as well as basic object tracking.

Any number of stereo cameras 3568 may also be included in a front-facing configuration. In at least one embodiment, one or more of stereo camera(s) 3568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 3568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 3568 may be used in addition to, or alternatively from, those described herein.

Cameras with a field of view that include portions of the environment to the side of the vehicle 3500 (e.g., side-view cameras) may be used for surround view, providing information used to create and update the occupancy grid, as well as to generate side impact collision warnings. For example, surround camera(s) 3574 (e.g., four surround cameras 3574 as illustrated in FIG. 35B) may be positioned to on the vehicle 3500. The surround camera(s) 3574 may include wide-view camera(s) 3570, fisheye camera(s), 360° camera(s), and/or the like. Four example, four fisheye cameras may be positioned on the vehicle's front, rear, and sides. In an alternative arrangement, the vehicle may use three surround camera(s) 3574 (e.g., left, right, and rear), and may leverage one or more other camera(s) (e.g., a forward-facing camera) as a fourth surround view camera.

Cameras with a field of view that include portions of the environment to the rear of the vehicle 3500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 3598, stereo camera(s) 3568), infrared camera(s) 3572, etc.), as described herein.

FIG. 35C is a block diagram of an example system architecture for the example autonomous vehicle 3500 of FIG. 35A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 3500 in FIG. 35C are illustrated as being connected via bus 3502. The bus 3502 may include a Controller Area Network (CAN) data interface (alternatively referred to herein as a "CAN bus"). A CAN may be a network inside the vehicle 3500 used to aid in control of various features and functionality of the vehicle 3500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 3502 is described herein as being a CAN bus, this is not intended to be limiting. For example, in addition to, or alternatively from, the CAN bus, FlexRay and/or Ethernet may be used. Additionally, although a single line is used to represent the bus 3502, this is not intended to be limiting. For example, there may be any number of busses 3502, which may include one or more CAN busses, one or more FlexRay busses, one or more Ethernet busses, and/or one or more other types of busses using a different protocol. In some examples, two or more busses 3502 may be used to perform different functions, and/or may be used for redundancy. For example, a first bus 3502 may be used for collision avoidance functionality and a second bus 3502 may be used for actuation control. In any example, each bus 3502 may communicate with any of the components of the vehicle 3500, and two or more busses 3502 may communicate with the same components. In some examples, each SoC 3504, each controller 3536, and/or each computer within the vehicle may have access to the same input data (e.g., inputs from sensors of the vehicle 3500), and may be connected to a common bus, such the CAN bus.

The vehicle 3500 may include one or more controller(s) 3536, such as those described herein with respect to FIG. 35A. The controller(s) 3536 may be used for a variety of functions. The controller(s) 3536 may be coupled to any of the various other components and systems of the vehicle 3500, and may be used for control of the vehicle 3500, artificial intelligence of the vehicle 3500, infotainment for the vehicle 3500, and/or the like.

The vehicle 3500 may include a system(s) on a chip (SoC) 3504. The SoC 3504 may include CPU(s) 3506, GPU(s) 3508, processor(s) 3510, cache(s) 3512, accelerator(s) 3514, data store(s) 3516, and/or other components and features not illustrated. The SoC(s) 3504 may be used to control the vehicle 3500 in a variety of platforms and systems. For example, the SoC(s) 3504 may be combined in a system (e.g., the system of the vehicle 3500) with an HD map 3522 which may obtain map refreshes and/or updates via a network interface 3524 from one or more servers (e.g., server(s) 3578 of FIG. 35D).

The CPU(s) 3506 may include a CPU cluster or CPU complex (alternatively referred to herein as a "CCPLEX"). The CPU(s) 3506 may include multiple cores and/or L2 caches. For example, in some embodiments, the CPU(s) 3506 may include eight cores in a coherent multi-processor configuration. In some embodiments, the CPU(s) 3506 may include four dual-core clusters where each cluster has a dedicated L2 cache (e.g., a 2 MB L2 cache). The CPU(s) 3506 (e.g., the CCPLEX) may be configured to support simultaneous cluster operation enabling any combination of the clusters of the CPU(s) 3506 to be active at any given time.

The CPU(s) 3506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 3506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 3508 may include an integrated GPU (alternatively referred to herein as an "iGPU"). The GPU(s) 3508 may be programmable and may be efficient for parallel workloads. The GPU(s) 3508, in some examples, may use an enhanced tensor instruction set. The GPU(s) 3508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 3508 may include at least eight streaming microprocessors. The GPU(s) 3508 may use compute application programming interface(s) (API(s)). In addition, the GPU(s) 3508 may use one or more parallel computing platforms and/or programming models (e.g., NVIDIA's CUDA).

The GPU(s) 3508 may be power-optimized for best performance in automotive and embedded use cases. For example, the GPU(s) 3508 may be fabricated on a Fin field-effect transistor (FinFET). However, this is not intended to be limiting and the GPU(s) 3508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 3508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 3508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 3508 to access the CPU(s) 3506 page tables directly. In such examples, when the GPU(s) 3508 memory management unit (MMU) experiences a miss, an address translation request may be transmitted to the CPU(s) 3506. In response, the CPU(s) 3506 may look in its page tables for the virtual-to-physical mapping for the address and transmits the translation back to the GPU(s) 3508. As such, unified memory technology may allow a single unified virtual address space for memory of both the CPU(s) 3506 and the GPU(s) 3508, thereby simplifying the GPU(s) 3508 programming and porting of applications to the GPU(s) 3508.

In addition, the GPU(s) 3508 may include an access counter that may keep track of the frequency of access of the GPU(s) 3508 to memory of other processors. The access counter may help ensure that memory pages are moved to the physical memory of the processor that is accessing the pages most frequently.

The SoC(s) 3504 may include any number of cache(s) 3512, including those described herein. For example, the cache(s) 3512 may include an L3 cache that is available to both the CPU(s) 3506 and the GPU(s) 3508 (e.g., that is connected both the CPU(s) 3506 and the GPU(s) 3508). The cache(s) 3512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 3504 may include an arithmetic logic unit(s) (ALU(s)) which may be leveraged in performing processing with respect to any of the variety of tasks or operations of the vehicle 3500— such as processing DNNs. In addition, the SoC(s) 3504 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 3506 and/or GPU(s) 3508.

The SoC(s) 3504 may include one or more accelerators 3514 (e.g., hardware accelerators, software accelerators, or a combination thereof). For example, the SoC(s) 3504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 3508 and to off-load some of the tasks of the GPU(s) 3508 (e.g., to free up more cycles of the GPU(s) 3508 for performing other tasks). As an example, the accelerator(s) 3514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 3514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 3508, and by using an inference accelerator, for example, a designer may target either the DLA(s) or the GPU(s) 3508 for any function. For example, the designer may focus processing of CNNs and floating point operations on the DLA(s) and leave other functions to the GPU(s) 3508 and/or other accelerator(s) 3514.

The accelerator(s) 3514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 3506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be couple d to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 3514 (e.g., the hardware acceleration cluster) may include a computer vision network on-chip and SRAM, for providing a high-bandwidth, low latency SRAM for the accelerator(s) 3514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 3504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 3514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB The DLA may run a neural network for regressing the confidence value. The neural network may take as its input at least some subset of parameters, such as bounding box dimensions, ground plane estimate obtained (e.g. from another subsystem), inertial measurement unit (IMU) sensor 3566 output that correlates with the vehicle 3500 orientation, distance, 3D location estimates of the object obtained from the neural network and/or other sensors (e.g., LIDAR sensor(s) 3564 or RADAR sensor(s) 3560), among others.

The SoC(s) 3504 may include data store(s) 3516 (e.g., memory). The data store(s) 3516 may be on-chip memory of the SoC(s) 3504, which may store neural networks to be executed on the GPU and/or the DLA. In some examples, the data store(s) 3516 may be large enough in capacity to store multiple instances of neural networks for redundancy and safety. The data store(s) 3512 may comprise L2 or L3 cache(s) 3512. Reference to the data store(s) 3516 may include reference to the memory associated with the PVA, DLA, and/or other accelerator(s) 3514, as described herein.

The SoC(s) 3504 may include one or more processor(s) 3510 (e.g., embedded processors). The processor(s) 3510 may include a boot and power management processor that may be a dedicated processor and subsystem to handle boot power and management functions and related security enforcement. The boot and power management processor may be a part of the SoC(s) 3504 boot sequence and may provide runtime power management services. The boot power and management processor may provide clock and voltage programming, assistance in system low power state transitions, management of SoC(s) 3504 thermals and temperature sensors, and/or management of the SoC(s) 3504 power states. Each temperature sensor may be implemented as a ring-oscillator whose output frequency is proportional to temperature, and the SoC(s) 3504 may use the ring-oscillators to detect temperatures of the CPU(s) 3506, GPU(s) 3508, and/or accelerator(s) 3514. If temperatures are determined to exceed a threshold, the boot and power management processor may enter a temperature fault routine and put the SoC(s) 3504 into a lower power state and/or put the vehicle 3500 into a chauffeur to safe stop mode (e.g., bring the vehicle 3500 to a safe stop).

The processor(s) 3510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 3510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 3510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 3510 may further include a real-time camera engine that may include a dedicated processor subsystem for handling real-time camera management.

The processor(s) 3510 may further include a high-dynamic range signal processor that may include an image signal processor that is a hardware engine that is part of the camera processing pipeline.

The processor(s) 3510 may include a video image compositor that may be a processing block (e.g., implemented on a microprocessor) that implements video post-processing functions needed by a video playback application to produce the final image for the player window. The video image compositor may perform lens distortion correction on wide-view camera(s) 3570, surround camera(s) 3574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 3508 is not required to continuously render new surfaces. Even when the GPU(s) 3508 is powered on and active doing 3D rendering, the video image compositor may be used to offload the GPU(s) 3508 to improve performance and responsiveness.

The SoC(s) 3504 may further include a mobile industry processor interface (MIPI) camera serial interface for receiving video and input from cameras, a high-speed interface, and/or a video input block that may be used for camera and related pixel input functions. The SoC(s) 3504 may further include an input/output controller(s) that may be controlled by software and may be used for receiving I/O signals that are uncommitted to a specific role.

The SoC(s) 3504 may further include a broad range of peripheral interfaces to enable communication with peripherals, audio codecs, power management, and/or other devices. The SoC(s) 3504 may be used to process data from cameras (e.g., connected over Gigabit Multimedia Serial Link and Ethernet), sensors (e.g., LIDAR sensor(s) 3564, RADAR sensor(s) 3560, etc. that may be connected over Ethernet), data from bus 3502 (e.g., speed of vehicle 3500, steering wheel position, etc.), data from GNSS sensor(s) 3558 (e.g., connected over Ethernet or CAN bus). The SoC(s) 3504 may further include dedicated high-performance mass storage controllers that may include their own DMA engines, and that may be used to free the CPU(s) 3506 from routine data management tasks.

The SoC(s) 3504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 3504 may be faster, more reliable, and even more energy-efficient and space-efficient than conventional systems. For example, the accelerator(s) 3514, when combined with the CPU(s) 3506, the GPU(s) 3508, and the data store(s) 3516, may provide for a fast, efficient platform for level 3-5 autonomous vehicles.

The technology thus provides capabilities and functionality that cannot be achieved by conventional systems. For example, computer vision algorithms may be executed on CPUs, which may be configured using a high level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 3520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 3508.

In some examples, a CNN for facial recognition and vehicle owner identification may use data from camera sensors to identify the presence of an authorized driver and/or owner of the vehicle 3500. The always on sensor processing engine may be used to unlock the vehicle when the owner approaches the driver door and turn on the lights, and, in security mode, to disable the vehicle when the owner leaves the vehicle. In this way, the SoC(s) 3504 provide for security against theft and/or carjacking.

In another example, a CNN for emergency vehicle detection and identification may use data from microphones 3596 to detect and identify emergency vehicle sirens. In contrast to conventional systems, that use general classifiers to detect sirens and manually extract features, the SoC(s) 3504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 3558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 3562, until the emergency vehicle(s) passes.

The vehicle may include a CPU(s) 3518 (e.g., discrete CPU(s), or dCPU(s)), that may be coupled to the SoC(s) 3504 via a high-speed interconnect (e.g., PCIe). The CPU(s) 3518 may include an X86 processor, for example. The CPU(s) 3518 may be used to perform any of a variety of functions, including arbitrating potentially inconsistent results between ADAS sensors and the SoC(s) 3504, and/or monitoring the status and health of the controller(s) 3536 and/or infotainment SoC 3530, for example.

The vehicle 3500 may include a GPU(s) 3520 (e.g., discrete GPU(s), or dGPU(s)), that may be coupled to the SoC(s) 3504 via a high-speed interconnect (e.g., NVIDIA's NVLINK). The GPU(s) 3520 may provide additional artificial intelligence functionality, such as by executing redundant and/or different neural networks, and may be used to train and/or update neural networks based on input (e.g., sensor data) from sensors of the vehicle 3500.

The vehicle 3500 may further include the network interface 3524 which may include one or more wireless antennas 3526 (e.g., one or more wireless antennas for different communication protocols, such as a cellular antenna, a Bluetooth antenna, etc.). The network interface 3524 may be used to enable wireless connectivity over the Internet with the cloud (e.g., with the server(s) 3578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 3500 information about vehicles in proximity to the vehicle 3500 (e.g., vehicles in front of, on the side of, and/or behind the vehicle 3500). This functionality may be part of a cooperative adaptive cruise control functionality of the vehicle 3500.

The network interface 3524 may include a SoC that provides modulation and demodulation functionality and enables the controller(s) 3536 to communicate over wireless networks. The network interface 3524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 3500 may further include data store(s) 3528 which may include off-chip (e.g., off the SoC(s) 3504) storage. The data store(s) 3528 may include one or more storage elements including RAM, SRAM, DRAM, VRAM, Flash, hard disks, and/or other components and/or devices that may store at least one bit of data.

The vehicle 3500 may further include GNSS sensor(s) 3558. The GNSS sensor(s) 3558 (e.g., GPS, assisted GPS sensors, differential GPS (DGPS) sensors, etc.), to assist in mapping, perception, occupancy grid generation, and/or path planning functions. Any number of GNSS sensor(s) 3558 may be used, including, for example and without limitation, a GPS using a USB connector with an Ethernet to Serial (RS-232) bridge.

The vehicle 3500 may further include RADAR sensor(s) 3560. The RADAR sensor(s) 3560 may be used by the vehicle 3500 for long-range vehicle detection, even in darkness and/or severe weather conditions. RADAR functional safety levels may be ASIL B. The RADAR sensor(s) 3560 may use the CAN and/or the bus 3502 (e.g., to transmit data generated by the RADAR sensor(s) 3560) for control and to access object tracking data, with access to Ethernet to access raw data in some examples. A wide variety of RADAR sensor types may be used. For example, and without limitation, the RADAR sensor(s) 3560 may be suitable for front, rear, and side RADAR use. In some example, Pulse Doppler RADAR sensor(s) are used.

The RADAR sensor(s) 3560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 3560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 3500 surroundings at higher speeds with minimal interference from traffic in adjacent lanes. The other two antennae may expand the field of view, making it possible to quickly detect vehicles entering or leaving the vehicle's 3500 lane.

Mid-range RADAR systems may include, as an example, a range of up to 3560 m (front) or 80 m (rear), and a field of view of up to 42 degrees (front) or 3550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 3500 may further include ultrasonic sensor(s) 3562. The ultrasonic sensor(s) 3562, which may be positioned at the front, back, and/or the sides of the vehicle 3500, may be used for park assist and/or to create and update an occupancy grid. A wide variety of ultrasonic sensor(s) 3562 may be used, and different ultrasonic sensor(s) 3562 may be used for different ranges of detection (e.g., 2.5 m, 4 m). The ultrasonic sensor(s) 3562 may operate at functional safety levels of ASIL B.

The vehicle 3500 may include LIDAR sensor(s) 3564. The LIDAR sensor(s) 3564 may be used for object and pedestrian detection, emergency braking, collision avoidance, and/or other functions. The LIDAR sensor(s) 3564 may be functional safety level ASIL B. In some examples, the vehicle 3500 may include multiple LIDAR sensors 3564 (e.g., two, four, six, etc.) that may use Ethernet (e.g., to provide data to a Gigabit Ethernet switch).

In some examples, the LIDAR sensor(s) 3564 may be capable of providing a list of objects and their distances for a 360° field of view. Commercially available LIDAR sensor(s) 3564 may have an advertised range of approximately 3500 m, with an accuracy of 2 cm-3 cm, and with support for a 3500 Mbps Ethernet connection, for example. In some examples, one or more non-protruding LIDAR sensors 3564 may be used. In such examples, the LIDAR sensor(s) 3564 may be implemented as a small device that may be embedded into the front, rear, sides, and/or corners of the vehicle 3500. The LIDAR sensor(s) 3564, in such examples, may provide up to a 120-degree horizontal and 35-degree vertical field-of-view, with a 200 m range even for low-reflectivity objects. Front-mounted LIDAR sensor(s) 3564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 3500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 3564 may be less susceptible to motion blur, vibration, and/or shock.

The vehicle may further include IMU sensor(s) 3566. The IMU sensor(s) 3566 may be located at a center of the rear axle of the vehicle 3500, in some examples. The IMU sensor(s) 3566 may include, for example and without limitation, an accelerometer(s), a magnetometer(s), a gyroscope(s), a magnetic compass(es), and/or other sensor types. In some examples, such as in six-axis applications, the IMU sensor(s) 3566 may include accelerometers and gyroscopes, while in nine-axis applications, the IMU sensor(s) 3566 may include accelerometers, gyroscopes, and magnetometers.

In some embodiments, the IMU sensor(s) 3566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 3566 may enable the vehicle 3500 to estimate heading without requiring input from a magnetic sensor by directly observing and correlating the changes in velocity from GPS to the IMU sensor(s) 3566. In some examples, the IMU sensor(s) 3566 and the GNSS sensor(s) 3558 may be combined in a single integrated unit.

The vehicle may include microphone(s) 3596 placed in and/or around the vehicle 3500. The microphone(s) 3596 may be used for emergency vehicle detection and identification, among other things.

The vehicle may further include any number of camera types, including stereo camera(s) 3568, wide-view camera(s) 3570, infrared camera(s) 3572, surround camera(s) 3574, long-range and/or mid-range camera(s) 3598, and/or other camera types. The cameras may be used to capture image data around an entire periphery of the vehicle 3500. The types of cameras used depends on the embodiments and requirements for the vehicle 3500, and any combination of camera types may be used to provide the necessary coverage around the vehicle 3500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 35A and FIG. 35B.

The vehicle 3500 may further include vibration sensor(s) 3542. The vibration sensor(s) 3542 may measure vibrations of components of the vehicle, such as the axle(s). For example, changes in vibrations may indicate a change in road surfaces. In another example, when two or more vibration sensors 3542 are used, the differences between the vibrations may be used to determine friction or slippage of the road surface (e.g., when the difference in vibration is between a power-driven axle and a freely rotating axle).

The vehicle 3500 may include an ADAS system 3538. The ADAS system 3538 may include a SoC, in some examples. The ADAS system 3538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 3560, LIDAR sensor(s) 3564, and/or a camera(s). The ACC systems may include longitudinal ACC and/or lateral ACC. Longitudinal ACC monitors and controls the distance to the vehicle immediately ahead of the vehicle 3500 and automatically adjust the vehicle speed to maintain a safe distance from vehicles ahead. Lateral ACC performs distance keeping, and advises the vehicle 3500 to change lanes when necessary. Lateral ACC is related to other ADAS applications such as LCA and CWS.

CACC uses information from other vehicles that may be received via the network interface 3524 and/or the wireless antenna(s) 3526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 3500), while the I2V communication concept provides information about traffic further ahead. CACC systems may include either or both I2V and V2V information sources. Given the information of the vehicles ahead of the vehicle 3500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 3560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 3560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 3500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 3500 if the vehicle 3500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 3560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 3500 is backing up. Some RCTW systems include AEB to ensure that the vehicle brakes are applied to avoid a crash. RCTW systems may use one or more rear-facing RADAR sensor(s) 3560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 3500, the vehicle 3500 itself must, in the case of conflicting results, decide whether to heed the result from a primary computer or a secondary computer (e.g., a first controller 3536 or a second controller 3536). For example, in some embodiments, the ADAS system 3538 may be a backup and/or secondary computer for providing perception information to a backup computer rationality module. The backup computer rationality monitor may run a redundant diverse software on hardware components to detect faults in perception and dynamic driving tasks. Outputs from the ADAS system 3538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 3504.

In other examples, ADAS system 3538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 3538 may be fed into the primary computer's perception block and/or the primary computer's dynamic driving task block. For example, if the ADAS system 3538 indicates a forward crash warning due to an object immediately ahead, the perception block may use this information when identifying objects. In other examples, the secondary computer may have its own neural network which is trained and thus reduces the risk of false positives, as described herein.

The vehicle 3500 may further include the infotainment SoC 3530 (e.g., an in-vehicle infotainment system (IVI)). Although illustrated and described as a SoC, the infotainment system may not be a SoC, and may include two or more discrete components. The infotainment SoC 3530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 3500. For example, the infotainment SoC 3530 may radios, disk players, navigation systems, video players, USB and Bluetooth connectivity, carputers, in-car entertainment, Wi-Fi, steering wheel audio controls, hands free voice control, a heads-up display (HUD), an HMI display 3534, a telematics device, a control panel (e.g., for controlling and/or interacting with various components, features, and/or systems), and/or other components. The infotainment SoC 3530 may further be used to provide information (e.g., visual and/or audible) to a user(s) of the vehicle, such as information from the ADAS system 3538, autonomous driving information such as planned vehicle maneuvers, trajectories, surrounding environment information (e.g., intersection information, vehicle information, road information, etc.), and/or other information.

The infotainment SoC 3530 may include GPU functionality. The infotainment SoC 3530 may communicate over the bus 3502 (e.g., CAN bus, Ethernet, etc.) with other devices, systems, and/or components of the vehicle 3500. In some examples, the infotainment SoC 3530 may be coupled to a supervisory MCU such that the GPU of the infotainment system may perform some self-driving functions in the event that the primary controller(s) 3536 (e.g., the primary and/or backup computers of the vehicle 3500) fail. In such an example, the infotainment SoC 3530 may put the vehicle 3500 into a chauffeur to safe stop mode, as described herein.

The vehicle 3500 may further include an instrument cluster 3532 (e.g., a digital dash, an electronic instrument cluster, a digital instrument panel, etc.). The instrument cluster 3532 may include a controller and/or supercomputer (e.g., a discrete controller or supercomputer). The instrument cluster 3532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 3530 and the instrument cluster 3532. In other words, the instrument cluster 3532 may be included as part of the infotainment SoC 3530, or vice versa.

FIG. 35D is a system diagram for communication between cloud-based server(s) and the example autonomous vehicle 3500 of FIG. 35A, in accordance with some embodiments of the present disclosure. The system 3576 may include server(s) 3578, network(s) 3590, and vehicles, including the vehicle 3500. The server(s) 3578 may include a plurality of GPUs 3584(A)-3584(H) (collectively referred to herein as GPUs 3584), PCIe switches 3582(A)-3582(H) (collectively referred to herein as PCIe switches 3582), and/or CPUs 3580(A)-3580(B) (collectively referred to herein as CPUs 3580). The GPUs 3584, the CPUs 3580, and the PCIe switches may be interconnected with high-speed interconnects such as, for example and without limitation, NVLink interfaces 3588 developed by NVIDIA and/or PCIe connections 3586. In some examples, the GPUs 3584 are connected via NVLink and/or NVSwitch SoC and the GPUs 3584 and the PCIe switches 3582 are connected via PCIe interconnects. Although eight GPUs 3584, two CPUs 3580, and two PCIe switches are illustrated, this is not intended to be limiting. Depending on the embodiment, each of the server(s) 3578 may include any number of GPUs 3584, CPUs 3580, and/or PCIe switches. For example, the server(s) 3578 may each include eight, sixteen, thirty-two, and/or more GPUs 3584.

The server(s) 3578 may receive, over the network(s) 3590 and from the vehicles, image data representative of images showing unexpected or changed road conditions, such as recently commenced road-work. The server(s) 3578 may transmit, over the network(s) 3590 and to the vehicles, neural networks 3592, updated neural networks 3592, and/or map information 3594, including information regarding traffic and road conditions. The updates to the map information 3594 may include updates for the HD map 3522, such as information regarding construction sites, potholes, detours, flooding, and/or other obstructions. In some examples, the neural networks 3592, the updated neural networks 3592, and/or the map information 3594 may have resulted from new training and/or experiences represented in data received from any number of vehicles in the environment, and/or based on training performed at a datacenter (e.g., using the server(s) 3578 and/or other servers).

The server(s) 3578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 3590, and/or the machine learning models may be used by the server(s) 3578 to remotely monitor the vehicles.

In some examples, the server(s) 3578 may receive data from the vehicles and apply the data to up-to-date real-time neural networks for real-time intelligent inferencing. The server(s) 3578 may include deep-learning supercomputers and/or dedicated AI computers powered by GPU(s) 3584, such as a DGX and DGX Station machines developed by NVIDIA. However, in some examples, the server(s) 3578 may include deep learning infrastructure that use only CPU-powered datacenters.

The deep-learning infrastructure of the server(s) 3578 may be capable of fast, real-time inferencing, and may use that capability to evaluate and verify the health of the processors, software, and/or associated hardware in the vehicle 3500. For example, the deep-learning infrastructure may receive periodic updates from the vehicle 3500, such as a sequence of images and/or objects that the vehicle 3500 has located in that sequence of images (e.g., via computer vision and/or other machine learning object classification techniques). The deep-learning infrastructure may run its own neural network to identify the objects and compare them with the objects identified by the vehicle 3500 and, if the results do not match and the infrastructure concludes that the AI in the vehicle 3500 is malfunctioning, the server(s) 3578 may transmit a signal to the vehicle 3500 instructing a fail-safe computer of the vehicle 3500 to assume control, notify the passengers, and complete a safe parking maneuver.

For inferencing, the server(s) 3578 may include the GPU(s) 3584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 36 is a block diagram of an example computing device(s) 3600 suitable for use in implementing some embodiments of the present disclosure. Computing device 3600 may include an interconnect system 3602 that directly or indirectly couples the following devices: memory 3604, one or more central processing units (CPUs) 3606, one or more graphics processing units (GPUs) 3608, a communication interface 3610, input/output (I/O) ports 3612, input/output components 3614, a power supply 3616, one or more presentation components 3618 (e.g., display(s)), and one or more logic units 3620. In at least one embodiment, the computing device(s) 3600 may comprise one or more virtual machines (VMs), and/or any of the components thereof may comprise virtual components (e.g., virtual hardware components). For non-limiting examples, one or more of the GPUs 3608 may comprise one or more vGPUs, one or more of the CPUs 3606 may comprise one or more vCPUs, and/or one or more of the logic units 3620 may comprise one or more virtual logic units. As such, a computing device(s) 3600 may include discrete components (e.g., a full GPU dedicated to the computing device 3600), virtual components (e.g., a portion of a GPU dedicated to the computing device 3600), or a combination thereof.

Although the various blocks of FIG. 36 are shown as connected via the interconnect system 3602 with lines, this is not intended to be limiting and is for clarity only. For example, in some embodiments, a presentation component 3618, such as a display device, may be considered an I/O component 3614 (e.g., if the display is a touch screen). As another example, the CPUs 3606 and/or GPUs 3608 may include memory (e.g., the memory 3604 may be representative of a storage device in addition to the memory of the GPUs 3608, the CPUs 3606, and/or other components). In other words, the computing device of FIG. 36 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 36.

The interconnect system 3602 may represent one or more links or busses, such as an address bus, a data bus, a control bus, or a combination thereof. The interconnect system 3602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 3606 may be directly connected to the memory 3604. Further, the CPU 3606 may be directly connected to the GPU 3608. Where there is direct, or point-to-point connection between components, the interconnect system 3602 may include a PCIe link to carry out the connection. In these examples, a PCI bus need not be included in the computing device 3600.

The memory 3604 may include any of a variety of computer-readable media. The computer-readable media may be any available media that may be accessed by the computing device 3600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 3604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 3600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 3606 may be configured to execute at least some of the computer-readable instructions to control one or more components of the computing device 3600 to perform one or more of the methods and/or processes described herein. The CPU(s) 3606 may each include one or more cores (e.g., one, two, four, eight, twenty-eight, seventy-two, etc.) that are capable of handling a multitude of software threads simultaneously. The CPU(s) 3606 may include any type of processor, and may include different types of processors depending on the type of computing device 3600 implemented (e.g., processors with fewer cores for mobile devices and processors with more cores for servers). For example, depending on the type of computing device 3600, the processor may be an Advanced RISC Machines (ARM) processor implemented using Reduced Instruction Set Computing (RISC) or an x86 processor implemented using Complex Instruction Set Computing (CISC). The computing device 3600 may include one or more CPUs 3606 in addition to one or more microprocessors or supplementary co-processors, such as math co-processors.

In addition to or alternatively from the CPU(s) 3606, the GPU(s) 3608 may be configured to execute at least some of the computer-readable instructions to control one or more components of the computing device 3600 to perform one or more of the methods and/or processes described herein. One or more of the GPU(s) 3608 may be an integrated GPU (e.g., with one or more of the CPU(s) 3606 and/or one or more of the GPU(s) 3608 may be a discrete GPU. In embodiments, one or more of the GPU(s) 3608 may be a coprocessor of one or more of the CPU(s) 3606. The GPU(s) 3608 may be used by the computing device 3600 to render graphics (e.g., 3D graphics) or perform general purpose computations. For example, the GPU(s) 3608 may be used for General-Purpose computing on GPUs (GPGPU). The GPU(s) 3608 may include hundreds or thousands of cores that are capable of handling hundreds or thousands of software threads simultaneously. The GPU(s) 3608 may generate pixel data for output images in response to rendering commands (e.g., rendering commands from the CPU(s) 3606 received via a host interface). The GPU(s) 3608 may include graphics memory, such as display memory, for storing pixel data or any other suitable data, such as GPGPU data. The display memory may be included as part of the memory 3604. The GPU(s) 3608 may include two or more GPUs operating in parallel (e.g., via a link). The link may directly connect the GPUs (e.g., using NVLINK) or may connect the GPUs through a switch (e.g., using NVSwitch). When combined together, each GPU 3608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 3606 and/or the GPU(s) 3608, the logic unit(s) 3620 may be configured to execute at least some of the computer-readable instructions to control one or more components of the computing device 3600 to perform one or more of the methods and/or processes described herein. In embodiments, the CPU(s) 3606, the GPU(s) 3608, and/or the logic unit(s) 3620 may discretely or jointly perform any combination of the methods, processes and/or portions thereof. One or more of the logic units 3620 may be part of and/or integrated in one or more of the CPU(s) 3606 and/or the GPU(s) 3608 and/or one or more of the logic units 3620 may be discrete components or otherwise external to the CPU(s) 3606 and/or the GPU(s) 3608. In embodiments, one or more of the logic units 3620 may be a coprocessor of one or more of the CPU(s) 3606 and/or one or more of the GPU(s) 3608.

Examples of the logic unit(s) 3620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 3610 may include one or more receivers, transmitters, and/or transceivers that enable the computing device 3600 to communicate with other computing devices via an electronic communication network, included wired and/or wireless communications. The communication interface 3610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 3620 and/or communication interface 3610 may include one or more data processing units (DPUs) to transmit data received over a network and/or through interconnect system 3602 directly to (e.g., a memory of) one or more GPU(s) 3608.

The I/O ports 3612 may enable the computing device 3600 to be logically coupled to other devices including the I/O components 3614, the presentation component(s) 3618, and/or other components, some of which may be built in to (e.g., integrated in) the computing device 3600. Illustrative I/O components 3614 include a microphone, mouse, keyboard, joystick, game pad, game controller, satellite dish, scanner, printer, wireless device, etc. The I/O components 3614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 3600. The computing device 3600 may be include depth cameras, such as stereoscopic camera systems, infrared camera systems, RGB camera systems, touchscreen technology, and combinations of these, for gesture detection and recognition. Additionally, the computing device 3600 may include accelerometers or gyroscopes (e.g., as part of an inertia measurement unit (IMU)) that enable detection of motion. In some examples, the output of the accelerometers or gyroscopes may be used by the computing device 3600 to render immersive augmented reality or virtual reality.

The power supply 3616 may include a hard-wired power supply, a battery power supply, or a combination thereof. The power supply 3616 may provide power to the computing device 3600 to enable the components of the computing device 3600 to operate.

The presentation component(s) 3618 may include a display (e.g., a monitor, a touch screen, a television screen, a heads-up-display (HUD), other display types, or a combination thereof), speakers, and/or other presentation components. The presentation component(s) 3618 may receive data from other components (e.g., the GPU(s) 3608, the CPU(s) 3606, DPUs, etc.), and output the data (e.g., as an image, video, sound, etc.).

The techniques disclosed herein may be incorporated in any processor that may be used for processing a neural network, such as, for example, a central processing unit (CPU), a GPU, an intelligence processing unit (IPU), neural processing unit (NPU), tensor processing unit (TPU), a neural network processor (NNP), a data processing unit (DPU), a vision processing unit (VPU), an application-specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, a voice-controlled device, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or alter, generate, or compress an image. For example, such a processor may be employed to enhance an image that is rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device (e.g., a personal computer, video game console, smartphone, other mobile devices, etc.) to enhance services that stream images such as NVIDIA GeForce Now (GFN), Google Stadia, and the like.

As an example, a processor incorporating the techniques disclosed herein can be employed to process one or more neural networks for any other types of applications that can take advantage of a neural network. For example, such applications may involve translating languages, identifying and negating sounds in audio, detecting anomalies or defects during the production of goods and services, surveillance of living beings and non-living things, medical diagnosis, making decisions, and the like.

Example Data Center

FIG. 37 illustrates an example data center 3700 that may be used in at least one embodiments of the present disclosure. The data center 3700 may include a data center infrastructure layer 3710, a framework layer 3720, a software layer 3730, and/or an application layer 3740.

As shown in FIG. 37, the data center infrastructure layer 3710 may include a resource orchestrator 3712, grouped computing resources 3714, and node computing resources ("node C.R.s") 3716(1)-3716(N), where "N" represents any whole, positive integer. In at least one embodiment, node C.R.s 3716(1)-3716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 3716(1)-3716(N) may correspond to a server having one or more of the above-mentioned computing resources. In addition, in some embodiments, the node C.R.s 3716(1)-37161 (N) may include one or more virtual components, such as vGPUs, vCPUs, and/or the like, and/or one or more of the node C.R.s 3716(1)-3716(N) may correspond to a virtual machine (VM).

In at least one embodiment, grouped computing resources 3714 may include separate groupings of node C.R.s 3716 housed within one or more racks (not shown), or many racks housed in data centers at various geographical locations (also not shown). Separate groupings of node C.R.s 3716 within grouped computing resources 3714 may include grouped compute, network, memory or storage resources that may be configured or allocated to support one or more workloads. In at least one embodiment, several node C.R.s 3716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 3712 may configure or otherwise control one or more node C.R.s 3716(1)-3716(N) and/or grouped computing resources 3714. In at least one embodiment, resource orchestrator 3712 may include a software design infrastructure (SDI) management entity for the data center 3700. The resource orchestrator 3712 may include hardware, software, or some combination thereof.

In at least one embodiment, as shown in FIG. 37, framework layer 3720 may include a job scheduler 3733, a configuration manager 3734, a resource manager 3736, and/or a distributed file system 3738. The framework layer 3720 may include a framework to support software 3732 of software layer 3730 and/or one or more application(s) 3742 of application layer 3740. The software 3732 or application (s) 3742 may respectively include web-based service software or applications, such as those provided by Amazon Web Services, Google Cloud and Microsoft Azure. The framework layer 3720 may be, but is not limited to, a type of free and open-source software web application framework such as Apache Spark™ (hereinafter "Spark") that may utilize distributed file system 3738 for large-scale data processing (e.g., "big data"). In at least one embodiment, job scheduler 3733 may include a Spark driver to facilitate scheduling of workloads supported by various layers of data center 3700. The configuration manager 3734 may be capable of configuring different layers such as software layer 3730 and framework layer 3720 including Spark and distributed file system 3738 for supporting large-scale data processing. The resource manager 3736 may be capable of managing clustered or grouped computing resources mapped to or allocated for support of distributed file system 3738 and job scheduler 3733. In at least one embodiment, clustered or grouped computing resources may include grouped computing resource 3714 at data center infrastructure layer 3710. The resource manager 3736 may coordinate with resource orchestrator 3712 to manage these mapped or allocated computing resources.

In at least one embodiment, software 3732 included in software layer 3730 may include software used by at least portions of node C.R.s 3716(1)-3716(N), grouped computing resources 3714, and/or distributed file system 3738 of framework layer 3720. One or more types of software may include, but are not limited to, Internet web page search software, e-mail virus scan software, database software, and streaming video content software.

In at least one embodiment, application(s) 3742 included in application layer 3740 may include one or more types of applications used by at least portions of node C.R.s 3716 (1)-3716(N), grouped computing resources 3714, and/or distributed file system 3738 of framework layer 3720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 3734, resource manager 3736, and resource orchestrator 3712 may implement any number and type of self-modifying actions based on any amount and type of data acquired in any technically feasible fashion. Self-modifying actions may relieve a data center operator of data center 3700 from making possibly bad configuration decisions and possibly avoiding underutilized and/or poor performing portions of a data center.

The data center 3700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 3700. In at least one embodiment, trained or deployed machine learning models corresponding to one or more neural networks may be used to infer or predict information using resources described above with respect to the data center 3700 by using weight parameters calculated through one or more training techniques, such as but not limited to those described herein.

In at least one embodiment, the data center 3700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 3600 of FIG. 36—e.g., each device may include similar components, features, and/or functionality of the computing device(s) 3600. In addition, where backend devices (e.g., servers, NAS, etc.) are implemented, the backend devices may be included as part of a data center 3700, an example of which is described in more detail herein with respect to FIG. 37.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 3600 described herein with respect to FIG. 36. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining, using one or more machine learning models, one or more distances and one or more directions from an ego-object to one or more closest detected objects in an environment;

generating a three-dimensional (3D) bowl that adaptively models the environment with a shape that is based at least on the one or more distances and the one or more directions to the one or more closest detected objects; and generating a visualization of the environment based at least on the 3D bowl.

2. The method of claim 1, further comprising determining the one or more distances and the one or more directions based on at least one of performing 3D object detection or projecting sensor data into a top-down two-dimensional (2D) or 3D occupancy grid.

3. The method of claim 1, wherein the generating of the 3D bowl comprises identifying a cluster of detected objects within a range of distances from the ego-object corresponding to a designated separation between an inner plane of the 3D bowl and an outer edge of the 3D bowl, and fitting a circumference of the 3D bowl to the cluster of detected objects within the range of distances from the ego-object.

4. The method of claim 1, further comprising identifying the one or more closest detected objects within a variable range threshold that varies based at least on whether there are any detected objects within an initial range threshold.

5. The method of claim 1, wherein the generating of the 3D bowl comprises fitting a circumference of the 3D bowl to one or more representative points of the one or more closest detected objects.

6. The method of claim 1, further comprising determining the one or more distances and the one or more directions to the one or more closest detected objects based at least on combining multiple types of distance or depth estimation.

7. The method of claim 1, further comprising determining the one or more distances and the one or more directions from the ego-object to at least one of: 1) one or more corners, edges, or center points of one or more detected bounding shapes of the one or more closest detected objects, or 2) one or more occupied cells of an occupancy grid.

8. The method of claim 1, wherein the generating of the visualization comprises at least one of orthographically projecting image data representing the environment using the 3D bowl or mapping image data representing the environment onto the 3D bowl.

9. The method of claim 1, further comprising selecting, based at least on speed of ego-motion of the ego-object, between enabling and disabling the 3D bowl that adaptively models the environment.

10. The method of claim 1, wherein the generating of the 3D bowl comprises identifying and omitting, from the one or more closest detected objects, a set of the one or more closest detected objects that are not within a field of view, of a virtual camera, represented by the visualization of the 3D bowl.

11. A processor comprising:

one or more processing units to:

determine, using one or more machine learning models, one or more distances and one or more directions from an ego-object to one or more closest detected objects in an environment;

generate a three-dimensional (3D) bowl that adaptively models the environment with a shape that is based at least on the one or more distances and the one or more directions to the one or more closest detected objects; and generate a visualization of the environment based at least on the 3D bowl.

12. The processor of claim 11, the one or more processing units further to determine the one or more distances and the one or more directions to the one or more closest detected objects based on at least one of performing 3D object detection or projecting sensor data into a top-down two-dimensional (2D) or 3D occupancy grid.

13. The processor of claim 11, the one or more processing units further to generate the 3D bowl based at least on identifying a cluster of detected objects within a range of distances from the ego-object corresponding to a designated separation between an inner plane of the 3D bowl and an outer edge of the 3D bowl, and fitting a circumference of the 3D bowl to the cluster of detected objects within the range of distances from the ego-object.

14. The processor of claim 11, the one or more processing units further to identify the one or more closest detected objects within a variable range threshold that varies based at least on whether there are any detected objects within an initial range threshold.

15. The processor of claim 11, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing real-time streaming;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

16. A system comprising:

one or more processing units to:

determine, using one or more machine learning models, one or more distances and one or more directions from an ego-object to one or more closest detected objects in an environment;

generate a three-dimensional (3D) bowl that models the environment using a shape that is based at least on the one or more distances and the one or more directions to the one or more closest detected objects; and generate a visualization of the environment based at least on the 3D bowl.

17. The system of claim 16, the one or more processing units further to generate the 3D bowl based at least on fitting a circumference of the 3D bowl to one or more representative points of the one or more closest detected objects.

18. The system of claim 16, the one or more processing units further to determine the one or more distances and the one or more directions to the one or more closest detected objects based at least on combining multiple types of distance or depth estimation.

19. The system of claim 16, the one or more processing units further to determine the one or more distances and the one or more directions from the ego-object to at least one of: 1) one or more corners, edges, or center points of one or more detected bounding shapes of the one or more closest detected objects, or 2) one or more occupied cells of an occupancy grid.

20. The system of claim 16, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing deep learning operations;

a system for performing real-time streaming;

a system implemented using an edge device;

a system implemented using a robot;

a system incorporating one or more virtual machines (VMs);

a system implemented at least partially in a data center;

a system for performing light transport simulation;

a system for performing collaborative content creation for 3D assets;

a system for generating synthetic data; or a system implemented at least partially using cloud computing resources.

\* \* \* \* \*